(12) United States Patent
He et al.

(10) Patent No.: US 12,435,135 B2
(45) Date of Patent: Oct. 7, 2025

(54) HUMAN CD47-TARGETING SINGLE-DOMAIN ANTIBODY AND USE THEREOF

(71) Applicant: Shanghai Escugen Biotechnology Co., Ltd., Shanghai (CN)

(72) Inventors: Xiangyu He, Shanghai (CN); Weihong Nian, Shanghai (CN); Chuanying Xu, Shanghai (CN); Xintong Zheng, Shanghai (CN); Xinmin Zhang, Shanghai (CN); Jing Xiao, Shanghai (CN); Feng He, Shanghai (CN); Qing Zhou, Shanghai (CN)

(73) Assignee: Shanghai Escugen Biotechnology Co., Ltd., Shanghai (CN)

( * ) Notice: Subject to any disclaimer, the term of this patent is extended or adjusted under 35 U.S.C. 154(b) by 629 days.

(21) Appl. No.: 17/799,543

(22) PCT Filed: Feb. 10, 2021

(86) PCT No.: PCT/CN2021/076479
§ 371 (c)(1),
(2) Date: Aug. 12, 2022

(87) PCT Pub. No.: WO2021/160153
PCT Pub. Date: Aug. 19, 2021

(65) Prior Publication Data
US 2023/0086530 A1    Mar. 23, 2023

(30) Foreign Application Priority Data

Feb. 12, 2020 (CN) .......................... 202010088990.4

(51) Int. Cl.
| | | |
|---|---|---|
| C07K 16/28 | (2006.01) | |
| A61K 39/395 | (2006.01) | |
| A61K 47/68 | (2017.01) | |
| A61P 1/00 | (2006.01) | |
| A61P 35/00 | (2006.01) | |
| A61K 39/00 | (2006.01) | |

(52) U.S. Cl.
CPC ...... *C07K 16/2803* (2013.01); *A61K 39/3955* (2013.01); *A61K 47/6849* (2017.08); *A61P 1/00* (2018.01); *A61P 35/00* (2018.01); *A61K 2039/505* (2013.01); *C07K 2317/24* (2013.01); *C07K 2317/35* (2013.01); *C07K 2317/524* (2013.01); *C07K 2317/526* (2013.01); *C07K 2317/53* (2013.01); *C07K 2317/565* (2013.01); *C07K 2317/567* (2013.01); *C07K 2317/569* (2013.01); *C07K 2317/76* (2013.01); *C07K 2317/92* (2013.01); *C07K 2319/00* (2013.01)

(58) Field of Classification Search
CPC .................................................. C07K 16/2803
See application file for complete search history.

(56) References Cited

U.S. PATENT DOCUMENTS

2020/0385465 A1   12/2020  Wan et al.

FOREIGN PATENT DOCUMENTS

| CN | 104804093 A | 7/2015 |
|---|---|---|
| CN | 110003335 A | 7/2019 |
| CN | 110144009 A | 8/2019 |
| EP | 3753953 A1 | 12/2020 |
| WO | WO 2018/233575 A1 | 12/2018 |
| WO | WO 2019/068302 A1 | 4/2019 |
| WO | WO 2019/157843 A1 | 8/2019 |
| WO | WO 2020/018989 A1 | 1/2020 |

OTHER PUBLICATIONS

Garcia-Hernandez et al. The advances in targeting CD47/SIRPalpha "do not eat me" axis and their ongoing challenges as an anticancer therapy. (Year: 2024).*
Choi et al. (Nanocages displaying SIRP gamma clusters combined with prophagocytic stimulus of phagocytes potentiate anti-tumor activity) (Year: 2021).*
Sudo et al. Significance of CD47 expression in gastric cancer. (Year: 2017).*
Osorio et al. The Antitumor Activities of Anti-CD47 Antibodies Require Fc-FcγR interactions. (Year: 2023).*
Doboz et al. Challenges of the immunotherapy: Perspectives and limitations of the immune checkpoint inhibitor treatment. (Year: 2020).*
European Patent Office, Extended European Search Report, European Patent Application No. 21754327.1, Mar. 1, 2024, eight pages.
Ma, L. et al. "Preclinical Development of a Novel CD47 Nanobody with Less Toxicity and Enhanced Anti-Cancer Therapeutic Potential." Journal of Nanobiotechnology, vol. 18, No. 12, Jan. 13, 2020, pp. 1-15.
PCT International Search Report (with English translation), PCT/CN2021/076479, Apr. 29, 2021, 8 Pages.

* cited by examiner

*Primary Examiner* — Sarah Alawadi
(74) *Attorney, Agent, or Firm* — FENWICK & WEST LLP

(57) ABSTRACT

The present application relates to an anti-CD47 single-domain antibody and a use thereof, and a method for preparing the antibody. The single-domain antibody comprises a CDR selected from the following CDRs: (1) CDR1, CDR2, and CDR3 shown by SEQ ID NO: 1, SEQ ID NO: 2, and SEQ ID NO:3; or (2) CDR1, CDR2, and CDR3 shown by SEQ ID NO: 6, SEQ ID NO: 7, and SEQ ID NO: 8.

23 Claims, 23 Drawing Sheets
Specification includes a Sequence Listing.

SEQUENCE LISTING

<160> NUMBER OF SEQ ID NOS: 39

<210> SEQ ID NO 1
<211> LENGTH: 8
<212> TYPE: PRT
<213> ORGANISM: Artificial Sequence
<220> FEATURE:
<223> OTHER INFORMATION: CDR1 of DX-36698 clone

<400> SEQUENCE: 1

Val Arg Thr Phe Ser Ile Tyr Ala
1               5

<210> SEQ ID NO 2
<211> LENGTH: 8
<212> TYPE: PRT
<213> ORGANISM: Artificial Sequence
<220> FEATURE:

<223> OTHER INFORMATION: CDR2 of DX-36698 clone

<400> SEQUENCE: 2

Ile Ser Gly Arg Gly Tyr Thr Thr
1               5

<210> SEQ ID NO 3
<211> LENGTH: 18
<212> TYPE: PRT
<213> ORGANISM: Artificial Sequence
<220> FEATURE:
<223> OTHER INFORMATION: CDR3 of DX-36698 clone

<400> SEQUENCE: 3

Ala Ala Asp Leu Tyr Gly Ser Arg Arg Tyr Ala Asp Arg Glu Ser Tyr
1               5                   10                  15

Asp Tyr

<210> SEQ ID NO 4
<211> LENGTH: 125
<212> TYPE: PRT
<213> ORGANISM: Artificial Sequence
<220> FEATURE:
<223> OTHER INFORMATION: Amino acid sequence of DX-36698 (heavy chain
      variable region sequence)

<400> SEQUENCE: 4

Gln Val Gln Leu Val Glu Ser Gly Gly Gly Leu Val Gln Ala Gly Gly
1               5                   10                  15

Ser Leu Arg Leu Ser Cys Ala Ala Ser Val Arg Thr Phe Ser Ile Tyr
            20                  25                  30

Ala Met Gly Trp Phe Arg Gln Ala Pro Gly Lys Asp Arg Glu Phe Val
        35                  40                  45

Gly Ala Ile Ser Gly Arg Gly Tyr Thr Thr Tyr Tyr Val Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Asp Leu Tyr Gly Ser Arg Arg Tyr Ala Asp Arg Glu Ser Tyr
            100                 105                 110

Asp Tyr Trp Gly Gln Gly Thr Gln Val Thr Val Ser Ser
        115                 120                 125

<210> SEQ ID NO 5
<211> LENGTH: 357
<212> TYPE: PRT
<213> ORGANISM: Artificial Sequence
<220> FEATURE:
<223> OTHER INFORMATION: Amino acid sequence of DX-36698-IgG1 (DX-36698
      VHH-Fc fusion antibody)

<400> SEQUENCE: 5

Gln Val Gln Leu Val Glu Ser Gly Gly Gly Leu Val Gln Ala Gly Gly
1               5                   10                  15

Ser Leu Arg Leu Ser Cys Ala Ala Ser Val Arg Thr Phe Ser Ile Tyr
            20                  25                  30

Ala Met Gly Trp Phe Arg Gln Ala Pro Gly Lys Asp Arg Glu Phe Val
        35                  40                  45

Gly Ala Ile Ser Gly Arg Gly Tyr Thr Thr Tyr Tyr Val Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Asp Leu Tyr Gly Ser Arg Arg Tyr Ala Asp Arg Glu Ser Tyr
            100                 105                 110

Asp Tyr Trp Gly Gln Gly Thr Gln Val Thr Val Ser Ser Glu Pro Lys
        115                 120                 125

Ser Cys Asp Lys Thr His Thr Cys Pro Pro Cys Pro Ala Pro Glu Leu
    130                 135                 140

Leu Gly Gly Pro Ser Val Phe Leu Phe Pro Pro Lys Pro Lys Asp Thr
145                 150                 155                 160

Leu Met Ile Ser Arg Thr Pro Glu Val Thr Cys Val Val Val Asp Val
                165                 170                 175

Ser His Glu Asp Pro Glu Val Lys Phe Asn Trp Tyr Val Asp Gly Val
            180                 185                 190

Glu Val His Asn Ala Lys Thr Lys Pro Arg Glu Glu Gln Tyr Asn Ser
        195                 200                 205

Thr Tyr Arg Val Val Ser Val Leu Thr Val Leu His Gln Asp Trp Leu
    210                 215                 220

Asn Gly Lys Glu Tyr Lys Cys Lys Val Ser Asn Lys Ala Leu Pro Ala
225                 230                 235                 240

Pro Ile Glu Lys Thr Ile Ser Lys Ala Lys Gly Gln Pro Arg Glu Pro
                245                 250                 255

Gln Val Tyr Thr Leu Pro Pro Ser Arg Asp Glu Leu Thr Lys Asn Gln
            260                 265                 270

Val Ser Leu Thr Cys Leu Val Lys Gly Phe Tyr Pro Ser Asp Ile Ala
        275                 280                 285

Val Glu Trp Glu Ser Asn Gly Gln Pro Glu Asn Asn Tyr Lys Thr Thr
    290                 295                 300

Pro Pro Val Leu Asp Ser Asp Gly Ser Phe Phe Leu Tyr Ser Lys Leu
305                 310                 315                 320

Thr Val Asp Lys Ser Arg Trp Gln Gln Gly Asn Val Phe Ser Cys Ser
                325                 330                 335

Val Met His Glu Ala Leu His Asn His Tyr Thr Gln Lys Ser Leu Ser
            340                 345                 350

Leu Ser Pro Gly Lys
        355

<210> SEQ ID NO 6
<211> LENGTH: 4
<212> TYPE: PRT
<213> ORGANISM: Artificial Sequence
<220> FEATURE:
<223> OTHER INFORMATION: CDR1 of DX-36699 clone

<400> SEQUENCE: 6

Gly Phe Tyr Asn
1

<210> SEQ ID NO 7
<211> LENGTH: 7
<212> TYPE: PRT
<213> ORGANISM: Artificial Sequence
<220> FEATURE:
<223> OTHER INFORMATION: CDR2 of DX-36699 clone

```
<400> SEQUENCE: 7

Ile Gly Ile Gly Gly Ser Thr
1               5

<210> SEQ ID NO 8
<211> LENGTH: 5
<212> TYPE: PRT
<213> ORGANISM: Artificial Sequence
<220> FEATURE:
<223> OTHER INFORMATION: CDR3 of DX-36699 clone

<400> SEQUENCE: 8

Trp Gly Gly Gly Tyr
1               5

<210> SEQ ID NO 9
<211> LENGTH: 107
<212> TYPE: PRT
<213> ORGANISM: Artificial Sequence
<220> FEATURE:
<223> OTHER INFORMATION: Amino acid sequence of DX-36699 (heavy chain
      variable region sequence)

<400> SEQUENCE: 9

Asp Val Gln Leu Gln Ala Ser Gly Gly Gly Ser Val Glu Ala Gly Gly
1               5                   10                  15

Ser Leu Thr Leu Ser Cys Leu Ala Ser Gly Phe Tyr Asn Met Arg Trp
            20                  25                  30

Tyr Arg Gln Ala Pro Gly Asn Glu Arg Glu Leu Val Ala Arg Ile Gly
        35                  40                  45

Ile Gly Gly Ser Thr Asp Tyr Ala Asp Ser Val Lys Gly Arg Phe Thr
    50                  55                  60

Ile Ser Arg Gly Asn Ala Lys Asn Met Val His Leu Gln Met Asn Ser
65                  70                  75                  80

Leu Lys Pro Glu Asp Thr Ala Val Tyr Tyr Cys Trp Gly Gly Gly Tyr
                85                  90                  95

Trp Gly Gln Gly Thr Gln Val Thr Val Ser Ser
            100                 105

<210> SEQ ID NO 10
<211> LENGTH: 339
<212> TYPE: PRT
<213> ORGANISM: Artificial Sequence
<220> FEATURE:
<223> OTHER INFORMATION: Amino acid sequence of DX-36699-IgG1 (DX-36699
      VHH-Fc fusion antibody)

<400> SEQUENCE: 10

Asp Val Gln Leu Gln Ala Ser Gly Gly Gly Ser Val Glu Ala Gly Gly
1               5                   10                  15

Ser Leu Thr Leu Ser Cys Leu Ala Ser Gly Phe Tyr Asn Met Arg Trp
            20                  25                  30

Tyr Arg Gln Ala Pro Gly Asn Glu Arg Glu Leu Val Ala Arg Ile Gly
        35                  40                  45

Ile Gly Gly Ser Thr Asp Tyr Ala Asp Ser Val Lys Gly Arg Phe Thr
    50                  55                  60

Ile Ser Arg Gly Asn Ala Lys Asn Met Val His Leu Gln Met Asn Ser
65                  70                  75                  80

Leu Lys Pro Glu Asp Thr Ala Val Tyr Tyr Cys Trp Gly Gly Gly Tyr
                85                  90                  95
```

```
Trp Gly Gln Gly Thr Gln Val Thr Val Ser Ser Glu Pro Lys Ser Cys
            100                 105                 110

Asp Lys Thr His Thr Cys Pro Pro Cys Pro Ala Pro Glu Leu Leu Gly
        115                 120                 125

Gly Pro Ser Val Phe Leu Phe Pro Pro Lys Pro Lys Asp Thr Leu Met
    130                 135                 140

Ile Ser Arg Thr Pro Glu Val Thr Cys Val Val Val Asp Val Ser His
145                 150                 155                 160

Glu Asp Pro Glu Val Lys Phe Asn Trp Tyr Val Asp Gly Val Glu Val
                165                 170                 175

His Asn Ala Lys Thr Lys Pro Arg Glu Glu Gln Tyr Asn Ser Thr Tyr
            180                 185                 190

Arg Val Val Ser Val Leu Thr Val Leu His Gln Asp Trp Leu Asn Gly
        195                 200                 205

Lys Glu Tyr Lys Cys Lys Val Ser Asn Lys Ala Leu Pro Ala Pro Ile
    210                 215                 220

Glu Lys Thr Ile Ser Lys Ala Lys Gly Gln Pro Arg Glu Pro Gln Val
225                 230                 235                 240

Tyr Thr Leu Pro Pro Ser Arg Asp Glu Leu Thr Lys Asn Gln Val Ser
                245                 250                 255

Leu Thr Cys Leu Val Lys Gly Phe Tyr Pro Ser Asp Ile Ala Val Glu
            260                 265                 270

Trp Glu Ser Asn Gly Gln Pro Glu Asn Asn Tyr Lys Thr Thr Pro Pro
        275                 280                 285

Val Leu Asp Ser Asp Gly Ser Phe Phe Leu Tyr Ser Lys Leu Thr Val
    290                 295                 300

Asp Lys Ser Arg Trp Gln Gln Gly Asn Val Phe Ser Cys Ser Val Met
305                 310                 315                 320

His Glu Ala Leu His Asn His Tyr Thr Gln Lys Ser Leu Ser Leu Ser
                325                 330                 335

Pro Gly Lys

<210> SEQ ID NO 11
<211> LENGTH: 443
<212> TYPE: PRT
<213> ORGANISM: Artificial Sequence
<220> FEATURE:
<223> OTHER INFORMATION: 5F9 HC

<400> SEQUENCE: 11

Gln Val Gln Leu Gln Gln Pro Gly Ala Glu Leu Val Lys Pro Gly Ala
1               5                   10                  15

Ser Val Met Met Ser Cys Lys Ala Ser Gly Tyr Thr Phe Thr Asn Tyr
            20                  25                  30

Asn Met His Trp Val Lys Gln Thr Pro Gly Gln Gly Leu Glu Trp Ile
        35                  40                  45

Gly Thr Ile Tyr Pro Gly Asn Asp Asp Thr Ser Tyr Asn Gln Lys Phe
    50                  55                  60

Lys Asp Lys Ala Thr Leu Thr Ala Asp Lys Ser Ser Ser Ala Ala Tyr
65                  70                  75                  80

Met Gln Leu Ser Ser Leu Thr Ser Glu Asp Ser Ala Val Tyr Tyr Cys
                85                  90                  95

Ala Arg Gly Gly Tyr Arg Ala Met Asp Tyr Trp Gly Gln Thr Ser Val
            100                 105                 110

Thr Val Ser Ser Ala Ser Thr Lys Gly Pro Ser Val Phe Pro Leu Ala
```

```
                115                 120                 125
Pro Cys Ser Arg Ser Thr Ser Glu Ser Thr Ala Ala Leu Gly Cys Leu
            130                 135                 140

Val Lys Asp Tyr Phe Pro Glu Pro Val Thr Val Ser Trp Asn Ser Gly
145                 150                 155                 160

Ala Leu Thr Ser Gly Val His Thr Phe Pro Ala Val Leu Gln Ser Ser
                165                 170                 175

Gly Leu Tyr Ser Leu Ser Ser Val Val Thr Val Pro Ser Ser Ser Leu
            180                 185                 190

Gly Thr Lys Thr Tyr Thr Cys Asn Val Asp His Lys Pro Ser Asn Thr
        195                 200                 205

Lys Val Asp Lys Arg Val Glu Ser Lys Tyr Gly Pro Pro Cys Pro Pro
210                 215                 220

Cys Pro Ala Pro Glu Phe Leu Gly Gly Pro Ser Val Phe Leu Phe Pro
225                 230                 235                 240

Pro Lys Pro Lys Asp Thr Leu Met Ile Ser Arg Thr Pro Glu Val Thr
                245                 250                 255

Cys Val Val Val Asp Val Ser Gln Glu Asp Pro Glu Val Gln Phe Asn
            260                 265                 270

Trp Tyr Val Asp Gly Val Glu Val His Asn Ala Lys Thr Lys Pro Arg
        275                 280                 285

Glu Glu Gln Phe Asn Ser Thr Tyr Arg Val Val Ser Val Leu Thr Val
    290                 295                 300

Leu His Gln Asp Trp Leu Asn Gly Lys Glu Tyr Lys Cys Lys Val Ser
305                 310                 315                 320

Asn Lys Gly Leu Pro Ser Ser Ile Glu Lys Thr Ile Ser Lys Ala Lys
                325                 330                 335

Gly Gln Pro Arg Glu Pro Gln Val Tyr Thr Leu Pro Pro Ser Gln Glu
            340                 345                 350

Glu Met Thr Lys Asn Gln Val Ser Leu Thr Cys Leu Val Lys Gly Phe
        355                 360                 365

Tyr Pro Ser Asp Ile Ala Val Glu Trp Glu Ser Asn Gly Gln Pro Glu
    370                 375                 380

Asn Asn Tyr Lys Thr Thr Pro Pro Val Leu Asp Ser Asp Gly Ser Phe
385                 390                 395                 400

Phe Leu Tyr Ser Arg Leu Thr Val Asp Lys Ser Arg Trp Gln Glu Gly
                405                 410                 415

Asn Val Phe Ser Cys Ser Val Met His Glu Ala Leu His Asn His Tyr
            420                 425                 430

Thr Gln Lys Ser Leu Ser Leu Ser Leu Gly Lys
        435                 440

<210> SEQ ID NO 12
<211> LENGTH: 219
<212> TYPE: PRT
<213> ORGANISM: Artificial Sequence
<220> FEATURE:
<223> OTHER INFORMATION: 5F9 LC

<400> SEQUENCE: 12

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val Tyr Ser
            20                  25                  30

Asn Gly Asn Thr Tyr Leu Gly Trp Tyr Leu Gln Lys Pro Gly Gln Ser
```

```
                35                  40                  45
Pro Lys Leu Leu Ile Tyr Lys Val Ser Asn Arg Phe Ser Gly Val Pro
     50                  55                  60

Asp Arg Phe Ser Gly Ser Gly Ser Gly Thr Asp Phe Thr Leu Lys Ile
 65                  70                  75                  80

Ser Arg Val Glu Ala Glu Asp Leu Gly Val Tyr His Cys Phe Gln Gly
                 85                  90                  95

Ser His Val Pro Tyr Thr Phe Gly Gly Gly Thr Lys Val Glu Ile Lys
                100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
        130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
        195                 200                 205

Pro Val Thr Lys Ser Phe Asn Arg Gly Glu Cys
    210                 215
```

<210> SEQ ID NO 13
<211> LENGTH: 19
<212> TYPE: PRT
<213> ORGANISM: Artificial Sequence
<220> FEATURE:
<223> OTHER INFORMATION: signal peptide

<400> SEQUENCE: 13

```
Met Gly Trp Ser Cys Ile Ile Leu Phe Leu Val Ala Thr Ala Thr Gly
 1               5                  10                  15

Val His Ser
```

<210> SEQ ID NO 14
<211> LENGTH: 232
<212> TYPE: PRT
<213> ORGANISM: Artificial Sequence
<220> FEATURE:
<223> OTHER INFORMATION: Amino acid sequence of heavy chain hinge region
      to CH3 domain of human IgG1 antibody

<400> SEQUENCE: 14

```
Glu Pro Lys Ser Cys Asp Lys Thr His Thr Cys Pro Pro Cys Pro Ala
 1               5                  10                  15

Pro Glu Leu Leu Gly Gly Pro Ser Val Phe Leu Phe Pro Pro Lys Pro
                20                  25                  30

Lys Asp Thr Leu Met Ile Ser Arg Thr Pro Glu Val Thr Cys Val Val
            35                  40                  45

Val Asp Val Ser His Glu Asp Pro Glu Val Lys Phe Asn Trp Tyr Val
     50                  55                  60

Asp Gly Val Glu Val His Asn Ala Lys Thr Lys Pro Arg Glu Glu Gln
 65                  70                  75                  80

Tyr Asn Ser Thr Tyr Arg Val Val Ser Val Leu Thr Val Leu His Gln
                85                  90                  95
```

```
Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Ser Arg Asp Glu Leu Thr
    130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
    210                 215                 220

Ser Leu Ser Leu Ser Pro Gly Lys
225                 230

<210> SEQ ID NO 15
<211> LENGTH: 107
<212> TYPE: PRT
<213> ORGANISM: Artificial Sequence
<220> FEATURE:
<223> OTHER INFORMATION: Amino acid sequence of DX-36699-H7 (heavy chain
      variable region sequence)

<400> SEQUENCE: 15

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Tyr Asn Met Arg Trp
            20                  25                  30

Tyr Arg Gln Ala Pro Gly Asn Gly Leu Glu Leu Val Ala Arg Ile Gly
        35                  40                  45

Ile Gly Gly Ser Thr Asp Tyr Ala Asp Ser Val Lys Gly Arg Phe Thr
    50                  55                  60

Ile Ser Arg Asp Asn Ser Lys Asn Thr Val Tyr Leu Gln Met Asn Ser
65                  70                  75                  80

Leu Arg Ala Glu Asp Thr Ala Val Tyr Tyr Cys Trp Gly Gly Gly Tyr
                85                  90                  95

Trp Gly Gln Gly Thr Leu Val Thr Val Ser Ser
            100                 105

<210> SEQ ID NO 16
<211> LENGTH: 107
<212> TYPE: PRT
<213> ORGANISM: Artificial Sequence
<220> FEATURE:
<223> OTHER INFORMATION: Amino acid sequence of DX-36699-H19 (heavy
      chain variable region sequence)

<400> SEQUENCE: 16

Glu Val Gln Leu Leu Glu Ser Gly Gly Gly Val Val Gln Pro Gly Gly
1               5                   10                  15

Ser Leu Arg Leu Ser Cys Ala Ala Ser Gly Phe Tyr Asn Met Arg Trp
            20                  25                  30

Tyr Arg Gln Ala Pro Gly Lys Gly Leu Glu Leu Val Ala Arg Ile Gly
        35                  40                  45
```

Ile Gly Gly Ser Thr Asp Tyr Ala Asp Ser Val Lys Gly Arg Phe Thr
 50                  55                  60

Ile Ser Arg Asp Asn Ser Lys Asn Thr Val Tyr Leu Gln Met Asn Ser
 65                  70                  75                  80

Leu Lys Pro Glu Asp Thr Ala Val Tyr Tyr Cys Trp Gly Gly Gly Tyr
                 85                  90                  95

Trp Gly Gln Gly Thr Leu Val Thr Val Ser Ser
                100                 105

<210> SEQ ID NO 17
<211> LENGTH: 107
<212> TYPE: PRT
<213> ORGANISM: Artificial Sequence
<220> FEATURE:
<223> OTHER INFORMATION: Amino acid sequence of DX-36699-H20 (heavy
      chain variable region sequence)

<400> SEQUENCE: 17

Glu Val Gln Leu Val Glu Ser Gly Gly Gly Leu Val Gln Pro Gly Gly
 1               5                  10                  15

Ser Leu Arg Leu Ser Cys Ala Ala Ser Gly Phe Tyr Asn Met Arg Trp
                 20                  25                  30

Tyr Arg Gln Ala Pro Gly Lys Gly Leu Glu Leu Val Ala Arg Ile Gly
             35                  40                  45

Ile Gly Gly Ser Thr Asp Tyr Ala Asp Ser Val Lys Gly Arg Phe Thr
 50                  55                  60

Ile Ser Arg Asp Asn Ser Lys Asn Thr Val Tyr Leu Gln Met Asn Ser
 65                  70                  75                  80

Leu Lys Pro Glu Asp Thr Ala Val Tyr Tyr Cys Trp Gly Gly Gly Tyr
                 85                  90                  95

Trp Gly Gln Gly Thr Leu Val Thr Val Ser Ser
                100                 105

<210> SEQ ID NO 18
<211> LENGTH: 107
<212> TYPE: PRT
<213> ORGANISM: Artificial Sequence
<220> FEATURE:
<223> OTHER INFORMATION: Amino acid sequence of DX-36699-H21 (heavy
      chain variable region sequence)

<400> SEQUENCE: 18

Glu Val Gln Leu Leu Glu Ser Gly Gly Gly Leu Val Gln Pro Gly Gly
 1               5                  10                  15

Ser Leu Arg Leu Ser Cys Ala Ala Ser Gly Phe Tyr Asn Met Arg Trp
                 20                  25                  30

Tyr Arg Gln Ala Pro Gly Asn Gly Leu Glu Leu Val Ala Arg Ile Gly
             35                  40                  45

Ile Gly Gly Ser Thr Asp Tyr Ala Asp Ser Val Lys Gly Arg Phe Thr
 50                  55                  60

Ile Ser Arg Asp Asn Ser Lys Asn Thr Val Tyr Leu Gln Met Asn Ser
 65                  70                  75                  80

Leu Lys Pro Glu Asp Thr Ala Val Tyr Tyr Cys Trp Gly Gly Gly Tyr
                 85                  90                  95

Trp Gly Gln Gly Thr Leu Val Thr Val Ser Ser
                100                 105

<210> SEQ ID NO 19
<211> LENGTH: 25

```
<212> TYPE: PRT
<213> ORGANISM: Artificial Sequence
<220> FEATURE:
<223> OTHER INFORMATION: FR1 region of DX-36699-H7

<400> SEQUENCE: 19

Glu Val Gln Leu Leu Glu Ser Gly Gly Gly Leu Val Gln Pro Gly Gly
1               5                   10                  15

Ser Leu Arg Leu Ser Cys Ala Ala Ser
            20                  25

<210> SEQ ID NO 20
<211> LENGTH: 17
<212> TYPE: PRT
<213> ORGANISM: Artificial Sequence
<220> FEATURE:
<223> OTHER INFORMATION: FR2 region of DX-36699-H7

<400> SEQUENCE: 20

Met Arg Trp Tyr Arg Gln Ala Pro Gly Asn Gly Leu Glu Leu Val Ala
1               5                   10                  15

Arg

<210> SEQ ID NO 21
<211> LENGTH: 38
<212> TYPE: PRT
<213> ORGANISM: Artificial Sequence
<220> FEATURE:
<223> OTHER INFORMATION: FR3 region of DX-36699-H7

<400> SEQUENCE: 21

Asp Tyr Ala Asp Ser Val Lys Gly Arg Phe Thr Ile Ser Arg Asp Asn
1               5                   10                  15

Ser Lys Asn Thr Val Tyr Leu Gln Met Asn Ser Leu Arg Ala Glu Asp
            20                  25                  30

Thr Ala Val Tyr Tyr Cys
        35

<210> SEQ ID NO 22
<211> LENGTH: 11
<212> TYPE: PRT
<213> ORGANISM: Artificial Sequence
<220> FEATURE:
<223> OTHER INFORMATION: FR4 region of DX-36699-H7

<400> SEQUENCE: 22

Trp Gly Gln Gly Thr Leu Val Thr Val Ser Ser
1               5                   10

<210> SEQ ID NO 23
<211> LENGTH: 25
<212> TYPE: PRT
<213> ORGANISM: Artificial Sequence
<220> FEATURE:
<223> OTHER INFORMATION: FR1 region of DX-36699-H19

<400> SEQUENCE: 23

Glu Val Gln Leu Leu Glu Ser Gly Gly Gly Val Val Gln Pro Gly Gly
1               5                   10                  15

Ser Leu Arg Leu Ser Cys Ala Ala Ser
            20                  25

<210> SEQ ID NO 24
<211> LENGTH: 17
```

```
<212> TYPE: PRT
<213> ORGANISM: Artificial Sequence
<220> FEATURE:
<223> OTHER INFORMATION: FR2 region of DX-36699-H19

<400> SEQUENCE: 24

Met Arg Trp Tyr Arg Gln Ala Pro Gly Lys Gly Leu Glu Leu Val Ala
1               5                   10                  15

Arg

<210> SEQ ID NO 25
<211> LENGTH: 38
<212> TYPE: PRT
<213> ORGANISM: Artificial Sequence
<220> FEATURE:
<223> OTHER INFORMATION: FR3 region of DX-36699-H19

<400> SEQUENCE: 25

Asp Tyr Ala Asp Ser Val Lys Gly Arg Phe Thr Ile Ser Arg Asp Asn
1               5                   10                  15

Ser Lys Asn Thr Val Tyr Leu Gln Met Asn Ser Leu Lys Pro Glu Asp
            20                  25                  30

Thr Ala Val Tyr Tyr Cys
        35

<210> SEQ ID NO 26
<211> LENGTH: 11
<212> TYPE: PRT
<213> ORGANISM: Artificial Sequence
<220> FEATURE:
<223> OTHER INFORMATION: FR4 region of DX-36699-H19

<400> SEQUENCE: 26

Trp Gly Gln Gly Thr Leu Val Thr Val Ser Ser
1               5                   10

<210> SEQ ID NO 27
<211> LENGTH: 25
<212> TYPE: PRT
<213> ORGANISM: Artificial Sequence
<220> FEATURE:
<223> OTHER INFORMATION: FR1 region of DX-36699-H20

<400> SEQUENCE: 27

Glu Val Gln Leu Val Glu Ser Gly Gly Gly Leu Val Gln Pro Gly Gly
1               5                   10                  15

Ser Leu Arg Leu Ser Cys Ala Ala Ser
            20                  25

<210> SEQ ID NO 28
<211> LENGTH: 17
<212> TYPE: PRT
<213> ORGANISM: Artificial Sequence
<220> FEATURE:
<223> OTHER INFORMATION: FR2 region of DX-36699-H20

<400> SEQUENCE: 28

Met Arg Trp Tyr Arg Gln Ala Pro Gly Lys Gly Leu Glu Leu Val Ala
1               5                   10                  15

Arg

<210> SEQ ID NO 29
<211> LENGTH: 38
<212> TYPE: PRT
```

```
<213> ORGANISM: Artificial Sequence
<220> FEATURE:
<223> OTHER INFORMATION: FR3 region of DX-36699-H20

<400> SEQUENCE: 29

Asp Tyr Ala Asp Ser Val Lys Gly Arg Phe Thr Ile Ser Arg Asp Asn
1               5                   10                  15

Ser Lys Asn Thr Val Tyr Leu Gln Met Asn Ser Leu Lys Pro Glu Asp
            20                  25                  30

Thr Ala Val Tyr Tyr Cys
        35

<210> SEQ ID NO 30
<211> LENGTH: 11
<212> TYPE: PRT
<213> ORGANISM: Artificial Sequence
<220> FEATURE:
<223> OTHER INFORMATION: FR4 region of DX-36699-H20

<400> SEQUENCE: 30

Trp Gly Gln Gly Thr Leu Val Thr Val Ser Ser
1               5                   10

<210> SEQ ID NO 31
<211> LENGTH: 25
<212> TYPE: PRT
<213> ORGANISM: Artificial Sequence
<220> FEATURE:
<223> OTHER INFORMATION: FR1 region of DX-36699-H21

<400> SEQUENCE: 31

Glu Val Gln Leu Leu Glu Ser Gly Gly Gly Leu Val Gln Pro Gly Gly
1               5                   10                  15

Ser Leu Arg Leu Ser Cys Ala Ala Ser
            20                  25

<210> SEQ ID NO 32
<211> LENGTH: 17
<212> TYPE: PRT
<213> ORGANISM: Artificial Sequence
<220> FEATURE:
<223> OTHER INFORMATION: FR2 region of DX-36699-H21

<400> SEQUENCE: 32

Met Arg Trp Tyr Arg Gln Ala Pro Gly Asn Gly Leu Glu Leu Val Ala
1               5                   10                  15

Arg

<210> SEQ ID NO 33
<211> LENGTH: 38
<212> TYPE: PRT
<213> ORGANISM: Artificial Sequence
<220> FEATURE:
<223> OTHER INFORMATION: FR3 region of DX-36699-H21

<400> SEQUENCE: 33

Asp Tyr Ala Asp Ser Val Lys Gly Arg Phe Thr Ile Ser Arg Asp Asn
1               5                   10                  15

Ser Lys Asn Thr Val Tyr Leu Gln Met Asn Ser Leu Lys Pro Glu Asp
            20                  25                  30

Thr Ala Val Tyr Tyr Cys
        35
```

```
<210> SEQ ID NO 34
<211> LENGTH: 11
<212> TYPE: PRT
<213> ORGANISM: Artificial Sequence
<220> FEATURE:
<223> OTHER INFORMATION: FR4 region of DX-36699-H21

<400> SEQUENCE: 34

Trp Gly Gln Gly Thr Leu Val Thr Val Ser Ser
1               5                   10

<210> SEQ ID NO 35
<211> LENGTH: 116
<212> TYPE: PRT
<213> ORGANISM: Artificial Sequence
<220> FEATURE:
<223> OTHER INFORMATION: Amino acid sequence of control antibody 5F9
      heavy chain variable region

<400> SEQUENCE: 35

Gln Val Gln Leu Gln Gln Pro Gly Ala Glu Leu Val Lys Pro Gly Ala
1               5                   10                  15

Ser Val Met Met Ser Cys Lys Ala Ser Gly Tyr Thr Phe Thr Asn Tyr
            20                  25                  30

Asn Met His Trp Val Lys Gln Thr Pro Gly Gln Gly Leu Glu Trp Ile
        35                  40                  45

Gly Thr Ile Tyr Pro Gly Asn Asp Asp Thr Ser Tyr Asn Gln Lys Phe
    50                  55                  60

Lys Asp Lys Ala Thr Leu Thr Ala Asp Lys Ser Ser Ser Ala Ala Tyr
65                  70                  75                  80

Met Gln Leu Ser Ser Leu Thr Ser Glu Asp Ser Ala Val Tyr Tyr Cys
                85                  90                  95

Ala Arg Gly Gly Tyr Arg Ala Met Asp Tyr Trp Gly Gln Thr Ser Val
            100                 105                 110

Thr Val Ser Ser
        115

<210> SEQ ID NO 36
<211> LENGTH: 327
<212> TYPE: PRT
<213> ORGANISM: Artificial Sequence
<220> FEATURE:
<223> OTHER INFORMATION: Amino acid sequence of heavy chain constant
      region of human IgG4 antibody (from UniProt database, sequence
      P1861, with S228P mutation)

<400> SEQUENCE: 36

Ala Ser Thr Lys Gly Pro Ser Val Phe Pro Leu Ala Pro Cys Ser Arg
1               5                   10                  15

Ser Thr Ser Glu Ser Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Lys Thr
65                  70                  75                  80

Tyr Thr Cys Asn Val Asp His Lys Pro Ser Asn Thr Lys Val Asp Lys
                85                  90                  95

Arg Val Glu Ser Lys Tyr Gly Pro Pro Cys Pro Pro Cys Pro Ala Pro
            100                 105                 110
```

```
Glu Phe Leu Gly Gly Pro Ser Val Phe Leu Phe Pro Pro Lys Pro Lys
            115                 120                 125

Asp Thr Leu Met Ile Ser Arg Thr Pro Glu Val Thr Cys Val Val Val
130                 135                 140

Asp Val Ser Gln Glu Asp Pro Glu Val Gln Phe Asn Trp Tyr Val Asp
145                 150                 155                 160

Gly Val Glu Val His Asn Ala Lys Thr Lys Pro Arg Glu Glu Gln Phe
                165                 170                 175

Asn Ser Thr Tyr Arg Val Val Ser Val Leu Thr Val Leu His Gln Asp
            180                 185                 190

Trp Leu Asn Gly Lys Glu Tyr Lys Cys Lys Val Ser Asn Lys Gly Leu
        195                 200                 205

Pro Ser Ser Ile Glu Lys Thr Ile Ser Lys Ala Lys Gly Gln Pro Arg
    210                 215                 220

Glu Pro Gln Val Tyr Thr Leu Pro Pro Ser Gln Glu Glu Met Thr Lys
225                 230                 235                 240

Asn Gln Val Ser Leu Thr Cys Leu Val Lys Gly Phe Tyr Pro Ser Asp
                245                 250                 255

Ile Ala Val Glu Trp Glu Ser Asn Gly Gln Pro Glu Asn Asn Tyr Lys
            260                 265                 270

Thr Thr Pro Pro Val Leu Asp Ser Asp Gly Ser Phe Phe Leu Tyr Ser
        275                 280                 285

Arg Leu Thr Val Asp Lys Ser Arg Trp Gln Glu Gly Asn Val Phe Ser
    290                 295                 300

Cys Ser Val Met His Glu Ala Leu His Asn His Tyr Thr Gln Lys Ser
305                 310                 315                 320

Leu Ser Leu Ser Leu Gly Lys
                325

<210> SEQ ID NO 37
<211> LENGTH: 112
<212> TYPE: PRT
<213> ORGANISM: Artificial Sequence
<220> FEATURE:
<223> OTHER INFORMATION: Amino acid sequence of 5F9 light chain variable
      region

<400> SEQUENCE: 37

Asp Val Leu Met Thr Gln Thr Pro Leu Ser Leu Pro Val Ser Leu Gly
1               5                   10                  15

Asp Gln Ala Ser Ile Ser Cys Arg Ser Ser Gln Ser Ile Val Tyr Ser
            20                  25                  30

Asn Gly Asn Thr Tyr Leu Gly Trp Tyr Leu Gln Lys Pro Gly Gln Ser
        35                  40                  45

Pro Lys Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Leu Gly Val Tyr His Cys Phe Gln Gly
                85                  90                  95

Ser His Val Pro Tyr Thr Phe Gly Gly Gly Thr Lys Val Glu Ile Lys
            100                 105                 110

<210> SEQ ID NO 38
<211> LENGTH: 107
<212> TYPE: PRT
```

```
<213> ORGANISM: Artificial Sequence
<220> FEATURE:
<223> OTHER INFORMATION: Amino acid sequence of light chain constant
      region (UniProt database, sequence P01834)

<400> SEQUENCE: 38

Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105

<210> SEQ ID NO 39
<211> LENGTH: 229
<212> TYPE: PRT
<213> ORGANISM: Artificial Sequence
<220> FEATURE:
<223> OTHER INFORMATION: Amino acid sequence from heavy chain hinge
      region to CH3 domain of human IgG4 antibody (from UniProt
      database, sequence P1861, with S228P mutation)

<400> SEQUENCE: 39

Glu Ser Lys Tyr Gly Pro Pro Cys Pro Pro Cys Pro Ala Pro Glu Phe
1               5                   10                  15

Leu Gly Gly Pro Ser Val Phe Leu Phe Pro Pro Lys Pro Lys Asp Thr
            20                  25                  30

Leu Met Ile Ser Arg Thr Pro Glu Val Thr Cys Val Val Val Asp Val
        35                  40                  45

Ser Gln Glu Asp Pro Glu Val Gln Phe Asn Trp Tyr Val Asp Gly Val
    50                  55                  60

Glu Val His Asn Ala Lys Thr Lys Pro Arg Glu Glu Gln Phe Asn Ser
65                  70                  75                  80

Thr Tyr Arg Val Val Ser Val Leu Thr Val Leu His Gln Asp Trp Leu
                85                  90                  95

Asn Gly Lys Glu Tyr Lys Cys Lys Val Ser Asn Lys Gly Leu Pro Ser
            100                 105                 110

Ser Ile Glu Lys Thr Ile Ser Lys Ala Lys Gly Gln Pro Arg Glu Pro
        115                 120                 125

Gln Val Tyr Thr Leu Pro Pro Ser Gln Glu Glu Met Thr Lys Asn Gln
    130                 135                 140

Val Ser Leu Thr Cys Leu Val Lys Gly Phe Tyr Pro Ser Asp Ile Ala
145                 150                 155                 160

Val Glu Trp Glu Ser Asn Gly Gln Pro Glu Asn Asn Tyr Lys Thr Thr
                165                 170                 175

Pro Pro Val Leu Asp Ser Asp Gly Ser Phe Phe Leu Tyr Ser Arg Leu
            180                 185                 190

Thr Val Asp Lys Ser Arg Trp Gln Glu Gly Asn Val Phe Ser Cys Ser
        195                 200                 205
```

```
-continued

Val Met His Glu Ala Leu His Asn His Tyr Thr Gln Lys Ser Leu Ser
    210                 215                 220

Leu Ser Leu Gly Lys
225
```

HUMAN CD47-TARGETING SINGLE-DOMAIN ANTIBODY AND USE THEREOF

FIELD OF THE INVENTION

The present application belongs to the field of monoclonal antibodies, and in particular relates to a single-domain antibody targeting human CD47 and use thereof in disease diagnosis and treatment.

BACKGROUND OF THE INVENTION

CD47 is a cell membrane surface protein that belongs to the immunoglobulin superfamily and can bind to integrins, thrombospondin-1 (TSP-1) and SIRP family proteins (Signal regulatory protein, comprising SIRPα, SIRPβ and SIRPγ), therefore, CD47 is also known as an integrin-associated protein (TAP). CD47 protein has a pentaspan-transmembrane structure, and its extracellular segment is an Ig-like domain ($NH_2$ terminal), which can interact with SIRPα. CD47 is widely expressed in various normal tissues, comprising cerebral cortex, cerebellum, bladder, prostate, fallopian tube, tonsil, salivary gland, rectum, testis, epididymis, breast, cervix, placenta, thymus, appendix, bone marrow, lymph node, spleen, cardiac muscle, bone muscle, bronchus, gallbladder, pancreas, oral mucosa, esophagus, stomach, small intestine, kidney, endometrium, ovary, soft tissue, skin, erythrocytes, platelets, etc. CD47 is also expressed in a variety of tumor tissues, and compared with the expression level in normal tissues, the expression level of CD47 is significantly increased in acute myeloid leukemia AML, chronic myeloid leukemia CML, acute lymphoblastic leukemia ALL, non-Hodgkin's lymphoma NHL, gastric cancer, multiple myeloma, prostate cancer and other tumor cells, which can be used as a negative correlation factor for the prognosis of tumor patients (Annu. Rev. Immunol. 2014. 32: 25-50). Compared with the widespread expression of CD47 in various tissues, the expression of SIRPα is more limited, and it is only expressed in monocytes, macrophages, granulocytes, dendritic cells, myeloid progenitor cells and some neuronal cells, and its expression levels are relatively stable in various immune states.

The interaction between CD47 and SIRPα is an important part of the body's immune recognition, which plays an important role in the body's recognition of "self" and the realization of immune homeostasis. The immune system recognizes and distinguishes "self" and "non-self" substances through a series of receptor molecules on the surface of cells, develops immune tolerance to "self" substances, and makes corresponding immune responses to "non-self" substances. In the innate immune system, SIRPα is an inhibitory receptor expressed on the surface of macrophages. After its ligand CD47 binds to SIRPα, it can activate SIRPα and transmit "don't eat me" inhibitory signals downstream through ITIM in its intracellular segment, thereby inhibiting the phagocytosis of CD47-expressing cells by macrophages (CurrOpin Immunol. 2009. 21:37-52). Therefore, due to the high levels of CD47 molecules on their surface, tumor cells are recognized as "self" by macrophages and cannot be recognized and eliminated by the innate immune system. At the same time, due to the antibody presentation function of macrophages, CD47 on the surface of tumor cells also inhibits the presentation of tumor-associated antigens by macrophages to T cells, which indirectly affects the recognition of tumor cells by the adaptive immune system. Blocking the interaction of CD47 with SIRPα with monoclonal antibodies or fusion proteins can be used as a therapeutic method to activate the innate immune system, allowing macrophages to re-recognize and eliminate tumor cells.

At present, several monoclonal antibodies or SIRPα fusion proteins targeting CD47 have entered clinical trials, comprising TTI-621, Hu5F9-G4 (obtained by humanizing the human-mouse chimeric antibody 5F9), CC90002, SRF-231, SHR-1603, IBI188, etc. However, since CD47 is also expressed in erythrocytes and platelets, many CD47 monoclonal antibodies and SIRPα fusion proteins also have the characteristics of binding to erythrocytes and platelets, and have shown drug safety issues in clinical trials. TTI-621 is a SIRPα (IgG1 Fc) fusion protein composed of the CD47 binding domain of SIRPα and the Fc region of human immunoglobulin IgG1. In a phase I clinical study, subjects experienced dose-dependent thrombocytopenia (N Engl J Med. 2018. 379:1711-1721). Hu5F9-G4 is a humanized monoclonal antibody targeting CD47. In a phase I clinical study, subjects developed grade 1-2 anemia and grade 3 hyperbilirubinemia (J Clin Oncol. 2019. 12:946-953). Therefore, it is necessary to develop a new generation of CD47 antibodies to improve the above-mentioned side effects in the clinic.

In 1993, a class of IgG2 with a relative molecular mass of about 92 kDa and IgG3 with a relative molecular mass of about 90 kDa were found in the humoral immune system of the Mammalian Camelidae, both of which are homo-dimeric heavy-chains. Antibodies that naturally lack light chains are also known as heavy-chain antibodies (HCAbs). After 1995, new or nurse shark antigen receptor (NAR) similar to HCAb without light chain or other protein molecules were found in nurse shark (*Ginglymostoma cirratum*), *Orectolobus maculatus*, silver shark, ray and other cartilaginous fish. Because the NAR molecule is similar to the Ig subtype in several functional characteristics such as transmembrane and secretion mode, it is also called Ig new antigen receptor, (Ig-NAR). HCAbs or IgNARs that retain antigen-binding activity can be obtained through genetic engineering techniques, collectively referred to as single-domain antibodies (sdAbs), also known as nanobodies (Nbs), domain antibodies (dAbs) or unibodies. There are three main types of sdAbs obtained by genetic engineering. The first type is HCAbs obtained from camelid animals, which retain complete antigen-binding activity and are the smallest natural antibody fragments. In HCAb, the antibody composed of the heavy chain variable region that binds to a single-domain of the antigen is called a single-domain heavy chain antibody (variable domain of the heavy-chain of heavy-chain antibody, VHH). The second type is IgNAR obtained from cartilaginous fish such as sharks, denoted by $V_{NAR}$. The third type is the heavy or light chain variable region obtained from human or murine monoclonal antibodies, although they retain the antigen-binding specificity, their affinity and solubility are greatly reduced, and they cannot meet the needs of treatment.

In alpacas, HCAb prevents the translation of functional CH1 due to the presence of a stop codon and a frameshift mutation at the CH1 exon/intron junction of H-chain, as a result, the CH1 exon cannot be spliced with the hinge region exon, resulting in a CH1 deletion between the heavy chain variable region and the hinge region. Thus, HCAbs of camelid animals consist of a single variable region, a hinge region and two constant regions (CH2 and CH3). The charged/polar hydrophilic amino acid residues in FR2 of the VHH of camelid animals replace the hydrophobic amino acid residues in the VH. This substitution partially eliminates the agglutination tendency of VHH. Due to the absence of CH1 and hydrophilic substitution, the hydrophobic interaction between the heavy chain and the light chain cannot be formed, and the paired dimerization cannot be formed, so the HCAb has only the unique antigen-binding domain VHH, and the structure is compact.

The CD47 single-domain antibody has attracted much attention due to its simple structure, small molecular weight, good tissue penetration, weak immunogenicity, and strong stability. The CD47 single-domain antibody with good specificity and affinity without the side effects of erythrocyte agglutination and hemolysis and weakly binding to platelets is expected to be obtained.

SUMMARY OF THE INVENTION

The present application provides a CD47 single-domain antibody that does not bind to human erythrocytes, which acts as a CD47-SIRPα pathway blocker in vivo or in vitro. The CD47 heavy chain single-domain antibody of the present application not only has the characteristics of high specificity and strong affinity, but also does not bind to erythrocytes, avoiding the side effects of erythrocyte agglutination and hemolysis, and has extremely weak binding to platelets, thereby helping to reduce side effects of platelet reduction. Therefore, it is expected to be developed as an effective drug with greatly reduced side effects for the treatment of CD47-related cancer diseases.

The present application specifically relates to:

1. An anti-CD47 heavy chain single-domain antibody (VHH), comprising CDRs of the following:
   (1) CDR1, CDR2 and CDR3 as shown by SEQ ID NO:1, SEQ ID NO:2, and SEQ ID NO:3 respectively; or
   (2) CDR1, CDR2 and CDR3 as shown by SEQ ID NO:6, SEQ ID NO:7, and SEQ ID NO:8 respectively.

In some embodiments, the anti-CD47 heavy chain single-domain antibody (VHH) comprises an amino acid sequence that is at least 90%, at least 95%, at least 96%, at least 97%, at least 98%, or at least 99% identical to CDRs of the following:
   (1) CDR1, CDR2 and CDR3 as shown by SEQ ID NO:1, SEQ ID NO:2, and SEQ ID NO:3 respectively; or
   (2) CDR1, CDR2 and CDR3 as shown by SEQ ID NO:6, SEQ ID NO:7, and SEQ ID NO:8 respectively.

2. The anti-CD47 heavy chain single-domain antibody of item 1, comprising FR1, FR2, FR3, and FR4. In some embodiments, FR1, FR2, FR3, and FR4 are FR1, FR2, FR3, and FR4 consensus sequences of human immunoglobulin VH variable sequence subgroup III.

3. The anti-CD47 heavy chain single-domain antibody of item 1 or 2, which is humanized.

4. The anti-CD47 heavy chain single-domain antibody of item 3, wherein the FR1 comprises an amino acid sequence selected from any one of the following: SEQ ID NO. 19, SEQ ID NO. 23, SEQ ID NO. 27 and SEQ ID NO. 31; the FR2 comprises an amino acid sequence selected from any one of the following: SEQ ID NO. 20, SEQ ID NO. 24, SEQ ID NO. 28 and SEQ ID NO. 32; the FR3 comprises an amino acid sequence selected from any one of the following: SEQ ID NO. 21, SEQ ID NO. 25, SEQ ID NO.29 and SEQ ID NO.33; and the FR4 comprises an amino acid sequence selected from any one of the following: SEQ ID NO.22, SEQ ID NO.26, SEQ ID NO.30 and SEQ ID NO.34.

5. The anti-CD47 heavy chain single-domain antibody of any one of items 1-4, comprising an amino acid sequence selected from any one of the following: SEQ ID NO:4, SEQ ID NO:9, SEQ ID NO:15, SEQ ID NO:16, SEQ ID NO: 17, and SEQ ID NO: 18.

In some embodiments, the anti-CD47 heavy chain single-domain antibody comprises an amino acid sequence that is at least 80%, at least 85%, at least 90%, at least 95%, at least 96%, at least 97%, at least 98%, or at least 99% identical to an amino acid sequence selected from any one of the following: SEQ ID NO:4, SEQ ID NO:9, SEQ ID NO:15, SEQ ID NO:16, SEQ ID NO:17, and SEQ ID NO:18. In some embodiments, the anti-CD47 heavy chain single-domain antibody comprises a conservatively mutated amino acid sequence of an amino acid sequence selected from any one of the following: SEQ ID NO:4, SEQ ID NO:9, SEQ ID NO:15, SEQ ID NO:16, SEQ ID NO: 17, and SEQ ID NO: 18.

6. The anti-CD47 heavy chain single-domain antibody of item 5, further comprising a region in the heavy chain Fc region selected from the group consisting of: hinge region, CH2 and CH3.

7. The anti-CD47 heavy chain single-domain antibody of item 6, wherein the heavy chain is IgG1 or IgG4.

In some embodiments, the anti-CD47 heavy chain single-domain antibody of the present application comprises an amino acid sequence selected from any one of the following: SEQ ID NO:4, SEQ ID NO:9, SEQ ID NO:15, SEQ ID NO:16, SEQ ID NO: 17, and SEQ ID NO: 18; and an amino acid sequence selected from any one of the following: SEQ ID NO: 14, and SEQ ID NO: 39.

In some embodiments, the anti-CD47 heavy chain single-domain antibodies of the present application are bivalent VHH-Fc fusion antibodies.

8. A conjugate, comprising the anti-CD47 heavy chain single-domain antibody of any one of items 1-7 or antigen-binding fragment thereof.

In some of the above schemes, the antigen-binding fragment of the anti-CD47 heavy chain single-domain antibody comprises or consists of a VHH domain thereof.

9. The conjugate of item 8, wherein the anti-CD47 heavy chain single-domain antibody or antigen-binding fragment thereof is conjugated to a drug, a toxin, a cytotoxic agent, a stimulator of interferon gene (STING) receptor agonist, a cytokine, a radionuclide or an enzyme.

10. A fusion protein, comprising the anti-CD47 heavy chain single-domain antibody of any one of items 1-7 or antigen-binding fragment thereof.

11. The fusion protein of item 10, wherein the anti-CD47 heavy chain single-domain antibody or antigen-binding fragment thereof is fused to a diagnostic molecule or therapeutic molecule.

12. A polynucleotide encoding the anti-CD47 heavy chain single-domain antibody of any one of items 1-7 or antigen-binding fragment thereof.

13. A vector comprising the polynucleotide of item 12.

14. The vector of item 13, which is a bacteriophage, a bacteria or a yeast.

15. A host cell comprising the polynucleotide of item 12 or the vector of any one of items 13-14.

16. The host cell of item 15, which is a prokaryotic or eukaryotic host cell

17. The host cell of item 16, which is an *Escherichia coli*.

18. A method for producing the anti-CD47 heavy chain single-domain antibody of any one of items 1-7, comprising at least the steps of: (a) culturing the host cell of claim 16 (e.g., *Escherichia coli*); and (b) isolating the anti-CD47 heavy chain single-domain antibody from the culture.

19. Use of the single-domain antibody of any one of items 1-7, the conjugate of any one of claims 8-9, or the fusion protein of any one of items 10-11 in the preparation of a medicament for treating a tumor.

20. The anti-CD47 heavy chain single-domain antibody of any one of items 1-7 with a diagnostic label.

21. The anti-CD47 heavy chain single-domain antibody of claim 20, wherein the diagnostic label is selected from the group consisting of: an isotope, a colloidal gold label, a colored label, and a fluorescent label.

22. A pharmaceutical composition, comprising the anti-CD47 heavy chain single-domain antibody of any one of items 1-7, the conjugate of any one of claims 8-9, or the fusion protein of any one of items 10-11.

23. An article of manufacture or a kit for detecting CD47 protein, comprising the anti-CD47 heavy chain single-domain antibody of any one of items 1-7 and 20-21 or antigen-binding fragment thereof.

24. Use of the anti-CD47 heavy chain single-domain antibody of any one of items 1-7 and 20-21 or antigen-binding fragment thereof in the preparation of an article of manufacture or a kit for detecting CD47 protein.

25. A method for treating a cancer, comprising administering to a subject an effective amount of the article of manufacture single-domain antibody of any one of items 1-7, the conjugate of any one of items 8-9, or the fusion protein of any one of items 10-11.

26. The method of item 25, wherein the article of manufacture single-domain antibody, the conjugate or the fusion protein can be used in combination with one or more other antibodies or drugs.

27. The method of item 26, wherein the one or more other antibodies are checkpoint antibodies.

In addition, this application also relates to:

1. A CD47-binding construct or antibody polypeptide, comprising a heavy chain single-domain antibody (VHH) comprising CDRs of the following:
   (1) CDR1, CDR2 and CDR3 as shown by SEQ ID NO:1, SEQ ID NO:2, and SEQ ID NO:3 respectively; or
   (2) CDR1, CDR2 and CDR3 as shown by SEQ ID NO:6, SEQ ID NO:7, and SEQ ID NO:8 respectively.

In some embodiments, the CD47-binding construct or antibody polypeptide comprises an amino acid sequence that is at least 90%, at least 95%, at least 96%, at least 97%, at least 98%, or at least 99% identical to CDRs of the following:
   (1) CDR1, CDR2 and CDR3 as shown by SEQ ID NO:1, SEQ ID NO:2, and SEQ ID NO:3 respectively; or
   (2) CDR1, CDR2 and CDR3 as shown by SEQ ID NO:6, SEQ ID NO:7, and SEQ ID NO:8 respectively.

2. The CD47-binding construct or antibody polypeptide of item 1, comprising amino acid sequences of heavy chain variable regions FR1, FR2, FR3, and FR4 of antibodies.

3. The CD47-binding construct or antibody polypeptide of item 1 or 2, comprising FR1, FR2, FR3, and FR4 consensus sequences of human immunoglobulin VH variable sequence subgroup III.

4. The CD47-binding construct or antibody polypeptide of item 3, wherein the FR1 comprises an amino acid sequence selected from any one of the following: SEQ ID NO. 19, SEQ ID NO. 23, SEQ ID NO. 27 and SEQ ID NO. 31; the FR2 comprises an amino acid sequence selected from any one of the following: SEQ ID NO.20, SEQ ID NO.24, SEQ ID NO.28 and SEQ ID NO.32; the FR3 comprises an amino acid sequence selected from any one of the following: SEQ ID NO.21, SEQ ID NO.25, SEQ ID NO.29 and SEQ ID NO.33; and the FR4 comprises an amino acid sequence selected from any one of the following: SEQ ID NO.22, SEQ ID NO.26, SEQ ID NO.30 and SEQ ID NO.34.

5. The CD47-binding construct or antibody polypeptide of any one of items 1-4, comprising an amino acid sequence selected from any one of the following: SEQ ID NO: 4, SEQ ID NO: 9, SEQ ID NO: 15, SEQ ID NO: 16, SEQ ID NO: 16, ID NO: 17, and SEQ ID NO: 18.

In some embodiments, the CD47-binding construct or antibody polypeptide comprises an amino acid sequence that is at least 80%, at least 85%, at least 90%, at least 95%, at least 96%, at least 97%, at least 97%, at least 98%, or at least 99% identical to an amino acid sequence selected from any one of the following: SEQ ID NO:4, SEQ ID NO:9, SEQ ID NO:15, SEQ ID NO:16, SEQ ID NO:17, and SEQ ID NO:18. In some embodiments, the anti-CD47 heavy chain single-domain antibody comprises a conservatively mutated amino acid sequence of an amino acid sequence selected from any one of the following: SEQ ID NO:4, SEQ ID NO:9, SEQ ID NO:15, SEQ ID NO:16, SEQ ID NO: 17, and SEQ ID NO: 18.

6. The CD47-binding construct or antibody polypeptide of item 5, further comprising a region in the heavy chain Fc region selected from the group consisting of: hinge region, CH2 and CH3. 7. The CD47-binding construct or antibody polypeptide of item 6, wherein the heavy chain is IgG1 or IgG4.

In some embodiments, the CD47-binding construct or antibody polypeptide comprises an amino acid sequence selected from any one of the following: SEQ ID NO:4, SEQ ID NO:9, SEQ ID NO:15, SEQ ID NO:16, SEQ ID NO: 17, and SEQ ID NO: 18; and an amino acid sequence selected from any one of the following: SEQ ID NO: 14, and SEQ ID NO: 39. In some embodiments, the CD47-binding construct or antibody polypeptide is a bivalent VHH-Fc fusion antibody.

In some embodiments, the CD47-binding construct or antibody polypeptide is a VHH-Fc fusion construct or antibody polypeptide, or a bivalent VHH-Fc fusion construct or antibody polypeptide.

8. A conjugate, comprising the CD47-binding construct or antibody polypeptide of any one of items 1-7 or antigen-binding fragment thereof.

In some of the above schemes, the antigen-binding fragment of the CD47-binding construct or antibody polypeptide comprises or consists of a VHH domain thereof.

9. The conjugate of item 8, wherein the CD47-binding construct or antibody polypeptide or antigen-binding fragment thereof is conjugated with a drug, a toxin, a cytotoxic agent, a stimulator of interferon gene (STING) receptor agonist, a cytokine, a radionuclide or an enzyme.

10. A fusion protein comprising the CD47-binding construct or antibody polypeptide of any one of items 1-7 or antigen-binding fragment thereof.

11. The fusion protein of item 10, wherein the CD47-binding construct or antibody polypeptide or antigen-binding fragment thereof is fused to a diagnostic molecule or therapeutic molecule.

12. A polynucleotide encoding the CD47-binding construct or antibody polypeptide of any one of items 1-7 or antigen-binding fragment thereof.

13. A vector comprising the polynucleotide of item 12.

14. The vector of item 13, which is a bacteriophage, a bacteria or a yeast.

15. A host cell, comprising the polynucleotide of item 12 or the vector of any one of items 13-14.

16. The host cell of item 15, which is a prokaryotic or eukaryotic host cell.

17. The host cell of item 16, which is an *Escherichia coli*.

18. A method for producing the anti-CD47 heavy chain construct or antibody polypeptide of any one of items 1-7, comprising at least the steps of: (a) culturing the host cell (e.g., *Escherichia coli*) of item 16; and (b) isolating the anti-CD47 heavy chain construct or antibody polypeptide from the culture.

19. Use of the CD47-binding construct or antibody polypeptide of any one of items 1-7, the conjugate of any one of items 8-9, or the fusion protein of any one of items 10-11 for preparing a medicament for treating a tumor.

20. The anti-CD47 heavy chain construct or antibody polypeptide of any of items 1-7 with a diagnostic label.

21. The anti-CD47 heavy chain construct or antibody polypeptide of item 20, wherein the diagnostic label is selected from the group consisting of: an isotope, a colloidal gold label, a colored label, and a fluorescent label.

22. A pharmaceutical composition, comprising the CD47-binding construct or antibody polypeptide of any one of items 1-7, the conjugate of any one of items 8-9, or the fusion protein of any one of items 10-11.

23. An article of manufacture or a kit for detecting CD47 protein, comprising the CD47-binding construct or antibody polypeptide of any one of items 1-7 and 20-21 or antigen-binding fragment thereof.

24. Use of the CD47-binding construct or antibody polypeptide of any one of items 1-7 and 20-21 or antigen-binding fragment thereof in the preparation of an article of manufacture or a kit for detecting CD47 protein.

25. A method of treating cancer, comprising administering to a subject an effective amount of the construct or antibody polypeptide of any one of items 1-7, the conjugate of any one of items 8-9, or the fusion protein of any one of items 10-11.

26. The method of item 25, wherein the CD47-binding construct or antibody polypeptide, conjugate or fusion protein can be used in combination with one or more other antibodies or drugs.

27. The method of item 26, wherein the one or more other antibodies are checkpoint antibodies.

Figure 14:
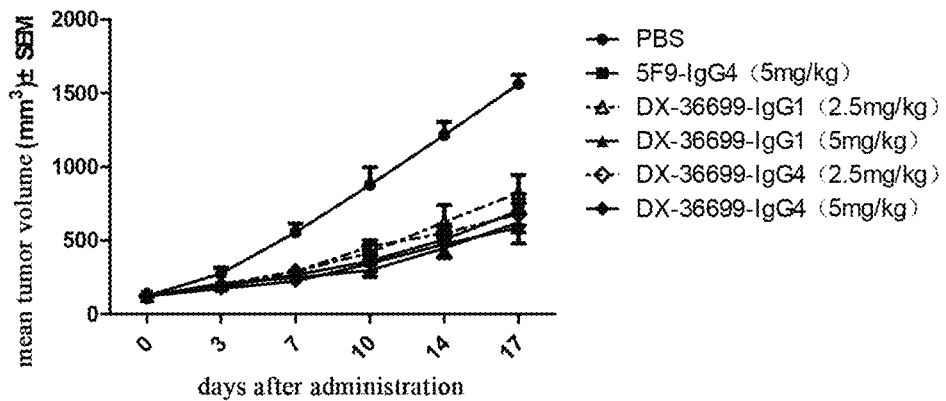

FIG. 14. The change curve of tumor volume in mice after administration of DX-36699 antibody and control antibody 5F9. Compared with the PBS group, both the 5F9 and DX-36699 groups can significantly inhibit the increase in tumor volume after administration, and the inhibitory activities of DX-36699 and 5F9 are similar, the activity of different subtypes of DX-36699 is not significantly different in this model.

Figure 15:
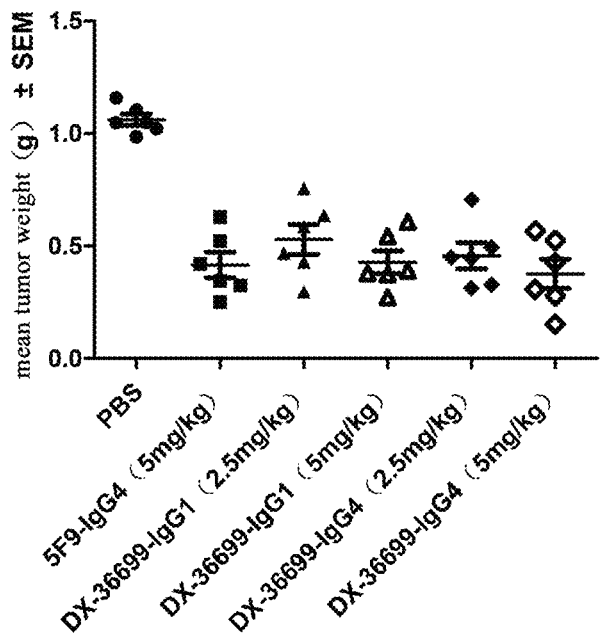

FIG. 15. The change curve of tumor weight in mice after administration of DX-36699 antibody and control antibody 5F9. Compared with the PBS group, both the 5F9 and DX-36699 groups can significantly inhibit the increase in tumor weight after administration, and the inhibitory activities of DX-36699 and 5F9 are similar, the activity of different subtypes of DX-36699 is not significantly different in this model.

Figure 16:
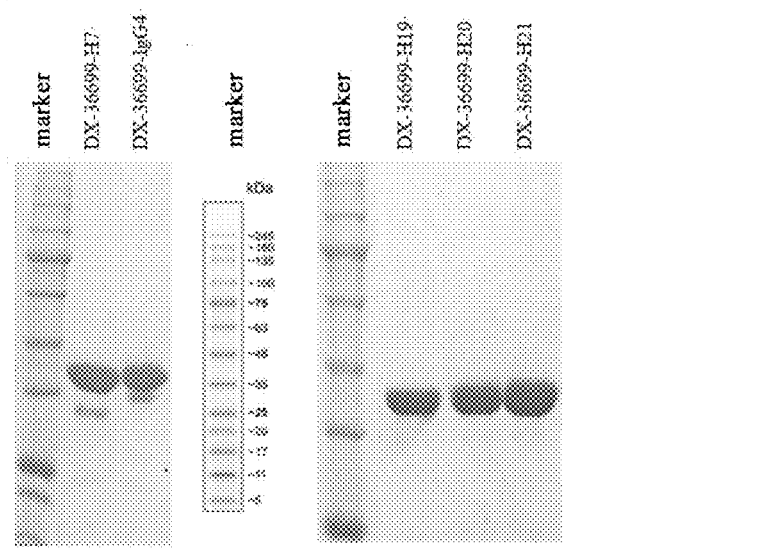

FIG. 16. The purified humanized VHH-Fc fusion bivalent recombinant antibodies (IgG4 subtype) are identified by the reduced SDS-PAGE. The target product is a symmetrical diabody, each single chain molecular weight is 37 kD-39 kD.

Figure 17:
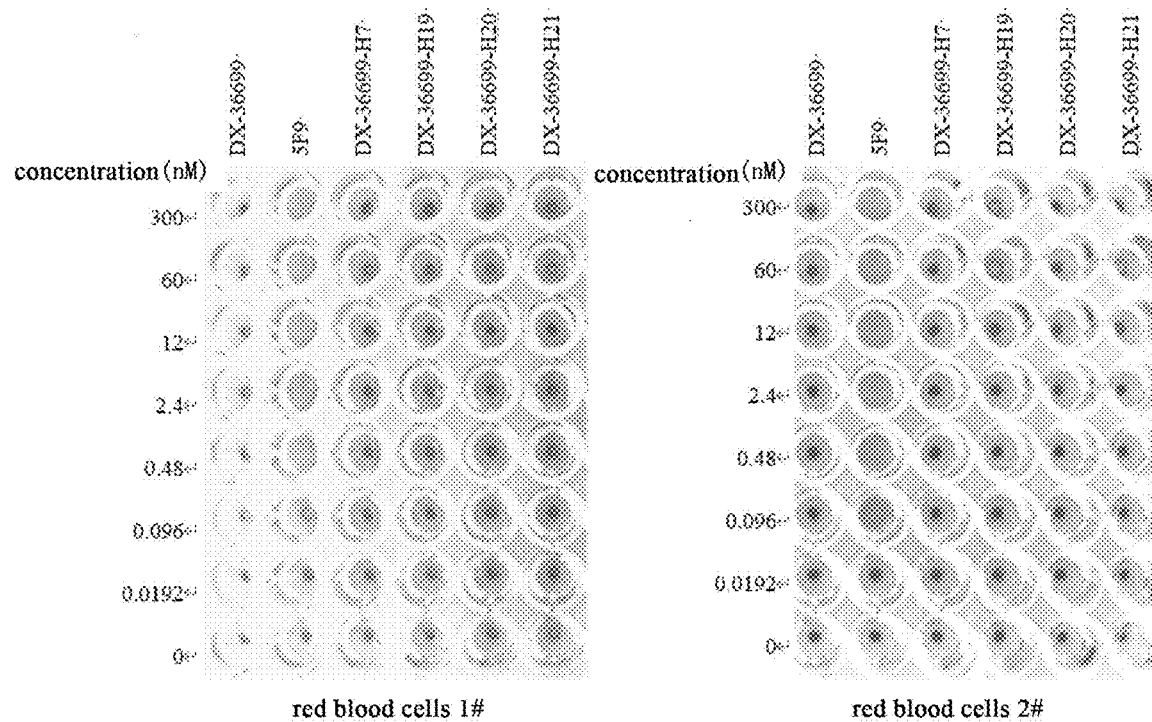

FIG. 17. In vitro erythrocyte agglutination assay results. The control antibody 5F9 causes severe agglutination of erythrocytes at concentrations of 0.096 nM and above in human erythrocytes from 2 different individuals (the agglutination is clustered and spread to the bottom of the well), while the 4 humanized antibodies and DX-36699 both do not cause erythrocytes to agglutinate at concentrations up to 300 nM (under the action of gravity, they naturally settle on the bottom of the U-shaped well, forming a dot in the center of the bottom).

Figure 18A:
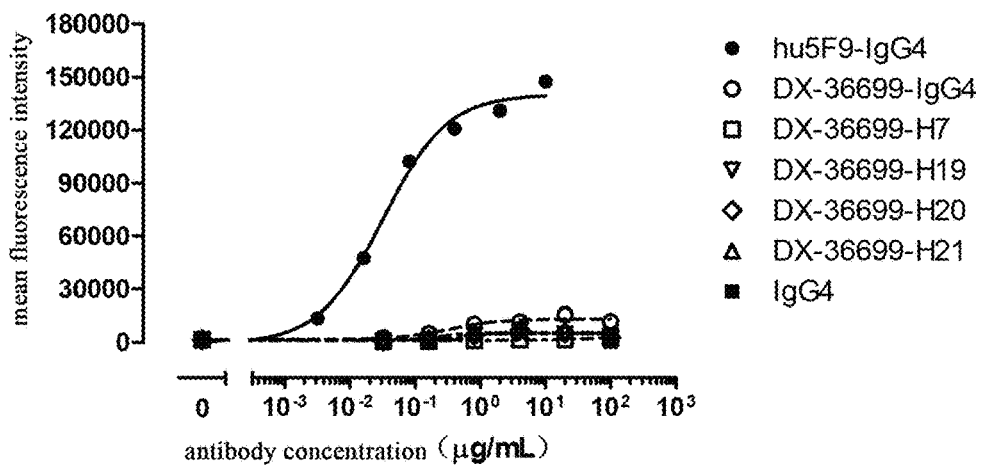
Figure 18B:
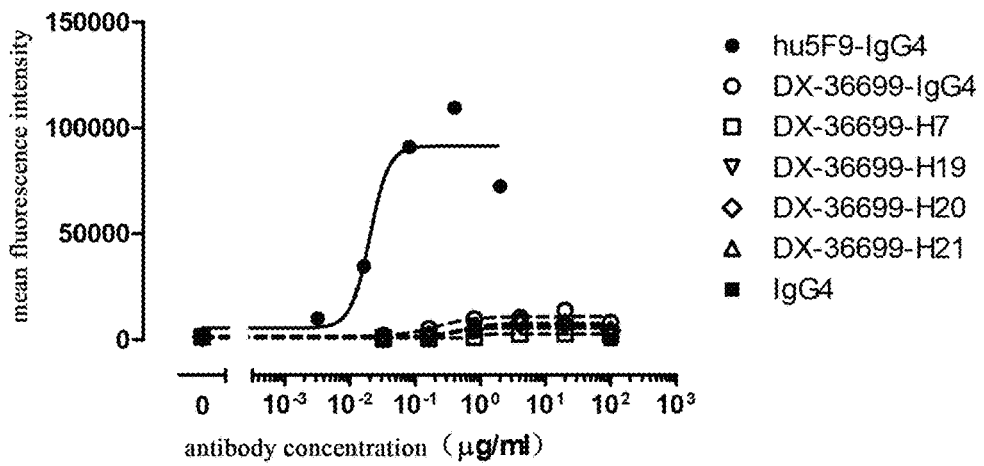

FIG. 18. The binding of DX-36699 before and after humanization and 5F9 antibody to human erythrocytes (FIG. 18a and FIG. 18b represent erythrocytes from two different individuals) is detected by flow cytometry. 5F9 binds to human erythrocytes in a concentration-dependent manner, DX-36699 and the four humanized antibodies only weakly bind to erythrocytes in the concentration range of 0.032-100 m/mL.

Figure 19:
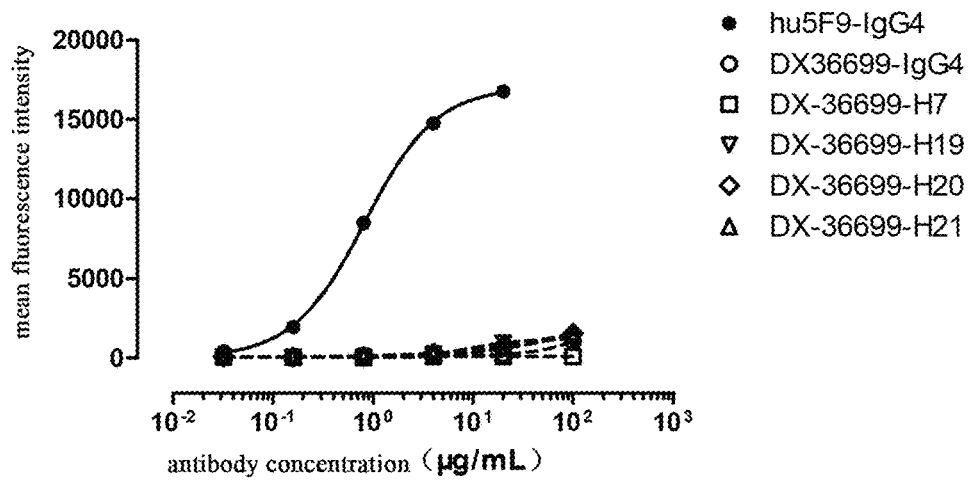

FIG. 19. The binding of DX-36699 before and after humanization and 5F9 antibody to human platelets is detected by flow cytometry. 5F9 binds to human platelets in a concentration-dependent manner, DX-36699 and the four humanized antibodies only weakly bind to platelets in the concentration range of 0.032-100 m/mL.

Figure 20:
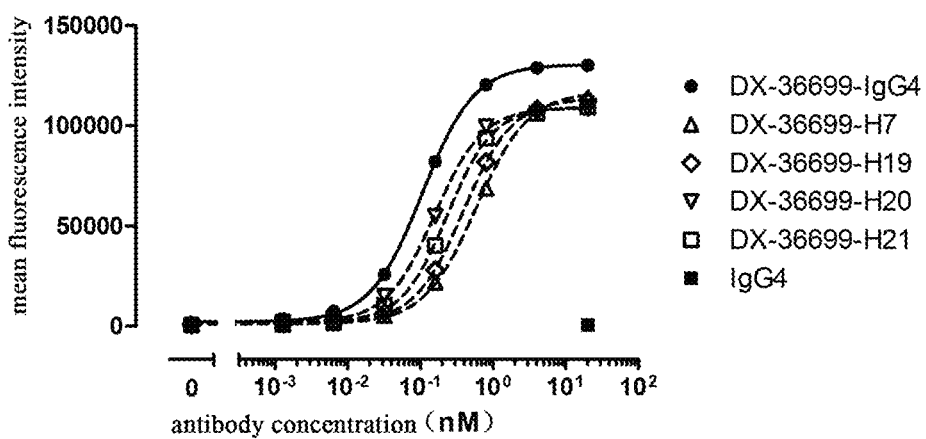

FIG. 20. The binding of four humanized antibodies to Jurkat cells (positive for CD47) is detected by flow cytometry and compared with the original antibody DX-36699. In the concentration range of 0.00128-20 nM, the four humanized antibodies all bind to Jurkat cells in a concentration-dependent manner.

Figure 21:
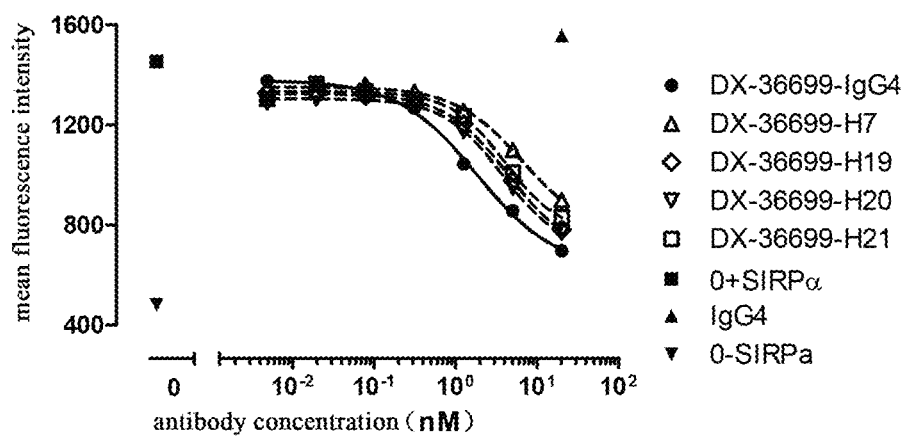

FIG. 21. The activity of 4 humanized antibodies to block the interaction between SIRPα recombinant protein and CD47 positive cells (Jurkat) is detected by flow cytometry and compared with the original antibody DX-36699. In the concentration range of 0.00488-20 nM, the four humanized antibodies block the interaction between SIRPα and Jurkat cells in a concentration-dependent manner.

Figure 22:
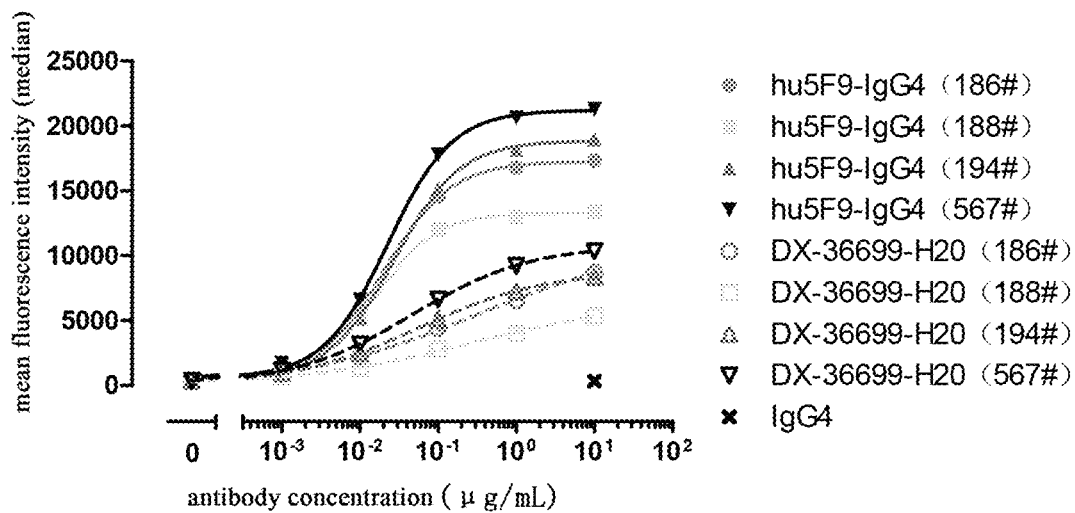

FIG. 22. The binding of humanized antibodies DX-36699-H20 and 5F9 antibodies to cynomolgus macaque erythrocytes from 4 different individuals is detected by flow cytometry. 5F9 binds to the cynomolgus macaque erythrocytes in a concentration-dependent manner, and the binding activity is significantly higher than that of DX-36699-H20 to the same cynomolgus macaque individual. DX-36699-H20 has relatively weak binding to the cynomolgus macaque erythrocytes.

Figure 23:
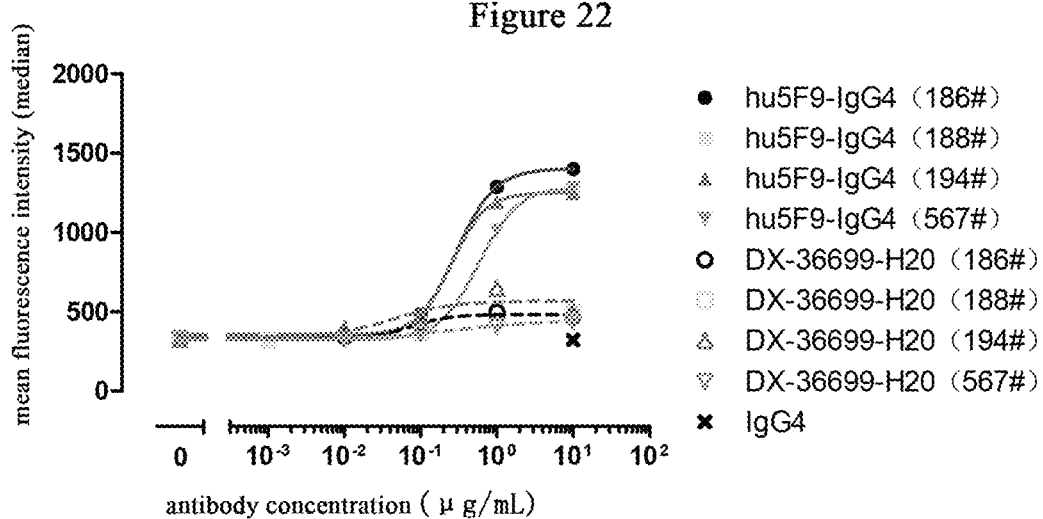

FIG. 23. The binding of humanized antibodies DX-36699-H20 and 5F9 antibodies to cynomolgus macaque platelets from 4 different individuals is detected by flow cytometry. 5F9 binds to the cynomolgus macaque platelets in a concentration-dependent manner, and DX-36699-H20 can hardly be detected to bind to the cynomolgus macaque platelets within the tested concentration range.

Figure 24:
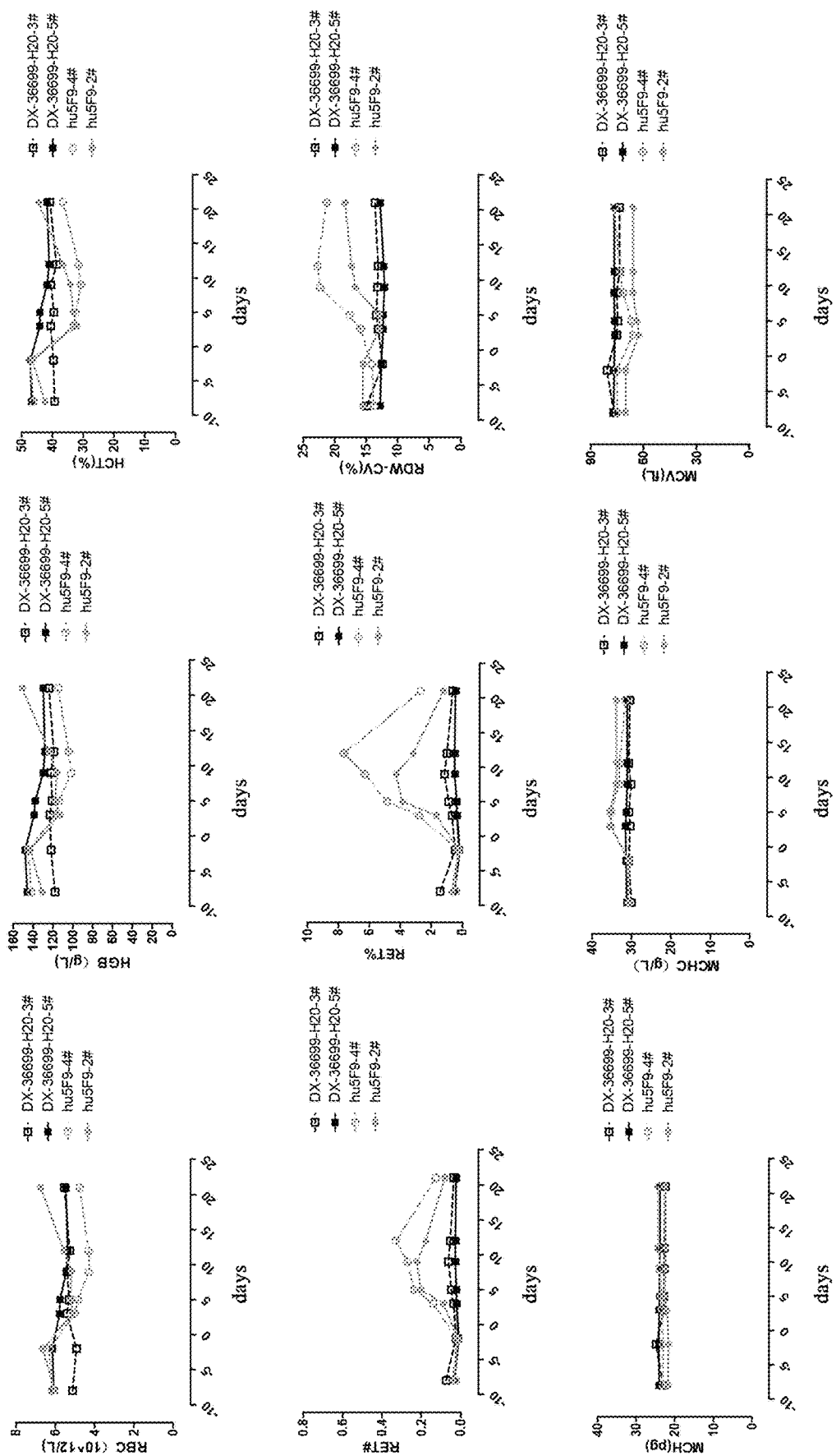

FIG. 24. The changes of various parameters related to erythrocytes at various time points before and after intravenous injection of DX-36699-H20 or 5F9 in cynomolgus macaques is detected by blood routine analyzer. After intravenous injection of 5F9, the erythrocyte count, hemoglobin concentration and hematocrit of cynomolgus macaque all decreases, while the reticulocyte count and proportion increases, which can be recovered to pre-drug levels 2 to 3 weeks after administration. DX-36699-H20 has no effect on all detection indicators.

DETAIL DESCRIPTION OF THE INVENTION

It should be noted that certain terms are used in the specification and claims to refer to specific components. It should be understood by those skilled in the art that the same component may be referred to by different nouns. The present specification and claims do not use the difference of nouns as a way of distinguishing components, but use the difference in function of the components as a criterion for distinguishing. As referred to throughout the specification and claims, "comprising" or "including" is an open-ended term and should be interpreted as "comprising but not limited to". Subsequent descriptions in the specification are preferred embodiments for implementing the present application, however, the descriptions are for the purpose of general principles of the specification and are not intended to limit the scope of the present application. The scope of protection of the present application shall be defined by the appended claims.

Through in-depth research and extensive screening, the applicant has successfully obtained a CD47 single-domain heavy chain antibody that can effectively bind to CD47 and avoid the side effects of hemolysis. Accordingly, the present application relates to single-domain heavy chain antibodies that bind CD47 molecules, and proteins and polypeptides comprising said sdAbs, and nucleic acids encoding said single-domain antibodies, proteins and polypeptides, vectors, host cells, and sdAb-comprising compositions, and use thereof.

I. CD47 Single-Domain Heavy Chain Antibody

One aspect of the present application relates to an anti-CD47 single-domain heavy chain antibody (VHH), or a CD47 single-domain antibody (VHH) for short.

"Single-domain antibody (sdAb)", or "variable domain of the heavy-chain of heavy-chain antibody (VHH)" is generally defined as a polypeptide or protein comprising an amino acid sequence consisting of four framework regions interrupted by three complementarity determining regions, which is represented by FR1-CDR1-FR2-CDR2-FR3-CDR3-FR4. According to the general numbering scheme for VH domains given by Kabat et al. ("Sequence of proteins of immunological interest," US Public Health Services, NIH Bethesda, MID, Publication No. 91), FR1 of the sdAb comprises amino acid residues at positions 1-30, CDR1 of the sdAb comprises amino acid residues at positions 31-36, FR2 of the sdAb comprises amino acid residues at positions 36-49, CDR2 of the sdAb comprises amino acid residues at positions 50-65, FR3 of the sdAb comprises amino acid residues at positions 66-94, CDR3 of the sdAb comprises amino acid residues at positions 95-102, and FR4 of the sdAb comprises amino acid residues at positions 103-113. The sdAbs of the present application also encompass polypeptides or proteins comprising the amino acid sequence of the sdAb. For example, the sdAbs of the present application may also comprise the hinge region, CH2 and CH3 domains of the heavy chain other than CH1 (referred to herein as VHH-Fc fusion antibodies or polypeptides). The sdAb can also be a bivalent recombinant antibody consisting of two heavy chains (referred to as a VHH-Fc fusion bivalent recombinant antibody or a bivalent VHH-Fc fusion antibody in the present application), i.e., a VHH-Fc fusion antibody or polypeptide forms a bivalent recombinant antibody through an interchain disulfide bond. When the sdAb of the present application is a polypeptide or protein comprising the sdAb amino acid sequence, the sdAb amino acid sequence is a VHH domain, which is a functional antigen-binding fragment or functional antigen-binding domain of the polypeptide or protein.

In this application, "single-domain heavy chain antibody", "heavy chain single-domain antibody", "VHH single-domain antibody", "VHH", "sdAb" and "single-domain antibody" have the same meaning and can be used interchangeably. sdAbs have many unique structural and functional properties that make sdAbs highly advantageous for use as functional antigen-binding domains or proteins. The sdAbs functionally bind antigen in the absence of a light chain variable domain and can be as a single relatively small functional antigen-binding building block, region or protein. This separates the sdAbs from the units, regions of conventional antibodies that do not themselves serve as antigen-binding proteins or regions, but need to be combined with conventional antibody fragments such as Fab fragments or scFv fragments to bind antigen.

Typically, sdAbs are produced in camelid families such as llamas, but can also be produced synthetically using techniques well known in the art. For example, one method of obtaining the sdAbs involves (a) immunizing camelid animals with one or more antigens, (b) isolating peripheral lymphocytes from the immunized camelid animals, obtaining total RNA and synthesizing the corresponding cDNA, (c) constructing a library of cDNA fragments encoding the VHH domain, (d) transcribing the cDNA encoding the VHH domain obtained in step (c) into mRNA using PCR, converting the mRNA to a ribosome display format, and selecting VHH domain by ribosome display, and (e) expressing the VHH in a suitable vector, optionally purifying the expressed VHH.

Another method of obtaining the sdAbs of the present application is to use techniques for nucleic acid synthesis to prepare nucleic acids encoding the sdAbs, followed by expression of the nucleic acids in vivo or in vitro. Alternatively, the sdAbs, polypeptides and proteins of the present application can be prepared using synthetic or semi-synthetic techniques for preparing proteins, polypeptides or other amino acid sequences.

The sdAbs can be linked to other molecules such as albumin or other macromolecules. In addition, multivalent antibody molecules or polypeptides and protein molecules can also be prepared by using the sdAb of the present application, so that they have epitopes against more than two different targets. In such antibody molecules or polypeptides and protein molecules, the proteins or polypeptides can, for example, be directed against the same epitope, substantially equivalent epitopes, or different epitopes. The different epitopes can be located on the same target, or they can be located on more than two different targets.

It is also contemplated that the sequences of one or more sdAbs of the present application may be linked or joined to one or more linker sequences. The linker can be, for example, a protein sequence comprising a combination of serine, glycine and alanine.

Parts, fragments, analogs, mutants, variants, alleles and/or derivatives of the sdAbs to which the present application is applied are also within the scope of the present application, provided that they are suitable for the application in question.

In some embodiments of the present application, the CD47 single-domain heavy chain antibody (VHH) comprises CDRs of the following:
1) CDR1, CDR2 and CDR3 as shown by SEQ ID NO:1, SEQ ID NO:2, SEQ ID NO:3 respectively; or
2) CDR1, CDR2 and CDR3 as shown by SEQ ID NO:6, SEQ ID NO:7, SEQ ID NO:8 respectively.

In some embodiments of the present application, the CD47 single-domain heavy chain antibody comprises a heavy chain variable region as shown by SEQ ID NO:4 or SEQ ID NO:9.

As used herein, the term "variable" means that certain parts of the variable regions of an antibody differ in sequence that contribute to the binding and specificity of each particular antibody for its particular antigen. However, the variability is not evenly distributed throughout the antibody variable region. It is concentrated in three segments called complementarity determining regions (CDRs) or hypervariable regions in the light and heavy chain variable regions. The more conserved parts of the variable regions are called the framework regions (FRs). The variable regions of natural heavy and light chains each comprise four FR regions, which are roughly in a β-sheet structure, connected by three CDRs that form linking loops, and in some cases can form part of a β-sheet structure. The CDRs in each chain are tightly packed together by the FR regions and together with the CDRs of the other chain to form the antigen-binding site of the antibody (see Kabat et al., NIH Published. No. 91-3242, Vol. I, pp. 647-669 (1991)). The constant regions are not directly involved in the binding of the antibody to the antigen, but they exhibit different effector functions, such as involvement in antibody-dependent cytotoxicity of the antibody.

As used herein, the terms "heavy chain variable region" and "VH" are used interchangeably.

As used herein, the terms "hypervariable region" and "complementarity determining region (CDR)" are used interchangeably.

Generally, the antigen-binding properties of an antibody can be described by three specific regions located in the variable region of the heavy chain, called variable regions (CDRs), which are separated into four framework regions (FRs), the amino acid sequence of the four FRs is relatively conservative and does not directly involve in the binding reaction. These CDRs form a circular structure, and the β-sheets formed by the FRs in between are spatially close to each other, and the CDRs on the heavy chain and the CDRs on the corresponding light chain constitute the antigen-binding site of the antibody. Which amino acids make up the FR or CDR regions can be determined by comparing the amino acid sequences of antibodies of the same type.

In some embodiments, the CD47 single-domain heavy chain antibody of the present application comprises a sequence with a homology of 90% or more, 95% or more, 96% or more, 97% or more, 98% or more, or 99% or more to the above CDR sequences or variable region sequences. In some embodiments, the CD47 single-domain antibodies of the present application further comprise framework region (FR) sequences. In some embodiments, the CD47 single-domain antibodies of the present application are humanized. "Humanized" refers to a chimeric antibody comprising amino acid residues from a non-human HVR and amino acid residues from a human FR. In certain embodiments, a humanized antibody will comprise at least one, usually two, substantially the entire variable domain, wherein all or substantially all of the HVRs (e.g., CDRs) correspond to those of the non-human antibody, and all or substantially all of the FRs correspond to those of the human antibody. Optionally, a humanized antibody may comprise at least a part of an antibody constant region derived from a human antibody. A "humanized form" of an antibody (e.g., a non-human antibody) refers to an antibody that has undergone humanization.

In some embodiments, the CD47 single-domain antibodies of the present application comprise a human common framework. A "human common framework" is a framework that represents the amino acid residues most frequently found in a selection of human immunoglobulin VL or VH framework sequences. In general, human immunoglobulin VL or VH sequences are selected from variable sequence subgroups in, for example, Kabat et al., Sequences of Proteins of Immunological Interest, 5th edition, NIH Publication 91-3242, Bethesda MD (1991), vols. 1-3. In some embodiments, for VH, the subgroup is subgroup III as described by Kabat et al. (supra). In some embodiments, the CD47 single-domain antibodies of the present application comprise FR1, FR2, FR3 and FR4 as shown in Table 4.

The present application also relates to fully human antibody forms of the CD47 single-domain antibodies of the present application. A "fully human antibody" is an antibody whose amino acid sequence corresponds to the amino acid sequence produced by humans or by human cells. This definition of human antibody specifically excludes humanized antibodies comprising non-human antigen-binding residues. The human antibodies can be prepared using a variety of techniques known in the art, comprising phage display library techniques, and the techniques as described in the following literatures: Hoogenboom and Winter, J. Mol. Biol., 227:381 (1991); Marks et al., J. Mol. Biol., 222:581 (1991); Cole et al., Monoclonal Antibodies and Cancer Therapy, Alan R. Liss, p. 77 (1985); Boerner et al., J. Immunol., 147(1):86-95 (1991). The human antibodies can be prepared by administering antigen to transgenic animals (e.g., immunized xenogeneic mice) that have been modified to produce such antibodies in response to antigenic challenge, but whose endogenous loci have been disabled (for XENOMOUSE™ technology, see, e.g., U.S. Pat. Nos. 6,075,181 and 6,150,584).

In some embodiments, the CD47 single-domain antibody of the present application further comprises the amino acid sequence of the Fc region of the heavy chain of the antibody, e.g., the amino acid sequence of the hinge region, CH2 and CH3 regions. The "class" of an antibody heavy chain refers to the type of constant domain or constant region possessed by the heavy chain. There are five major classes of antibodies: IgA, IgD, IgE, IgG, and IgM, and several of these can be further divided into subclasses (isotypes), e.g., IgG1, IgG2, IgG3, IgG4, IgA1, and IgA2. The heavy chain constant domains corresponding to the different classes of immunoglobulins are called α, δ, ε, γ and μ, respectively. In some embodiments of the present application, the antibody heavy chain is IgG1 or IgG4.

Conjugates (or couples) and fusion proteins comprising CD47 single-domain antibodies are encompassed by this application.

A "conjugate (or couple)" is a conjugate (couple) formed by an antibody and one or more heterologous molecules, comprising but not limited to cytotoxic agents.

In some of the above schemes, the present application also relates to conjugates and fusion expression products conjugated with the above-mentioned CD47 single-domain heavy chain antibodies of the present application or fragments thereof. The CD47 single-domain heavy chain antibody or fragment thereof can form conjugates and fusion expression products with drugs, toxins, cytotoxic agents, stimulator of interferon genes (STING) receptor agonists, cytokines, radionuclides, enzymes and other diagnostic or therapeutic agents.

As used herein, the term "cytotoxic agent" refers to a substance that inhibits or prevents cell function and/or causes cell death or destruction. Cytotoxic agents include, but are not limited to, radioisotopes (e.g., radioisotopes of At211, I131, I125, Y90, Re186, Re188, Sm153, Bi212, P32, Pb212, and Lu); chemotherapeutic agents or drugs (e.g., methotrexate, Adriamycin, vinca alkaloids (vincristine, vinblastine, etoposide), doxorubicin, melphalan, mitomycin C, chlorambucil, daunorubicin or other insertions); growth inhibitors; enzymes and fragments thereof, such as nucleolytic enzymes; antibiotics; toxins, such as small molecule toxins or enzymatically active toxins of bacterial, fungal, plant or animal origin, comprising fragments and/or variants thereof various antitumor drugs or anticancer agents known in the art. Stimulator of interferon genes (STING) receptor agonists are the molecules that activate STING-dependent signaling pathways to promote the secretion of type I interferon and promote the expression of proteins related to antiviral and antitumor immunity, block viral replication, promote the immune response to cancer cells. Such molecules are STING agonists of structural classes such as cyclic dinucleotides, aminobenzimidazoles, xanthones and acridinones, benzothiophenes and benzodioxoles.

The present application also comprises fragments, derivatives and analogs of anti-CD47 single-domain heavy chain antibodies.

As used herein, the terms "fragment," "derivative," and "analog" refer to polypeptides that retain substantially the same biological function or activity of an antibody of the present application. A polypeptide fragment, derivative or analog of the present application may be (i) a polypeptide having one or more conservative or non-conservative amino acid residues (preferably conservative amino acid residues) substitutions, and such substituted amino acid residues may or may not be encoded by the genetic code, or (ii) a polypeptide having a substituent group in one or more amino acid residues, or (iii) a polypeptide formed by fusion of a mature polypeptide with another compound (such as a compound that prolongs the half-life of the polypeptide, e.g., polyethylene glycol), or (iv) a polypeptide formed by fusion of an additional amino acid sequence fused to the polypeptide sequence (such as a leader sequence or a secretory sequence or a sequence used to purify the polypeptide or a proprotein sequence, or a fusion protein with 6His-tag). These fragments, derivatives and analogs are well known to those skilled in the art in light of the teachings herein.

The CD47 heavy chain single-domain antibody of the present application covers polypeptides having CD47 protein binding activity, comprising the above-mentioned CDR regions. The CD47 heavy chain single-domain antibody of the present application also comprises a variant form of the polypeptide comprising the above-mentioned CDR region, which has the same function as the antibody of the present application. These variant forms include (but are not limited to): deletion, insertion and/or substitution of one or more (usually 1-50, preferably 1-30, more preferably 1-20, most preferably 1-10) amino acids, and addition of one or several (usually within 20, preferably within 10, more preferably within 5) amino acids at the C-terminus and/or N-terminus. For example, in the art, substitution with amino acids with similar or similar properties generally does not alter the function of the protein. As another example, the addition of one or more amino acids at the C-terminus and/or N-terminus generally does not alter the function of the protein. The term also comprises active fragments and active derivatives of the antibodies of the present application.

Variant forms of the polypeptide comprise: homologous sequences, conservative variants, allelic variants, natural mutants, induced mutants, proteins encoded by DNAs that hybridize to DNA encoding the antibodies of the present application under conditions of high or low stringency, and the polypeptide or protein obtained using the antiserum against the antibody of the present application.

The present application also provides fusion proteins comprising single-domain antibodies or fragments thereof. In addition to nearly full length polypeptides, the present application also comprises fragments of the single-domain antibodies of the present application. Typically, the fragment has at least about 50 contiguous amino acids, preferably at least about 50 contiguous amino acids, more preferably at least about 80 contiguous amino acids, and most preferably at least about 100 contiguous amino acids of the antibody of the present application.

In the present application, "conservative variants of the antibody of the present application" means that compared with the amino acid sequence of the antibody of the present application, there are up to 10, preferably up to 8, more preferably up to 5, and optimally up to 3 amino acids replaced by amino acids of similar or similar nature to form a polypeptide.

The present application also provides polynucleotide molecules encoding the above-mentioned antibodies or fragments or fusion proteins thereof. The polynucleotides of the present application may be in the form of DNA or RNA. DNA forms comprise cDNA, genomic DNA or synthetic DNA. DNA can be single-stranded or double-stranded. DNA can be the coding or non-coding strand.

Polynucleotides encoding the mature polypeptides of the present application comprise: coding sequences encoding only the mature polypeptides; coding sequences and various additional coding sequences for the mature polypeptides; coding sequences (and optional additional coding sequences) for the mature polypeptides and non-coding sequences.

The term "polynucleotide encoding a polypeptide" may comprise a polynucleotide encoding the polypeptide or a polynucleotide that also comprises additional coding and/or non-coding sequences.

The present application also relates to polynucleotides that hybridize to the above-mentioned sequences and have at least 50%, preferably at least 70%, more preferably at least 80% identity between the two sequences. In particular, the present application relates to polynucleotides that are hybridizable under stringent conditions to the polynucleotides of the present application. In the present application, "stringent conditions" refer to: (1) hybridization and elution at lower ionic strength and higher temperature, such as 0.2×SSC, 0.1% SDS, 60° C.; or (2) a denaturant is added during hybridization, such as 50% (v/v) formamide, 0.1% calf serum/0.1% Ficoll, 42° C., etc.; or (3) hybridization occurs only when the identity between the two sequences is at least 90% or more, preferably more than 95%. And the polypeptide encoded by the hybridizable polynucleotide has the same biological function and activity as the mature polypeptide.

The full-length nucleotide sequence of the antibody of the present application or fragment thereof can usually be obtained by PCR amplification method, recombinant method or artificial synthesis method. A feasible method is to use artificial synthesis to synthesize the relevant sequences, especially when the fragment length is short. Often, fragments of very long sequences are obtained by synthesizing multiple small fragments followed by ligation. In addition, the coding sequence of the heavy chain and the expression tag (such as 6His) can also be fused together to form a fusion protein.

Once the relevant sequences have been obtained, recombinant methods can be used to obtain the relevant sequences in bulk. This is usually done by cloning it into a vector, transferring it into a cell, and isolating the relevant sequence from the propagated host cell by conventional methods. Biomolecules (nucleic acids, proteins, etc.) referred to in the present application comprise biomolecules in isolated form.

At present, the DNA sequences encoding the proteins of the present application (or fragments thereof, or derivatives thereof) can be obtained entirely by chemical synthesis. This DNA sequence can then be introduced into various existing DNA molecules (or e.g., vectors) and cells known in the art. In addition, mutations can also be introduced into the protein sequences of the present application by chemical synthesis.

The present application also relates to vectors comprising appropriate DNA sequences as described above together with appropriate promoter or control sequences. These vectors can be used to transform appropriate host cells so that they can express proteins.

Host cells can be prokaryotic cells, such as bacterial cells; or lower eukaryotic cells, such as yeast cells; or higher eukaryotic cells, such as mammalian cells. Representative examples are: *Escherichia coli, Streptomyces*; bacterial cells of *Salmonella typhimurium*; fungal cells such as yeast; insect cells of *Drosophila* S2 or Sf9; animal cells of CHO, COS7, 293 cells, etc. Transformation of host cells with recombinant DNA can be performed using conventional techniques well known to those skilled in the art. When the host is a prokaryotic organism such as *E. coli*, competent cells capable of uptake of DNA can be harvested after exponential growth phase and treated with the $CaCl_2$), using procedures well known in the art. Another way is to use $MgCl_2$. If desired, transformation can also be performed by electroporation. When the host is a eukaryotic organism, the following DNA transfection methods can be used: calcium phosphate co-precipitation method, conventional mechanical methods such as microinjection, electroporation, liposome packaging, etc.

The obtained transformants can be cultured by conventional methods to express the polypeptides encoded by the genes of the present application. The medium used in the culture can be selected from various conventional media depending on the host cells used. Cultivation is carried out under conditions suitable for growth of the host cells. After the host cells have grown to an appropriate cell density, the selected promoter is induced by a suitable method (e.g., temperature switching or chemical induction), and the cells are cultured for an additional period of time.

The recombinant polypeptide in the above method can be expressed intracellularly, or on the cell membrane, or secreted outside the cell. If desired, recombinant proteins can be isolated and purified by various isolation methods utilizing their physical, chemical and other properties. These methods are well known to those skilled in the art. Examples of these methods include, but are not limited to: conventional renaturation treatment, treatment with protein precipitants (salting-out method), centrifugation, osmotic disruption, ultratreatment, ultracentrifugation, molecular sieve chromatography (gel filtration), adsorption layer chromatography, ion exchange chromatography, high performance liquid chromatography (HPLC) and various other liquid chromatography techniques and combinations of these methods.

The antibodies of the present application can be used alone, or in combination or conjugated with detectable labels (for diagnostic purposes), therapeutic agents, PK (protein kinase) modifying moieties, or a combination of any of the above.

Detectable labels for diagnostic purposes include, but are not limited to, fluorescent or luminescent labels, radiolabels, MRI (magnetic resonance imaging) or CT (computed tomography) contrast agents, or enzymes capable of producing detectable products.

Therapeutic agents that can be combined or conjugated with the antibodies of the present application include, but are not limited to: 1. radionuclides; 2. biological poison; 3. cytokines such as IL-2, etc.; 4. gold nanoparticles/nanorods; 5. virus particles; 6. liposomes; 7. nano magnetic particles; 8. drug-activating enzymes (e.g., DT-diaphorase (DTD) or biphenyl hydrolase-like protein (BPHL)); 9. a therapeutic agent (e.g., cisplatin) or any form of nanoparticles, etc.

II. Preparation of VHH Single-Domain Antibodies

1. Immunization Method

Usually, standard immunization procedures (complete and incomplete Freund's adjuvant mixed with immunogen to immunize animals successively) can be used to immunize camelid animals to obtain specific single-domain heavy chain antibodies with better titers. For example, approximately 0.1 mg of polyclonal HCAb can be harvested from 1 ml of immune serum. Using *Staphylococcus aureus* V8 protease, the HCAb can be cut from the short hinge region between the variable region and CH2, and the Fc segment is adsorbed by *Staphylococcus* protein A chromatography, and the effluent heavy chain variable region is collected to obtain VHH.

2. Screening Based on Bacterial Display Technology

*Escherichia coli* (*E. coli*) can be used as a vector for antibody display. Antibody fragments are usually displayed on the inner membrane of *E. coli* and bind to lipoproteins on the membrane through the Fc segment of the antibody. This display and expression method is called anchored periplasmic expression (APEx). However, due to the existence of the *E. coli* cell wall and outer membrane, the bacteria need to be permeabilized into spheroplasts in order to bind to the antigen. The technology of using the outer membrane to display antibodies has also been reported. For example, Salema et al. display antibody fragments on the autotransporter (EhaA autotransporter) or the intimin, which are derived from *Escherichia coli* O157:H7 (EHEC) bacterial outer membrane and can be expressed and displayed in *E. coli* K-12 bacteria. *Staphylococcus carnosus* in Gram-positive bacteria can also be used for antibody display, the method is to transport antibody fragments from the inside of the cell membrane to the outside of the cell membrane through the cell wall anchoring domain on protein A of *Staphylococcus carnosus* and anchor on the cell wall.

3. Screening Based on Phage Surface Display Technology

The core of phage surface display technology is to fuse and express the target gene into the phage coat protein gene through genetic engineering methods, so that it can be displayed on the surface of the phage, and then the phage carrying the target protein/polypeptide can be obtained through specific enrichment screening, followed by cloning and sequencing, and finally the DNA coding sequence of the target protein/polypeptide can be obtained. This technology combines genotype and functional phenotype (binding activity) with the high amplification of phage and is a very efficient screening system. Since there is no light and heavy chain matching problem of traditional antibodies, single-domain antibodies are more suitable for screening using phage display library technology.

Phage single-domain antibody libraries are generally divided into three categories: immune libraries, natural libraries and fully synthetic libraries. The immune library refers to a single-domain antibody expression library constructed from pre-immunized animals (such as alpaca, etc.) by specifically enriching target antigen-specific B cell genes and amplifying to obtain heavy chain antibody VH genes. High-affinity antibodies can be screened with small library volumes. The limiting factor of the immune library lies in the characteristics of the immunogen. The strength of the humoral immune response and the epitope difference of different immunogens in animals can affect the quality and diversity of the final antibodies obtained, and the antibodies finally screened are homogenous (such as the identified epitopes are the same, etc.) to a higher degree.

The process of screening antibodies by phage display technology generally comprises the following points: 1) obtaining antibody gene fragments. Take the peripheral blood of alpaca or shark, separate lymphocytes with lymphocyte separation liquid, extract the total RNA of lymphocytes, reverse-transcribe into cDNA by RT-PCR, and amplify the VHH gene by nested PCR two-step method, finally, the VHH gene is cloned into a phage vector. 2) Panning of the target gene. The phage library is first incubated with the blocking solution without the target antigen, and negative selection is performed to reduce non-specific reactions and improve the efficiency of antibody panning. The antigen is then immobilized on a solid support (polystyrene plate or magnetic beads) for panning. Generally, multiple rounds of panning are required, and a Phage-ELISA assay can be used after each round of panning until a significant enrichment effect can be detected. 3) Expression and purification of antibodies. The target antibody gene sequence is cloned into an expression vector, which can be expressed by a prokaryotic expression system or a eukaryotic expression system.

4. Screening Based on Yeast Surface Display Technology

Screening for antibody display technology can be performed with *Saccharomyces cerevisiae*. *Saccharomyces cerevisiae* has a cell wall of about 200 nm thick, and the cell wall surface of budding yeast has a lectin protein that can bind to the Aga2p protein on the relative mating type of yeast, single-domain antibodies are expressed in the form of fusion proteins fused with Aga2p protein and displayed on the surface of yeast cells. The screening method of yeast display antibody library generally adopts magnetic bead-assisted cell sorting (MACS) and flow cytometry sorting (FACS). The main function of MACS is to reduce non-specific binding, multiple rounds of FACS screening are usually performed after MACS screening. Compared with phage display technology, yeast display technology has both advantages and disadvantages. On the one hand, yeast belongs to eukaryotic cells, and the post-translational modification of its antibodies is similar to that of mammalian cells. The glycosylated antibody is highly stable, and it also avoids unknown situations that may exist in mammalian expression systems. Secondly, the yeast display technology adopts the method of flow cytometry, which makes the whole screening process more controllable. On the other hand, the library capacity of yeast antibody libraries is generally smaller than that of phage antibody libraries. At the same time, yeast display technology may not be ideal when screening oligomeric antigens, so one yeast cell may covalently bind to multiple antigens at the same time, which may lead to that the screened antibodies may not have the expected affinity.

III. Pharmaceutical Compositions and Kits

The present application also provides a composition. Preferably, the composition is a pharmaceutical composition, which comprises the above-mentioned antibody or its active fragment or its fusion protein, and a pharmaceutically acceptable carrier. Generally, these materials can be formulated in a non-toxic, inert and pharmaceutically acceptable aqueous carrier medium, usually at a pH of about 5-8, preferably at a pH of about 6-8, although the pH may vary depending on the nature of the formulation material and the condition to be treated. The formulated pharmaceutical compositions can be administered by conventional routes including (but not limited to), intratumoral, intraperitoneal, intravenous, or topical administration.

The pharmaceutical composition of the present application can be directly used to bind CD47 protein molecules, and thus can be used to treat tumors. In addition, other therapeutic agents may also be used concomitantly.

The pharmaceutical composition of the present application comprises a safe and effective amount (e.g., 0.001-99 wt %, preferably 0.01-90 wt %, more preferably 0.1-80 wt %) of the above single-domain antibody (or its conjugate) according to the present application, and a pharmaceutically acceptable carrier or excipient thereof. Such carriers include (but are not limited to), saline, buffers, dextrose, water, glycerol, ethanol, and combinations thereof. The drug formulation should match the mode of administration. The pharmaceutical composition of the present application can be prepared in the form of injection, for example, prepared by conventional methods with physiological saline or an aqueous solution comprising glucose and other adjuvants. Pharmaceutical compositions such as injections and solutions are preferably manufactured under sterile conditions. The active ingredient is administered in a therapeutically effective amount, e.g., about 10 μg/kg body weight to about 50 mg/kg body weight per day. In addition, the polypeptides of the present application may also be used with other therapeutic agents.

When the pharmaceutical composition is used, a safe and effective amount of the immunoconjugate is administered to the mammal, wherein the safe and effective amount is generally at least about 10 μg/kg body weight, and in most cases no more than about 50 mg/kg body weight, preferably the dose is about 10 μg/kg body weight to about 10 mg/kg body weight. Of course, the specific dosage should also take into account the route of administration, the patient's health condition and other factors, which are all within the skill of the skilled physician.

The present application also provides a kit comprising the heavy chain single-domain antibody (or fragment thereof) of the present application. In some embodiments of the present application, the kit further comprises a container, instructions for use, buffers, and the like. The present application also provides a detection kit for detecting the level of CD47, and the kit comprises a antibody or a fragment thereof that recognizes the CD47 protein. In some embodiments, a lysis medium for dissolving the sample, general reagents and buffers required for detection, such as various buffers, detection labels, detection substrates, etc., are also comprised.

IV. Application of CD47 Heavy Chain Single-Domain Antibody

The CD47 heavy chain single-domain antibody of the present application can be used for the diagnosis and treatment of cancer diseases, in particular, the clinical diagnosis and targeted therapy for CD47.

The CD47 heavy chain single-domain antibody of the present application not only has the characteristics of high specificity and strong affinity, but also does not bind to erythrocytes, avoiding the side effects of erythrocyte agglutination and hemolysis, and weakly binds to platelets, which is beneficial to reduce the side effects of thrombocytopenia. Therefore, it can be used for clinical treatment of CD47-related cancer diseases.

In another aspect, the present application also provides labeled CD47 heavy chain single-domain antibodies. In the CD47 heavy chain single-domain antibody with a detectable label, the label is selected from the group consisting of: an isotope, a colloidal gold label, a colored label or a fluorescent label. Colloidal gold labeling can be performed using methods known to those skilled in the art. In a preferred scheme of the present application, the anti-CD47 single-domain antibody is labeled with colloidal gold to obtain a single-domain antibody labeled with colloidal gold.

CD47 protein can be detected using a labeled CD47 heavy chain single-domain antibody. Therefore, the present application also provides a method for detecting the CD47 protein. The method steps are roughly as follows: obtaining a cell and/or tissue sample; lysing the sample in a medium; detecting the level of CD47 protein in the lysed sample. In the detection method of the present application, the sample to be used is not particularly limited, and a representative example is a cell-comprising sample existing in a cell preservation solution.

The present application is further described below in conjunction with specific examples. It should be understood that these examples are only used to illustrate the present application and not to limit the scope of the present application. The experimental method of unreceipted specific conditions in the following examples, is usually according to normal conditions, such as those described in Sambrook et al., molecular cloning: conditions described in laboratory manual (New York:Cold Spring Harbor Laboratory Press, 1989), or as recommended by the manufacturer. Unless otherwise specified, Percentages and parts are weight percentages and parts.

EXAMPLE

Specific examples of the present application will be described in more detail below with reference to the accompanying drawings. While specific examples of the present application are shown in the accompanying drawings, it should be understood that the present application may be embodied in various forms and should not be limited by the examples set forth herein. Rather, these examples are provided so that the present application will be more thoroughly understood, and will fully convey the scope of the present application to those skilled in the art.

Example 1. Alpaca Immunization and Serum Titer Detection

Human CD47 recombinant protein (Human CD47His Tag, huCD47-His, purchased from ACRO Biosystems, Cat. No. CD7-H5227) and monkey CD47 recombinant protein (Cynomolgus macaque CD47 His Tag, cyCD47-His, purchased from ACRO Biosystems, Cat. No. CD7-052H1) were used as immunogens. Two alpacas were selected and immunized according to the 40-day immunization program, once a week, for a total of 6 times. The alpacas were immunized with huCD47-His on day 1, day 8, day 15, and day 22, respectively, and on the 29th and 36th day, the alpacas were immunized after mixing huCD47-His and cyCD47-His. The immune response of alpacas to immunogens was detected by Enzyme-Linked ImmunoSorbent Assay (ELISA). Whole blood was collected from animals before immunization (day 1) and after immunization (day 16 and day 32), and serum was separated by conventional methods. 100 µl of huCD7-His or cyCD47-His (5 µg/mL) antigen was added to each well of a 96-well microtiter plate, coated overnight at 4° C., washed 4 times with 250 µl of PBST, and added 100 µl of diluted alpaca serum (1:100 to 1:12,500 dilution) and incubated at room temperature for 1 h, washed 4 times with 250 µl of PBST, and then added 1:5000 diluted detection antibody anti-llama(H+L)-HRP (purchased from Abcam, Cat. No. ab112784) and incubated at room temperature for 1 h. After washing 4 times with 250 µl of PBST, add TMB chromogenic solution (purchased from Cell Signaling, Cat. No. 7004) was added and developed color for 10 mins in the dark at room temperature. The reaction was terminated with 2M H2SO4, and the OD490 absorbance value was measured with a microplate reader.

Figure 1A:
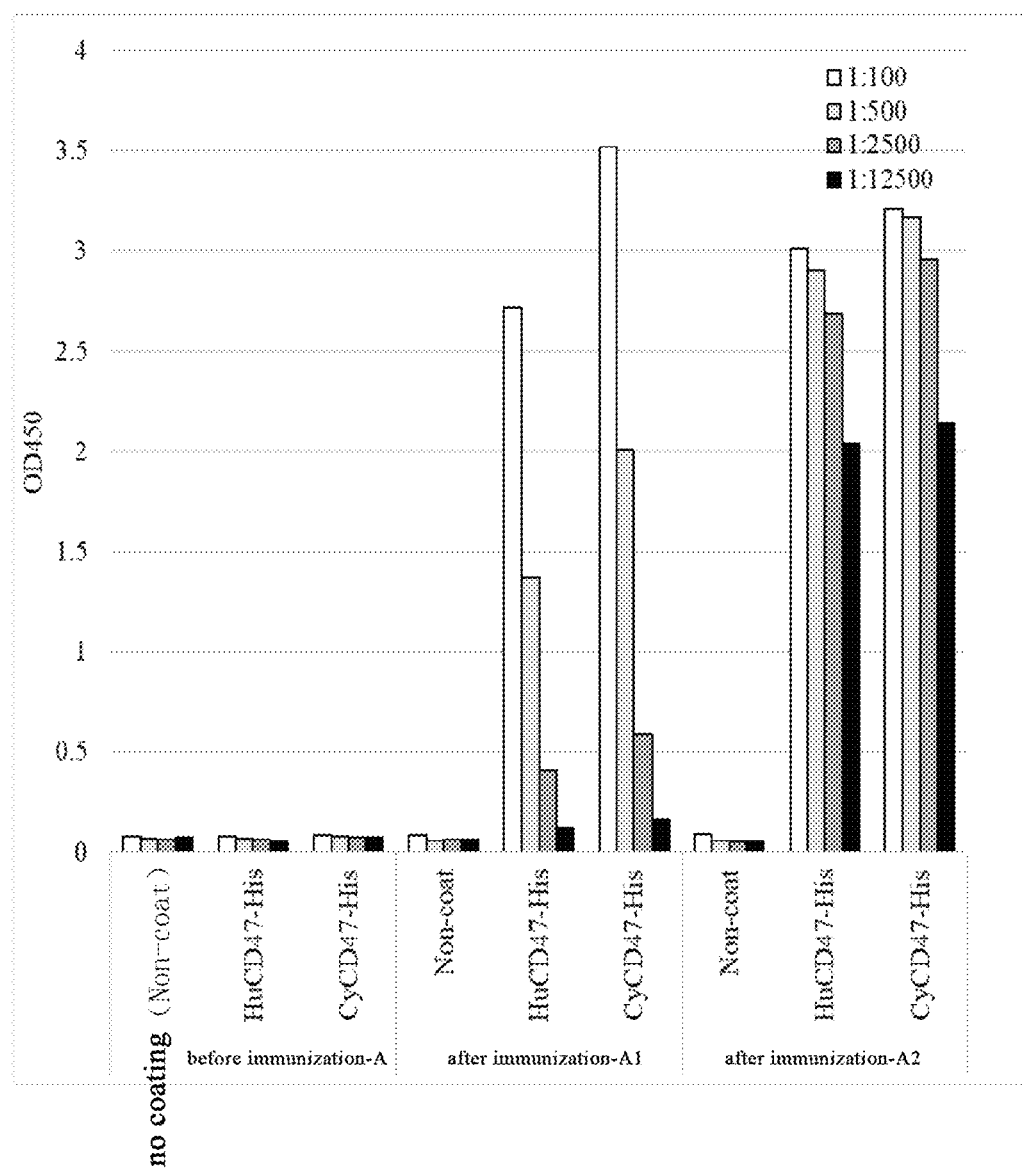
FIG. 1. Immunoreactivity (serum antibody titers) of serum and antigen of alpaca A and alpaca B before immunization (pre-A/pre-B) and after immunization (post-A1/post-B1 on day 16, post-A2/post-B2 on day 32). The serum of the two alpacas have no immunoreactivity to the antigen before immunization, and 32 days after immunization, the serum are still highly immunoreactive after being diluted 1:12,500.
Figure 1B:
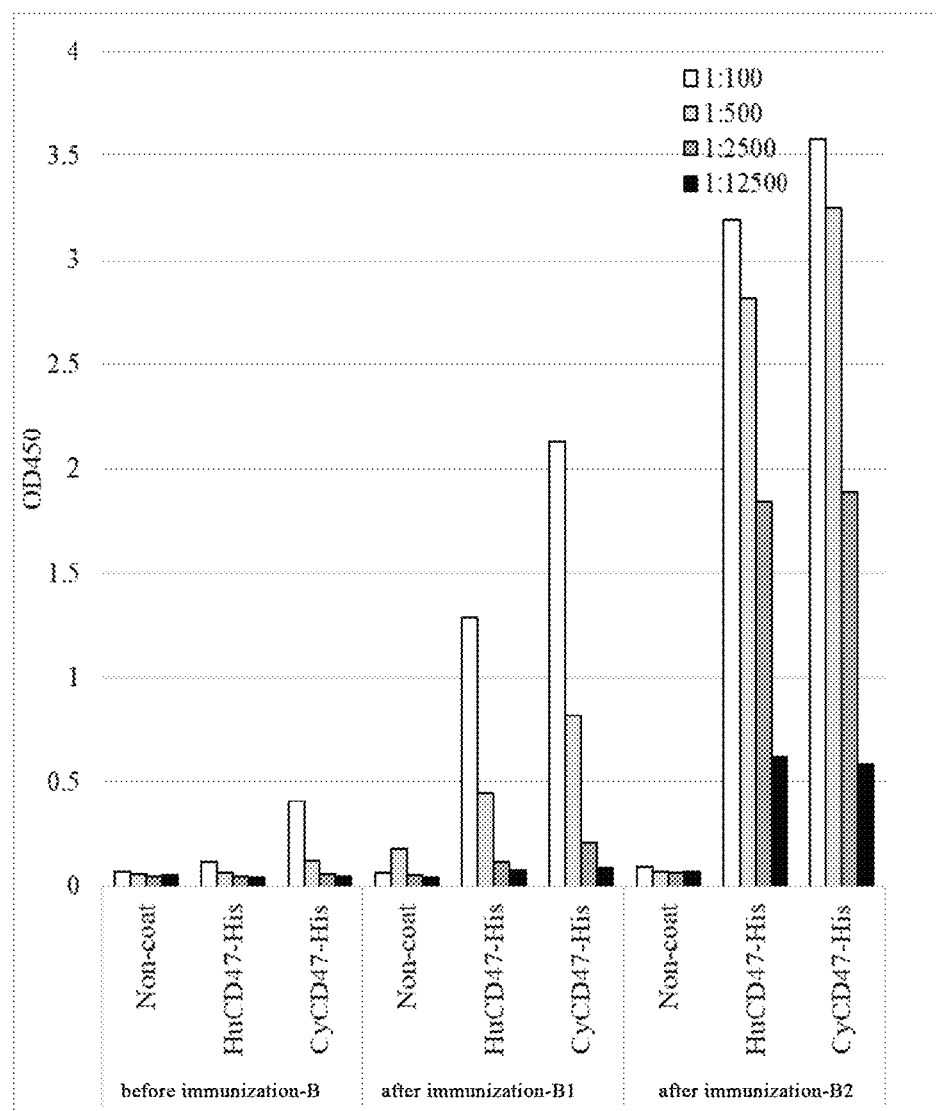

The titer test results were shown in FIG. 1. Before immunization, the serum antibody titers of animal A and animal B were both negative (Pre-A, Pre-B), and the serum titers of animals after immunization were all positive. On the 32nd day (post-A2, post-B2), the serum antibody titers were positive after 12,500-fold dilution. After the sixth immunization (the 41st day), 300 mL of peripheral blood was drawn from alpaca A and alpaca B, respectively, and mixed. PBMCs (Peripheral blood mononuclear cells) were isolated according to the operating instructions of the lymphocyte separation solution Ficoll-Hypaque (purchased from GE Healthcare, Cat. No. 45-001-751).

Example 2. Phage Display Library Construction

Total RNA was extracted from PBMCs isolated above according to the instruction manual of TRIzol™ (purchased from Invitrogen, Cat. No. 15596018), and the total RNA was reverse transcribed to cDNA according to PrimeScript II cDNA synthesis kit (Takara, Cat. No. 6210B) using oligodT primers and random hexamer primers. The variable region (VHH) fragment of the alpaca heavy chain antibody was amplified by polymerase chain reaction. The PCR product was identified by agarose gel electrophoresis, recovered from the gel and purified, and then ligated to a phagemid vector and electrotransformed into TG1 competent E. coli. The library capacity of the phage library was greater than or equal to $3 \times 10^8$ CFU. 26 clones were randomly selected for colony PCR and sequencing. The colony PCR results showed that the insertion rate of the VHH sequence in the phagemid vector was 100% (26/26), and the sequencing results showed no repeated sequences.

Example 3. Phage Display Library Panning

Figure 2:
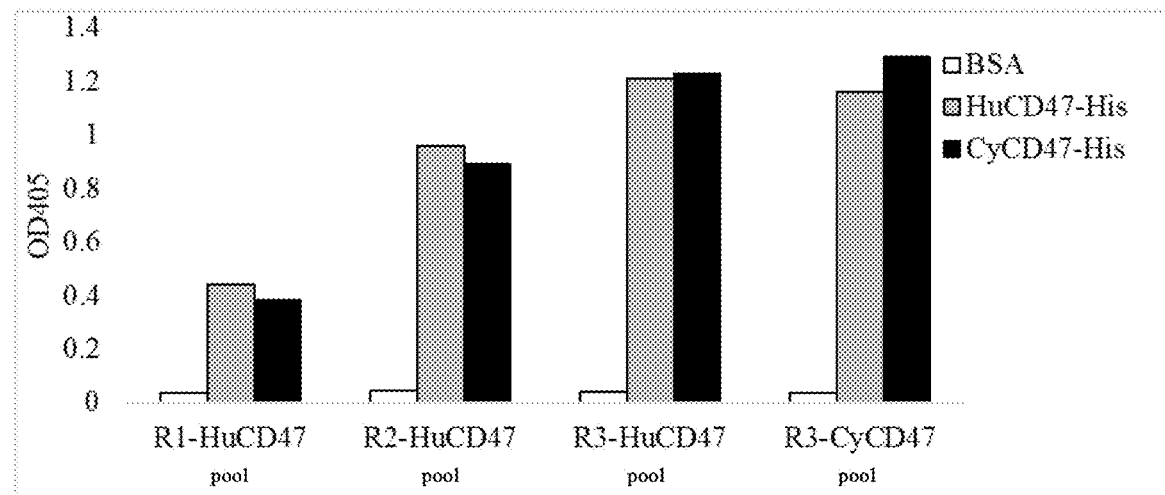
FIG. 2. After three rounds of antigen sorting (Bio-panning), the binding signals of the enriched phage library to antigens huCD47-His and cyCD47-His increases round by round.
Figure 3:
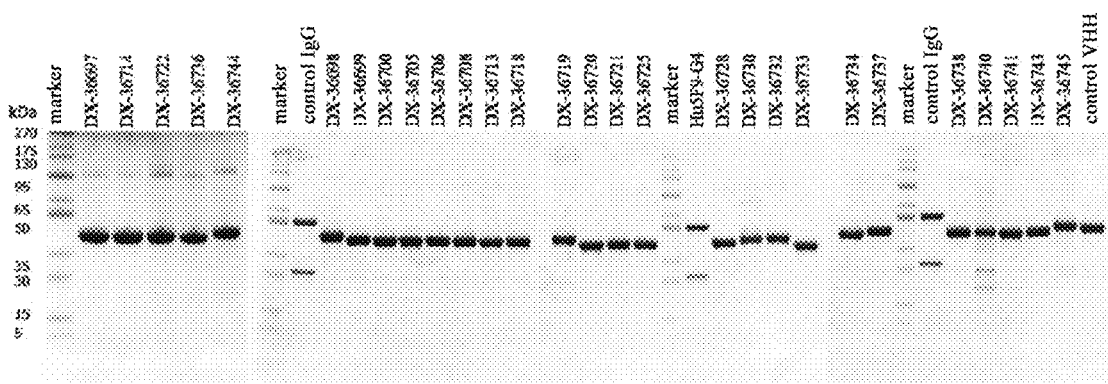
FIG. 3. The purified VHH-Fc fusion bivalent recombinant antibody is identified by reducing SDS-PAGE, and the target product is a symmetrical diabody, each single chain molecular weight is 37 kD-39 kD.

Phage libraries were sorted (Biopanning) with huCD47 as antigen coated in deep well tubes. In the first round of sorting, 2 µg/mL huCD47-His recombinant protein was coated overnight on the microtiter plate, blocked with PBS+ 2% BSA (Bovine serum albumin), and then added with phage and incubated at room temperature for 2 h. After washing 10 times with PBST, the bound phage was eluted with 0.1 M Triethylamine. The eluted phages were titered, infected with E. coli TG1 and entered into the next round of sorting. A total of 3 rounds of sorting were carried out. After the last round of sorting, ELISA was used to measure the binding signal intensity of unit phage and antigen. The binding signal (degree of enrichment) for each round of panning was shown in FIG. 2.

Example 4. Screening of Clones with Binding Activity of huCD47 and cyCD47 by ELISA The binding specificity of VHH phage to antigen was detected by ELISA. Escherichia coli monoclones were selected from 2×YT plates, incubated in 96-well plates for 3 hours, added with helper phage to lyse the phage, and then coated with 100 µl of huCD47, cyCD47, mouse CD47 (moCD47) or BSA (5 µg/mL) on the microtiter plate, respectively, after blocking with PBS comprising 5% skim milk powder, 100 µl of lysate supernatant was added, and incubated at room temperature for 1 h. After washing the plate 4 times with PBST, 100 µl of anti-M13antibody-HRP (1:1000 dilution, purchased from Sino Biologicals, Cat. No. 11973-MM05T-H) was added and incubated for 1 h. After washing the plate 4 times with PBST, TMB was add to develop color for 10 mins, after stopping with 2M $H_2SO_4$, and the OD450 absorbance value was read on a microplate reader.

In this study, a total of 744 clones were screened, and the clones with no specific binding to huCD47 and those with non-specific binding to BSA were excluded, and a total of 93 monoclones that specifically bound to huCD47 were screened. These clones were species-cross-reactive with cyCD47, but no clones were screened for cross-reactivity with mouse CD47.

Example 5. Single-Domain Antibody with huCD47-Binding Activity Extracted and Purified from the Periplasmic Cavity of Escherichia coli The VHH clones that specifically bind to huCD47 obtained by the above screening were expressed in E. coli. The VHH plasmid transformed TG1 E. coli clone is cultured overnight at 25° C. in 2YT medium (supplemented with 34 µg/mL chloramphenicol, 2% glucose), and then expanded at a ratio of 1:100 in 2YT medium (comprising 34 µg/mL chloramphenicol, 0.1% glucose) at 37° C. for expansion. Arabinose was added to the medium to a final concentration of 0.2%, and after induction at 25° C. for 5 h, the precipitate was collected by centrifugation. Bacteria were lysed with cell lysis buffer (50 mM Hepes, 0.5 mM EDTA, 20% sucrose, pH 7.5), purified with NiNTA column (purchased from Qiagen, Cat. No. 30210), and dialysised with 3.5 kDa midi dialysis column (purchased from Millipore, Cat. No. 71506). After the concentration of the purified product was determined by Nanodrop, the protein purity was detected by SDS-PAGE, and the purified VHH single-domain antibody was used for subsequent activity testing experiments.

Example 6. FACS Screening of Single-Domain Antibodies that Bind to huCD47 on the Cell Membrane Surface Antibodies that can bind to CD47 positive cells were screened by flow cytometry (FACS). Human Burkitt's lymphoma cells Raji (purchased from the Cell Bank of the Chinese Academy of Sciences, Cat. No. TCHu 44) were cultured in RPMI-1640 medium (purchased from Gibco, Cat. No. 11875-093) comprising 10% fetal bovine serum FBS (purchased from Gibco, Cat. No. 1009141) at 37° C. with 5% $CO_2$.

Raji cells were collected by centrifugation at 800 rpm for 3 mins, rinsed once with PBS+1% FBS and resuspended for counting. In a 96-well plate, $1\times10^5$ Raji cells were added to each well, and then the VHH (purified) samples were added in a gradient dilution. The final concentrations of VHH were 5, 0.5, and 0.05 µg/mL, respectively. After mixing, it was mixed with Raji cells and incubated at room temperature for 1 h. Raji cells were collected by centrifugation at 1400 rpm for 3 mins. After rinsing twice with PBS+1% FBS, 1:500 diluted anti-c-myc antibody (Roche, Cat. No. 11667149001) was added to the VHH sample wells and incubated at 4° C. for 30 mins. After the cells were rinsed twice with FACS buffer, 1:300 dilution of the detection antibody Allophycocyanin donkey anti-mouse IgG (Jackson Immunoresearch, Cat. No. 715-136-150) was added to the cells, and incubated at 4° C. for 30 mins in the dark. The cells were rinsed twice with PBS+1% FBS and analyzed on an iQuePlus flow cytometer.

The mean fluorescence intensity (MFI) of the control well with only fluorescent secondary antibody was used as the mean fluorescence intensity of the background value, and the multiple of the mean fluorescence intensity of the sample and the mean fluorescence intensity of the background value was used to evaluate the binding strength of the VHH single-domain antibody to Raji cells.

multiple of mean fluorescence intensity=sample mean fluorescence intensity÷background value− mean fluorescence intensity In this experiment, a total of 43 VHH single-domain antibodies that can bind to Raji cells were screened, and 28 of them had a multiple of the average fluorescence intensity of binding to Raji cells at the lowest concentration (0.05 µg/mL)>5, and had strong cell-binding activity. For details, see Table 1 below.

TABLE 1

Mean fluorescence intensity (multiple) of purified VHH single-domain antibody binding to Raji

| Sample name/ concentration | 5 µg/mL | 0.5 µg/mL | 0.05 µg/mL |
| --- | --- | --- | --- |
| DX-36697 | 295.6 | 255.1 | 196.2 |
| DX-36698 | 203.5 | 141.8 | 43.5 |
| DX-36699 | 152.4 | 61.4 | 27.2 |
| DX-36700 | 57.3 | 12.8 | 1.4 |
| DX-36701 | 319.1 | 168.0 | 88.0 |

TABLE 1-continued

Mean fluorescence intensity (multiple) of purified VHH single-domain antibody binding to Raji

| Sample name/ concentration | 5 µg/mL | 0.5 µg/mL | 0.05 µg/mL |
| --- | --- | --- | --- |
| DX-36702 | 214.8 | 92.8 | 6.2 |
| DX-36703 | 264.4 | 191.1 | 107.9 |
| DX-36704 | 224.6 | 198.9 | 76.2 |
| DX-36705 | 76.9 | 17.4 | 1.2 |
| DX-36706 | 226.0 | 213.3 | 167.8 |
| DX-36707 | 291.2 | 272.1 | 200.3 |
| DX-36708 | 212.3 | 103.9 | 39.9 |
| DX-36710 | 1.4 | 0.8 | 1.0 |
| DX-36711 | 153.7 | 31.7 | 31.0 |
| DX-36712 | 1.2 | 0.9 | 1.0 |
| DX-36713 | 149.8 | 29.5 | 3.6 |
| DX-36714 | 373.9 | 334.8 | 147.9 |
| DX-36715 | 32.2 | 2.9 | 1.7 |
| DX-36716 | 1.6 | 1.9 | 1.8 |
| DX-36718 | 130.2 | 29.1 | 2.5 |
| DX-36719 | 335.1 | 262.1 | 91.5 |
| DX-36720 | 175.0 | 72.0 | 15.1 |
| DX-36721 | 530.7 | 451.0 | 271.9 |
| DX-36722 | 330.0 | 202.3 | 39.1 |
| DX-36723 | 1.4 | 1.3 | 1.7 |
| DX-36724 | 58.4 | 10.3 | 1.9 |
| DX-36725 | 363.9 | 96.6 | 15.4 |
| DX-36728 | 458.5 | 297.2 | 132.7 |
| DX-36727 | 255.0 | 167.0 | 53.3 |
| DX-36730 | 430.3 | 326.6 | 155.5 |
| DX-36732 | 202.8 | 90.4 | 25.8 |
| DX-36733 | 6.7 | 1.2 | 1.0 |
| DX-36734 | 260.3 | 189.2 | 90.5 |
| DX-36735 | 156.3 | 44.1 | 2.6 |
| DX-36736 | 187.1 | 73.8 | 19.1 |
| DX-36737 | 327.7 | 252.3 | 155.8 |
| DX-36738 | 204.1 | 104.9 | 33.3 |
| DX-36740 | 42.6 | 4.5 | 1.3 |
| DX-36741 | 45.8 | 6.3 | 1.1 |
| DX-36742 | 256.4 | 134.9 | 21.8 |
| DX-36743 | 135.3 | 19.2 | 1.9 |
| DX-36744 | 392.9 | 168.0 | 59.0 |
| DX-36745 | 171.1 | 63.1 | 10.3 |
| isotype control antibody | 1.3 | 1.0 | 1.0 |

Example 7. ELISA Screening for Single-Domain Antibodies that can Block CD47-SIRPα Interaction Screening for CD47-SIRPα blocking activity of the above VHH single domain antibodies that can bind to Raji cells was performed.

100 µl of 1 µg/mL huCD47-His antigen (purchased from ACRO Biosystems, Cat. No. CD7-H5227) was add to a 96-well plate, and coated overnight at 4° C. The plate was washed three times with 250 µl of PBST, and added 100 µl of purified VHH to the final concentrations of 500, 50, 5, and 0.5 nM, respectively, and incubated at room temperature for 1 h. After washing the plate three times with 250 µl of PBST, 5 nM SIRPα-mIgG1 (purchased from ACROBiosystems, Cat. No. SIA-H52A8) was added and incubated for 1 h. After washing the plate three times with PBST, goat anti-mouse HRP-conjugate (purchased from Invitrogen, Cat. No. 31430) diluted 1:5000 was added and incubated for 45 mins. After washing the plate three times with 250 µl of PBST, TMB (purchased from Cell Signaling Technology, Cat. No. 7004) as a chromogenic substrate was added and developed color for 10 mins. After quenching the reaction with 0.5M HCl, data was read on a microplate reader. $IC_{50}$ was calculated using the nonlinear regression equation of GraphPad Prism5, and the results were shown in Table 2. A total of 31 VHH single-domain antibodies with CD47-SIRPα blocking activity were screened.

TABLE 2

IC50 (nM) of VHH single-domain antibody blocking the interaction of CD47 with SIRPα.

| VHH ID | IC$_{50}$(nM) |
|---|---|
| DX-36697 | 2.676 |
| DX-36698 | 616.3 |
| DX-36699 | 14.97 |
| DX-36700 | 290.4 |
| DX-36701 | 22.19 |
| DX-36702 | 124.2 |
| DX-36703 | 19.23 |
| DX-36704 | 20.92 |
| DX-36706 | 18.63 |
| DX-36707 | 6.172 |
| DX-36708 | 24.01 |
| DX-36713 | 368.1 |
| DX-36714 | 6.798 |
| DX-36719 | 36.64 |
| DX-36721 | 4.886 |
| DX-36722 | 297.7 |
| DX-36728 | 296.3 |
| DX-36727 | 328.8 |
| DX-36730 | 76.41 |
| DX-36731 | 20.26 |
| DX-36732 | 30.1 |
| DX-36734 | 15.52 |
| DX-36735 | 200.1 |
| DX-36736 | 36.98 |
| DX-36737 | 13.82 |
| DX-36738 | 28.69 |
| DX-36741 | 357.9 |
| DX-36742 | 48.61 |
| DX-36743 | 49.94 |
| DX-36744 | 16.17 |
| DX-36745 | 459.8 |

Example 8. Preparation of CD47 Recombinant Antibody by Expi293F Eukaryotic Expression System The above-mentioned 31 VHH single-domain antibodies with CD47-SIRPα blocking activity were used to prepare an Fc-fused bivalent recombinant antibody (VHH-Fc) using the Expi293F expression system. Specifically, according to the sequence of "signal peptide-VHH-constant region" from N-terminus to C-terminus, the amino acid sequence of the signal peptide(SEQ ID NO.13:MGWSCIILFL-VATATGVHS), the amino acid sequence of the VHH antibody, and the amino acid sequence of the heavy chain hinge region to the CH3 domain in the human IgG1 antibody (from UniProt database, sequence P01857) (SEQ ID NO. 14(EPKSCDKTHTCPPCPA-PELLGGPSVFLFPPKPKDTLMISRTPE VTCVVVDVSHEDPE-VKFNWYVDGVEVHNAKTKPREEQYN-STYRVVSVLTVLHQDWL NGKEYKCKVSNKALPA-PIEKTISKAKGQPREPQVYTLPPSRDELTKNQVSLTCL VKGFY PSDIAVEWESNGQPEN-NYKTTPPVLDSDGSFFLYSK-LTVDKSRWQQGNVFSCSVMHEA LHNHYTQKSLSL-SPGK)) were spliced together. After the amino acid sequence was codon-optimized, DNA was synthesized by whole gene synthesis (Jinweizhi Biotechnology Co., Ltd., Suzhou) and connected to pcDNA3.4 expression vector (purchased from Invitrogen, Cat. No. A14697) through XbaI and EcoRV restriction sites. Competent *E. coli* was transformed by conventional methods to prepare endotoxin-free plasmids.

According to the sequence of "signal peptide-variable region-constant region" from N-terminus to C-terminus, the amino acid sequence of the signal peptide, the amino acid sequence of the heavy chain variable region of the control antibody 5F9 (PLoS ONE. 2015. 10(9): e0137345, https://doi.org/10.1371/journal.pone.0137345), i.e., SEQ ID NO. 35 (QVQ LQQPGAELVKPGASVMMSCK-ASGYTFTNYNMEIWVKQTPGQ-GLEWIGTIYPGNDDTS YNQKFKDKATLTADKSS-SAAYMQLSSLTSEDSAVYYCARGGYRAMDYWGQTS VTVSS) and the amino acid sequence of the heavy chain constant region of human IgG4 antibody (from UniProt database, sequence P1861, comprising the S228P mutation), i.e., SEQ ID NO.36 (ASTKGPSVFPLAPCSRSTSE STAALGCLVKDYFPEPVTVSWNSGALT-SGVHTFPAVLQSSGLYSLSSVVTVPSSSLGTKT YTCNVDHKPSNTKVDKRVESKYGPPCPPCPAPE-FLGGPSVFLFPPKPKDTLMISRTPEVT CVVVDVSQEDPEVQFNWYVDGVEVHNAKTKPRE-EQFNSTYRVVSVLTVLHQDWLNG KEYKCKVSNKGLPSSIEKTISKAKGQPREPQVYTLPP-SQEEMTKNQVSLTCLVKGFYPS DIAVEWESNGQPEN-NYKTTPPVLDSDGSFFLY-SRLTVDKSRWQEGNVFSCSVMHEALH NHYTQKSLSLSLGK) were spliced together. The amino acid sequence of the signal peptide, the amino acid sequence of the 5F9 light chain variable region(PLoS ONE. 2015. 10(9): e0137345, PLoS ONE. 2015. 10(9): e0137345, https://doi.org/10.1371/journal.pone. 0137345), i.e. SEQ ID NO. 37(DVLMTQTPLSLPVSLGDQASISCRSSQ-SIVYSNG NTYLGWYLQKPGQSPKLLIYKVSNRFSGVPDRFSGS GSGTDFTLKISRVEAEDLGVYHC FQGSHVPY-TFGGGTKVEIK), and the amino acid sequence of the light chain constant region (UniProt database, sequence P01834), i.e. SEQ ID NO. 38(RTVAAP SVFIFPP SDEQLKSG-TASVV CLLNNFYPREAKVQWKVDN ALQSGNSQESVTEQDSKDSTYSLSSTLTLSKA DYEKHKVYACEVTHQGLSSPVTKSFNRGEC) were spliced together. After the above sequence was codon-optimized, the whole gene was synthesized into DNA, and the DNA was ligated to the pcDNA3.4 expression vector through XbaI and EcoRV restriction sites. Competent *E. coli* was transformed by conventional methods to prepare endotoxin-free plasmids.

$6 \times 10^7$ Expi293F cells (purchased from Gibco, Cat. No. A14527) were inoculated into 30 mL of Expi293F expression medium (purchased from Gibco, Cat. No. A14351-01), and cultured in a shaker at 37° C., 8% $CO_2$ at 125 rpm for 24 h, and the cell density and vitality was measured. According to the instruction of ExpiFectamine™ 293 Transfection Kit (purchased from Gibco, Cat. No. A14524), 80 µl of ExpiFectamine™293 reagent was mixed with 1420 µl of Opti-MEM I medium (purchased from Gibco, Cat. No. 31985062) gently, let stand at room temperature for 5 mins, and then mixed with 30 µg of pcDNA3.4 expression plasmid and Opti-MEM I medium gently, and allowed to stand at room temperature for 20 mins. The above-mentioned transfection reagent was added to the Expi293F cell culture solution, and after culturing for 20 hours, add the pre-mixed ExpiFectamine 293 transfection enhancer was added, and cultured in a shaker at 37° C., 8% $CO_2$ at 125 rpm for 5-7 days.

The cell culture solution was centrifuged at 1200 rpm for 3 mins to remove the cell pellet, the supernatant was collected, and the VHH-Fc fusion bivalent recombinant antibody was purified according to the instructions of the AmMag™ magnetic bead purification system (purchased from GenScript Biotechnology, Cat. No. L00695). The OD280 was determined by a microplate reader for protein quantification, and 3 µg of the recombinant antibody was

Example 9. Erythrocyte Agglutination Assay

Figure 4:
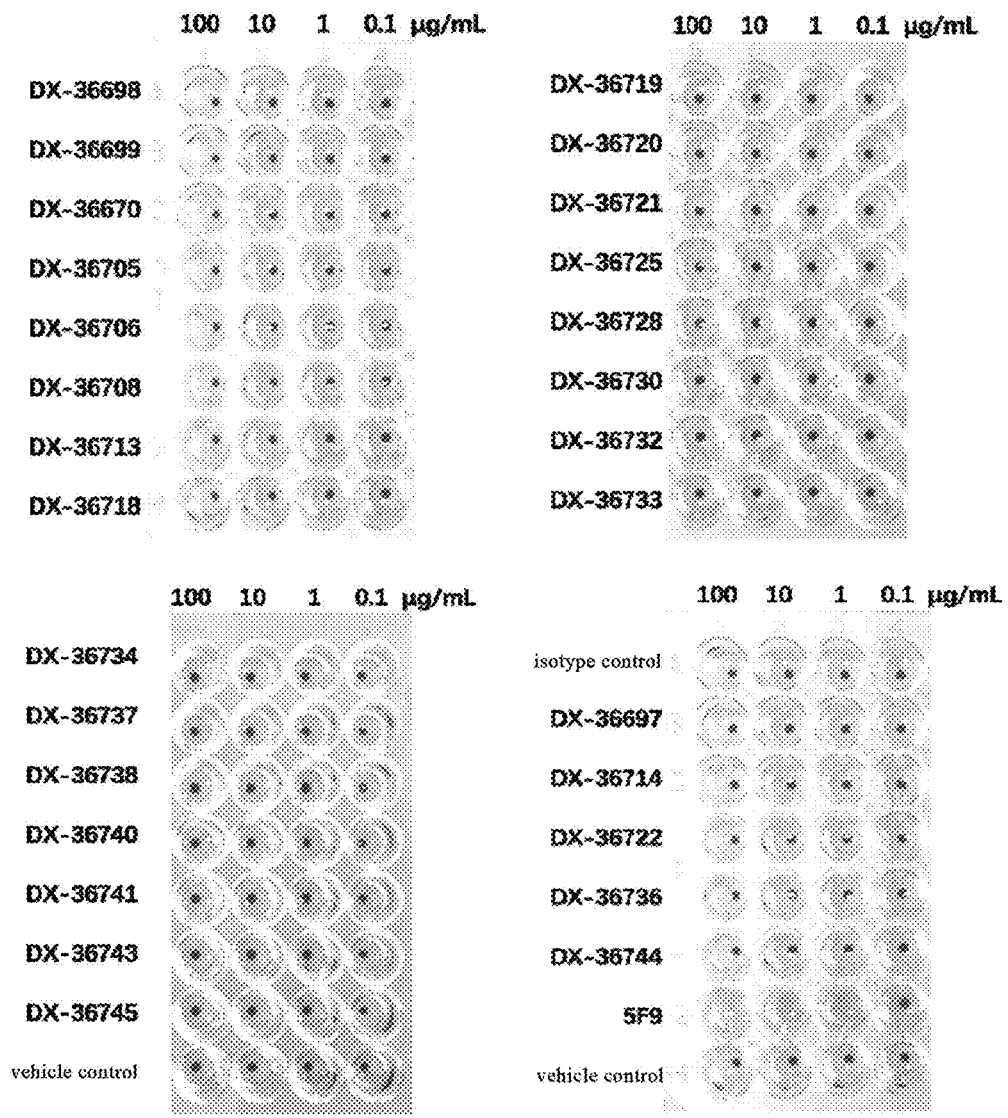
FIG. 4. In vitro erythrocyte agglutination assay results. The control antibody 5F9 causes severe agglutination of erythrocytes in the concentration range of 1 µg/mL and above (the agglutination is clustered and spread on the bottom of the well), and the VHH-Fc fusion bivalent recombinant antibody does not cause erythrocyte agglutination in the concentration range of 0.1-100 µg/mL (under the action of gravity, it naturally settles at the bottom of the U-shaped well, forming a dot in the center of the bottom).

The 28 VHH-Fc fusion bivalent recombinant antibodies purified above were screened for erythrocyte agglutination, and the molecules that did not cause erythrocyte agglutination were selected. Human erythrocytes are obtained from Saili Biotechnology Co., Ltd. (Shanghai). The human erythrocytes were rinsed once with 10 mL of PBS, and the cells were collected by centrifugation at 1000 rpm for 3 mins. After rinsing twice, the erythrocytes were resuspended in PBS, counted with a hemocytometer, and the cell density was adjusted to $4\times10^7$ cells/mL. In a 96-well U-shaped plate, 100 µl ($4\times10^6$) of erythrocytes were added to each well, followed by 100 µl of gradiently diluted VHH-Fc fusion bivalent recombinant antibody or 5F9 control antibody (final antibody concentrations of 100, 10, 1, and 0.1 µg/mL respectively), and 100 µl of PBS was added to the blank control well. After mixing, the 96-well U-shaped plate was placed in an incubator at 37° C., 5% $CO_2$ for 2 hours, and then the 96-well plate was taken out and photographed on a white background plate. The results were shown in FIG. 4.

5F9 antibody can cause severe erythrocyte agglutination at concentrations ranging from 1 µg/mL to 100 µg/mL. The VHH-Fc fusion bivalent recombinant antibody did not cause erythrocyte agglutination at any concentration.

Figure 5:
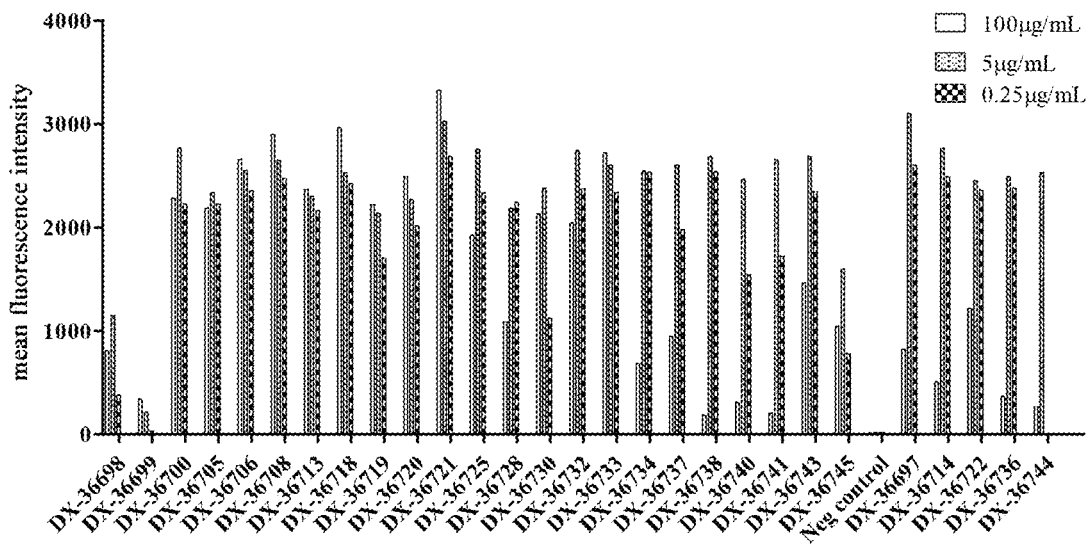
FIG. 5. VHH-Fc fusion bivalent recombinant antibodies that do not bind to human erythrocytes are screened by flow cytometry. Among the 28 VHH-Fc fusion bivalent recombinant antibodies to be tested, DX-36698 and DX-36699 have the weakest binding signals to human erythrocytes.

Example 10. FACS Detection of Binding of VHH-Fc Fusion Bivalent Recombinant Antibody to Human Erythrocytes The binding of the VHH-Fc fusion bivalent recombinant antibody to human erythrocytes was detected by flow cytometry (FACS), and the molecules that did not or weakly bind to human erythrocytes were selected. The human erythrocytes were rinsed with PBS for 3 times and then counted with a hemocytometer, resuspended with PBS+1% FBS and adjusted to a cell density of $1\times10^7$ cells/mL. 100 µl ($1\times10^6$ cells/mL) of suspension was added to each well of a 96-well U-shaped plate. The VHH-Fc fusion bivalent recombinant antibody and the 5F9 antibody were gradiently diluted with PBS+1% FBS, and 100 µl of the dilution was added to each well (final concentrations are 0.25, 5, 100 µg/mL, or 0.018-300 nM), and incubated at 4° C. for 1 h. After the cells were centrifuged at 1000 rpm for 3 mins, rinsed once with PBS+1% FBS, 100 µl of 1:1000 diluted goat anti-human IgG (H+L)-AlexaFluor488 (purchased from eBioscience, Cat. No. A11013) was added to each well, and incubated at 4° C. for 45 mins. The cells were centrifuged at 1000 rpm for 3 mins, rinsed twice with PBS+1% FBS, resuspended in 200 µl of PBS+1% FBS, and transferred to a flow tube for on-board detection. The data were processed with FlowJo_V10 software and graphed with GraphPad Prism5, and the results were shown in FIG. 5.

Figure 6:
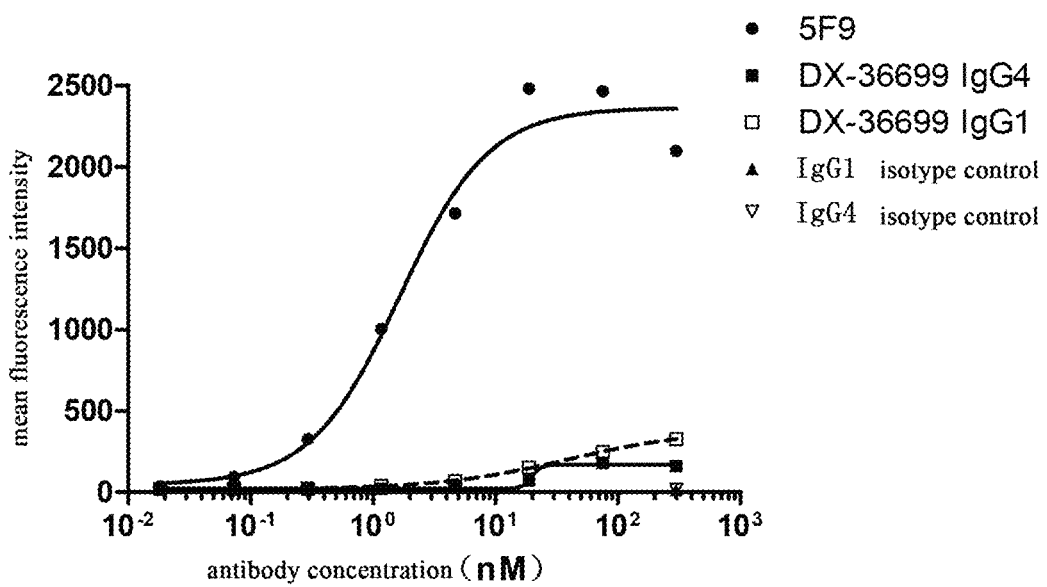
FIG. 6. The binding of VHH-Fc fusion bivalent recombinant antibodies and 5F9 antibodies to human erythrocytes is detected by flow cytometry. 5F9 binds to human erythrocytes in a concentration-dependent manner, and DX-36699 (IgG1 subtype and IgG4 subtype) only weakly binds to erythrocytes in the concentration range of 0.018~300 nM.

Among the 28 VHH-Fc fusion bivalent recombinant antibodies, DX-36698 and DX-36699 had very weak binding to erythrocytes, and DX-36699 had the weakest binding to erythrocytes. At the same molar concentration, the binding of DX-36699 to human erythrocytes was much weaker than that of 5F9, and the results were shown in FIG. 6.

Figure 7:
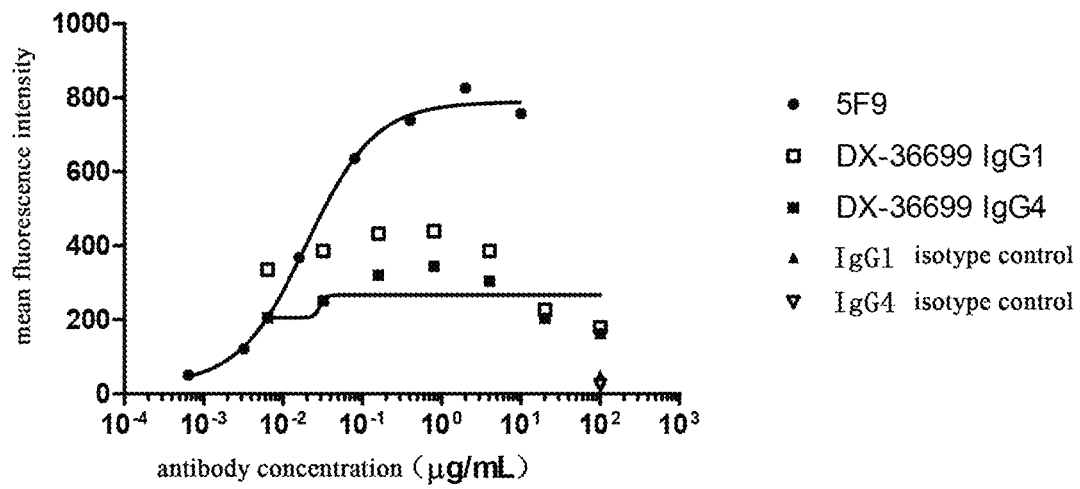
FIG. 7. The binding of the VHH-Fc fusion bivalent recombinant antibodies and 5F9 antibodies to human platelets is detected by flow cytometry. 5F9 binds to human platelets in a concentration-dependent manner within the concentration range of 0.00064-10 µg/mL. DX-36699 (IgG1 subtype and IgG4 subtype) has weaker binding to platelets than 5F9 at the concentration of 0.0064100 µg/mL.
Figure 8A:
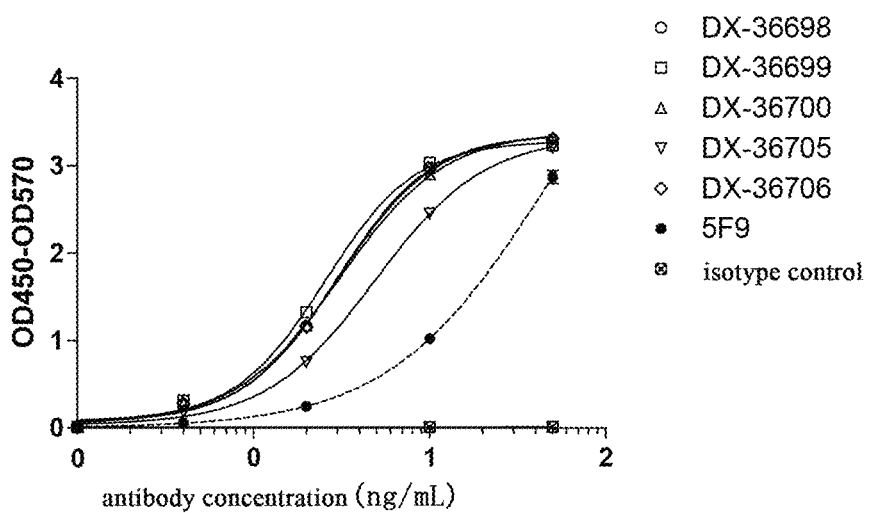
FIG. 8. The binding activity of the VHH-Fc fusion bivalent recombinant antibodies to huCD47 recombinant protein is detected by ELISA. At the concentration of 0.150 ng/mL, all the 28 VHH-Fc fusion bivalent recombinant antibodies bind to huCD47 in a concentration-dependent manner, and the binding signal is stronger than that of 5F9 antibodies at the same concentration.
Figure 8B:
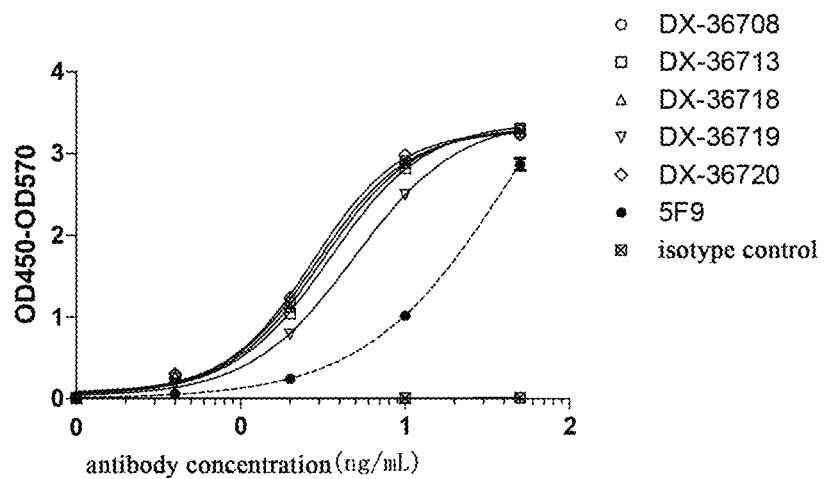
Figure 8C:
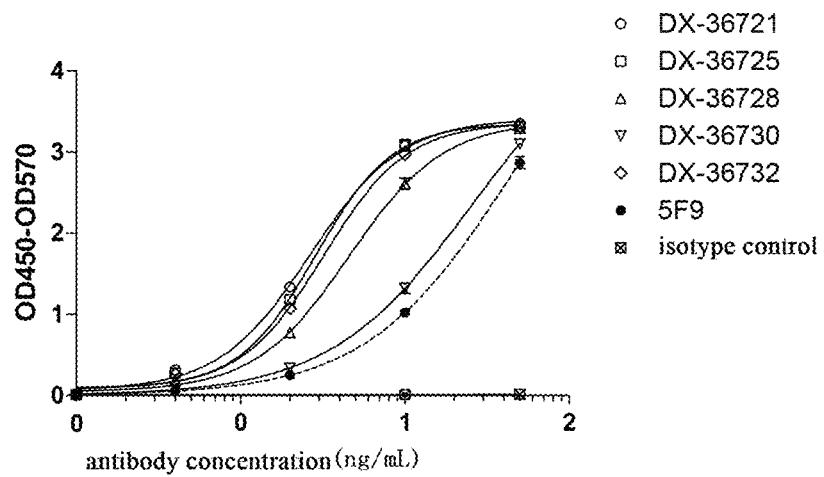
Figure 8D:
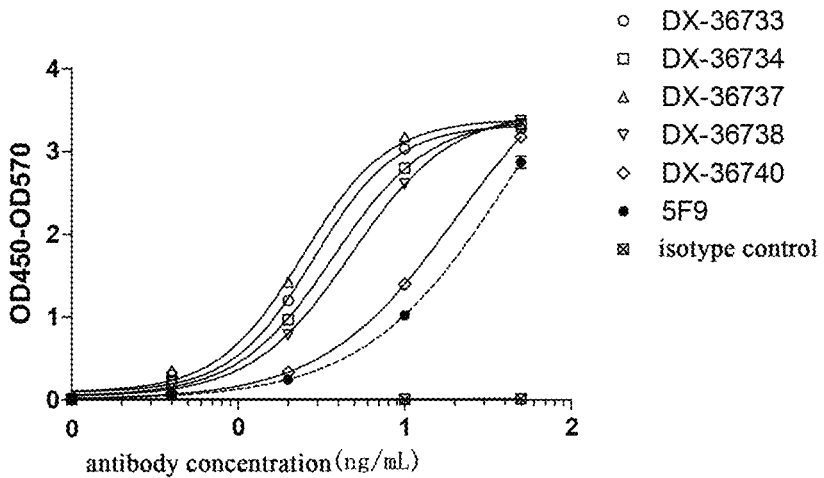
Figure 8E:
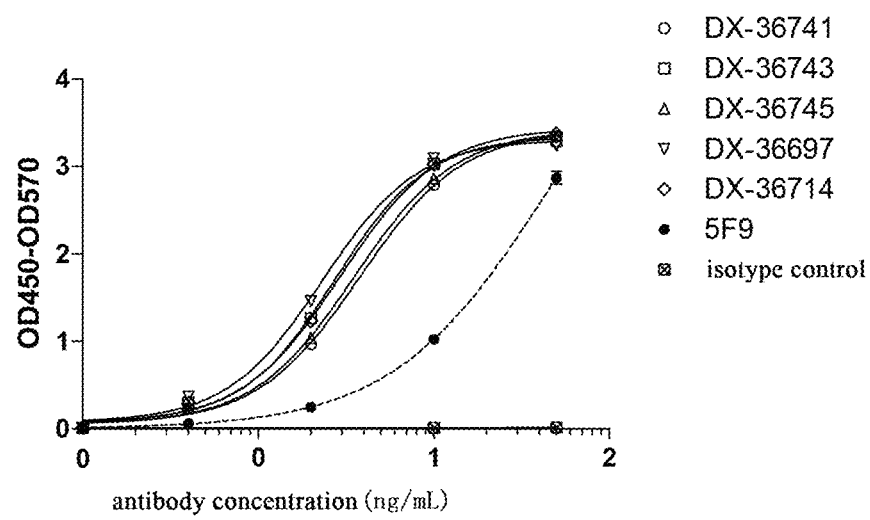
Figure 8F:
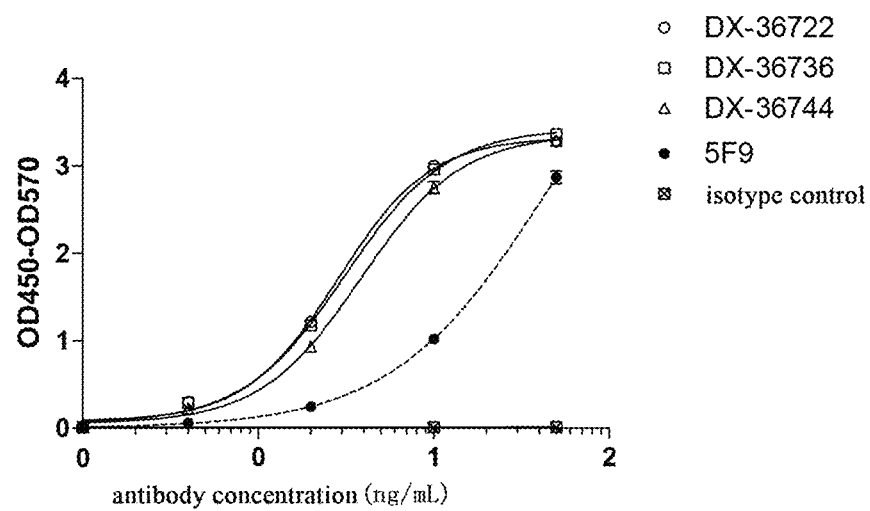

Example 11. Binding of VHH-Fc Fusion Bivalent Recombinant Antibodies to Human Platelets The binding of VHH-Fc fusion bivalent recombinant antibody DX-36699 and control antibody 5F9 to human platelets (purchased from Allcells Biotechnology Co., Ltd.) was detected by flow cytometry (FACS). After the platelets were counted with a hemocytometer, the density of the platelets was adjusted to $1.5\times10^7$/mL with PBS+1% FBS, and 100 µL of above sample was added to each well of a 96-well U-shaped plate. Then 100 µl of the VHH-Fc fusion bivalent recombinant antibody or the 5F9 control antibody (the final concentration of DX-36699 was 0.0064-100 µg/mL, and the final concentration of 5F9 was 0.00064-10 µg/mL, all of which were diluted in 5-fold ratio) was added, and the final concentration of the isotype control antibody was 100 µg/mL. After incubating at 4° C. for 1 h, the samples were centrifuged at 1000 rpm for 3 mins and rinsed once with PBS+1% FBS. 100 µl of 1:1000 diluted goat anti-human IgG (H+L)-AlexaFluor488 (purchased from eBioscience, Cat. No. A11013) was added to each well, and incubated at 4° C. for 45 mins. The samples were centrifuged at 1000 rpm for 3 mins, rinsed twice with PBS+1% FBS, resuspended in 200 µl of PBS+1% FBS, and transferred to a flow tube for on-board detection. The data were processed with FlowJo_V10 software and graphed with GraphPad Prism5, and the results were shown in FIG. 7.

The mean fluorescence intensity of the control antibody 5F9 binding to human platelets at 0.08 µg/mL and higher concentrations were all >600. The mean fluorescence intensity of DX-36699 (IgG1 and IgG4 subtypes) binding to human platelets at all concentrations was <400, indicating that binding of this antibody to human platelets was much weaker than that of 5F9 to human platelets.

Example 12. Binding of VHH-Fc Fusion Bivalent Recombinant Antibody to CD47

The binding of the aforementioned 28 VHH-Fc fusion bivalent recombinant antibodies to human CD47 recombinant protein was detected by ELISA. 100 µl of huCD47-mFc (purchased from AcroBiosystems, Cat. No. CD7-H52A5) antigen at a concentration of 1 µg/mL was added to each well of a 96-well microtiter plate, and coated overnight at 4° C. After rinsing 4 times with 250 µl of PBST, 200 µl of PBS comprising 1% BSA was added, and the sample was blocked at room temperature for 1 h. After rinsing 4 times with 250 µl of PBST, gradient-diluted VHH-Fc fusion bivalent recombinant antibody (the final concentration was 0.1-50 ng/mL) was added, and incubated at room temperature for 1 h. After rinsing the 96-well plate 4 times with 250 µl of PBST, 100 µl of 1:10000 diluted goat anti-human Fc-HRP (purchased from Jackson ImmunoResearch, Cat. No. 109-035-098) was added to each well, and incubated at room temperature for 1 h. After rinsing 4 times with 250 µl of PBST, 100 µl of TMB substrate (purchased from Cell Signaling Technology, Cat. No. 7004) was added to each well for color development. After 10 mins, 50 µl of 2M $H_2SO_4$ was added to each well to stop the color development, and the absorbance value (OD450) was read on a microplate reader. The data were processed and graphed by GraphPad Prism5 nonlinear regression equation. The results were shown in FIG. 8. All the 28 VHH-Fc fusion bivalent recombinant antibodies can bind to human CD47 recombinant protein in a concentration-dependent manner.

Binding of VHH-Fc fusion bivalent recombinant antibodies to CD47 positive cells was detected by flow cytometry.

Figure 9:
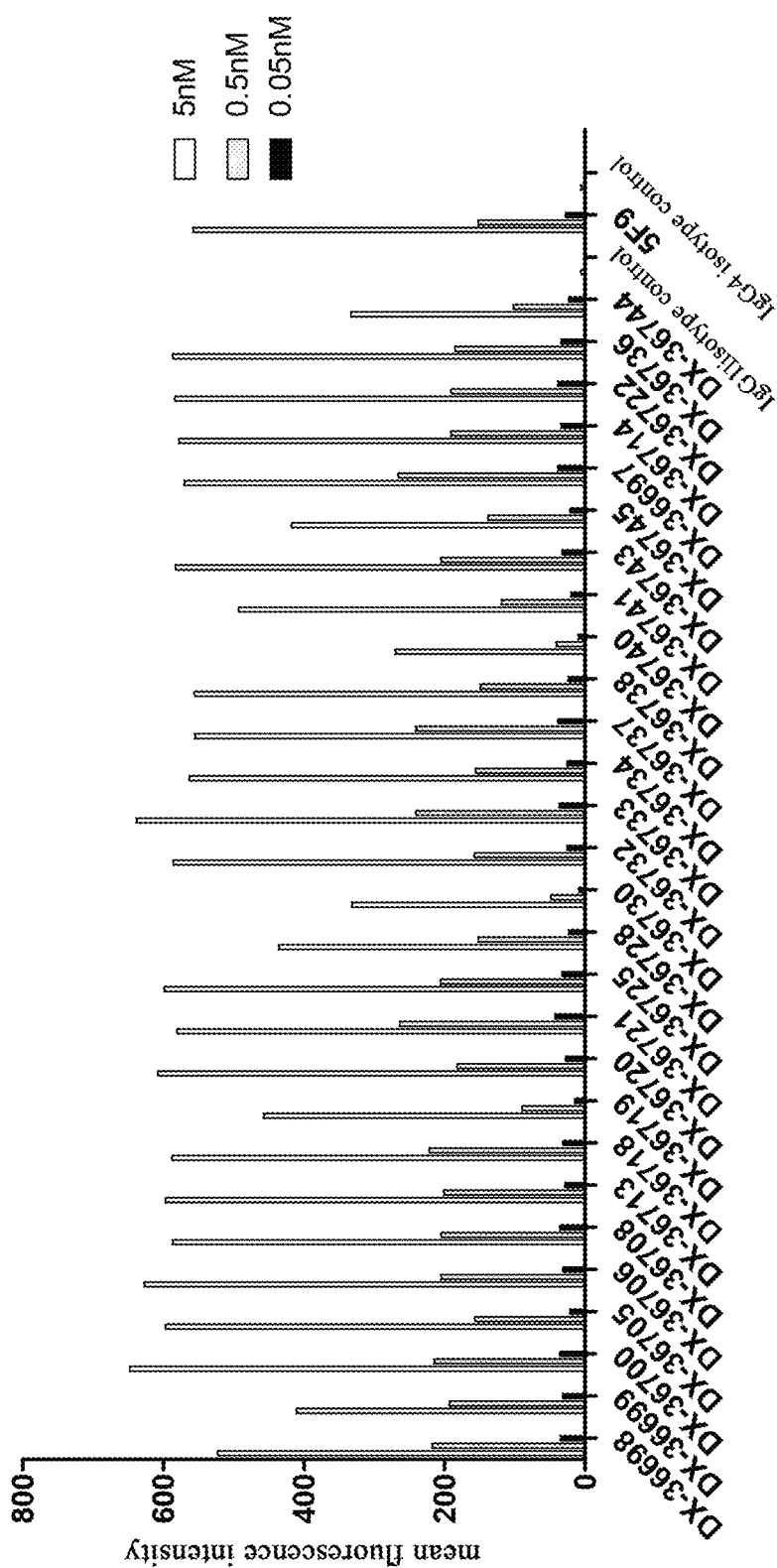
FIG. 9. The binding of the VHH-Fc fusion bivalent recombinant antibodies to gastric cancer cells NUGC-4 (positive for CD47) is detected by flow cytometry. In the concentration range of 0.05-5 nM, all the VHH-Fc fusion bivalent recombinant antibodies bind to NUGC-4 cells in a concentration-dependent manner. The isotype control antibodies do not bind to NUGC-4 cells.
Figure 10A:
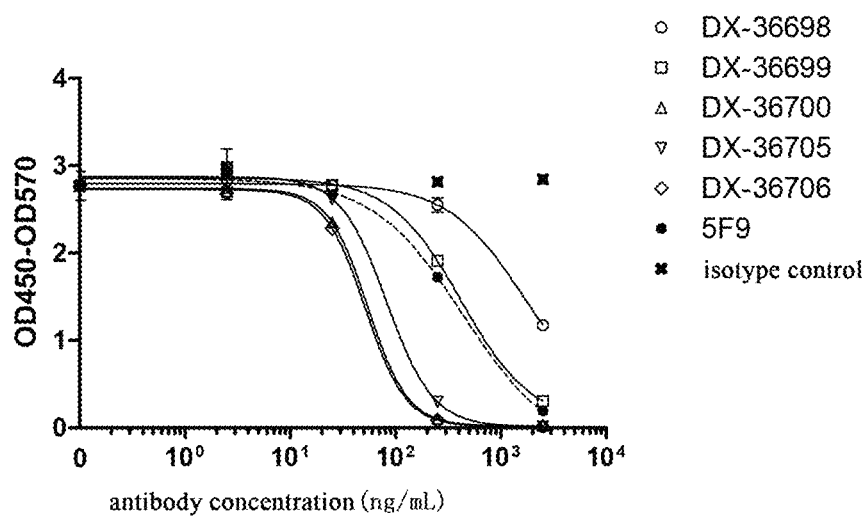
FIG. 10. The activity of the VHH-Fc fusion bivalent recombinant antibodies to block the interaction between CD47 recombinant protein and SIRPα recombinant protein is detected by ELISA. In the concentration range of 0.1-2500 ng/mL, 28 VHH-Fc fusion bivalent recombinant antibodies can block the interaction between CD47 and SIRPα in a concentration-dependent manner. The isotype control antibodies have no effect on the interaction of CD47 with SIRPα.
Figure 10B:
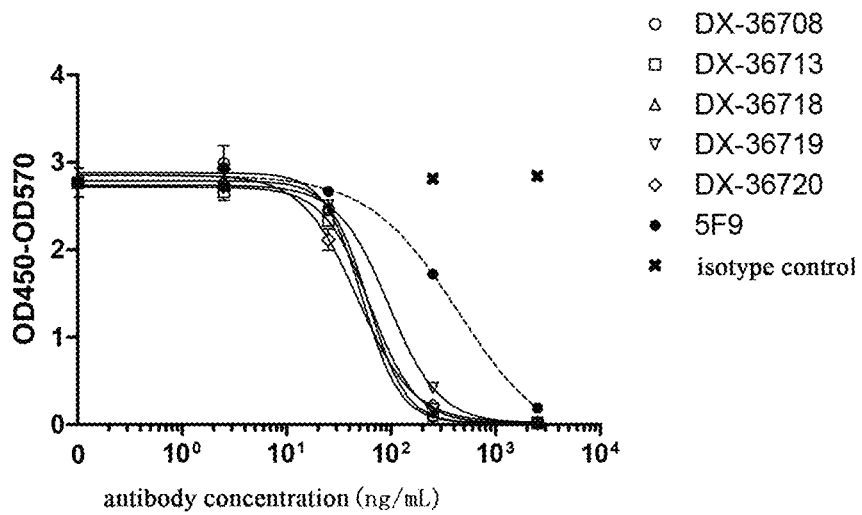
Figure 10C:
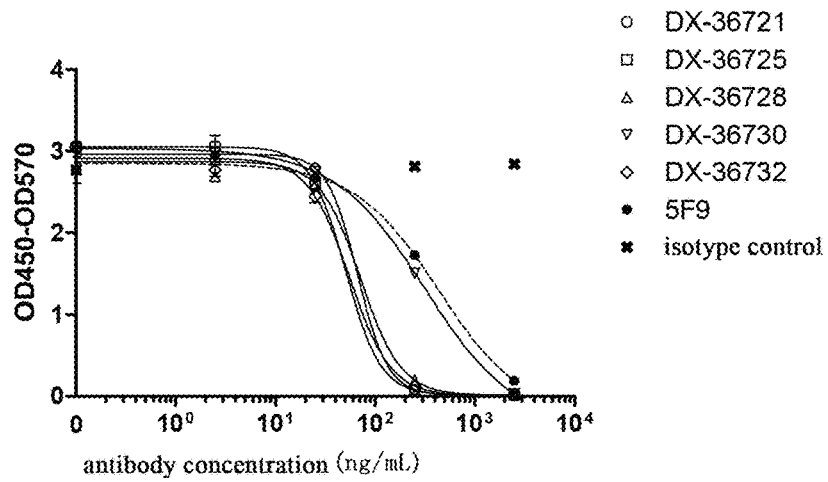
Figure 10D:
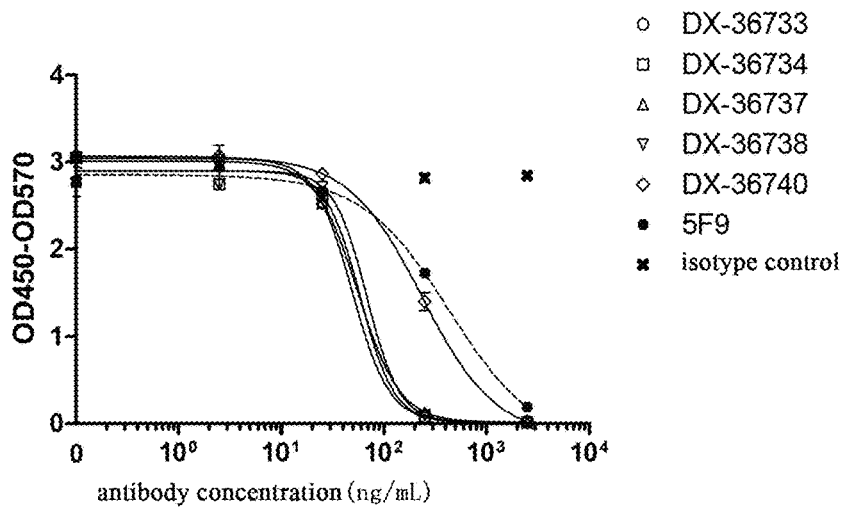
Figure 10E:
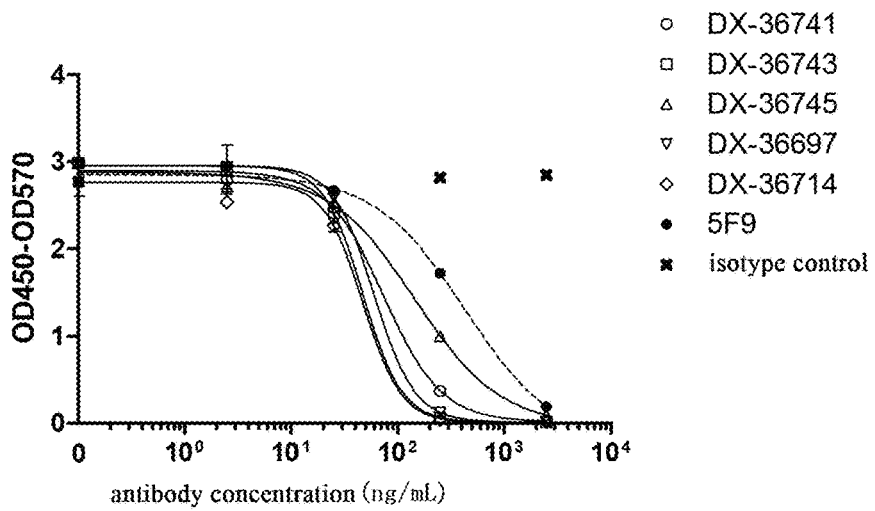
Figure 10F:
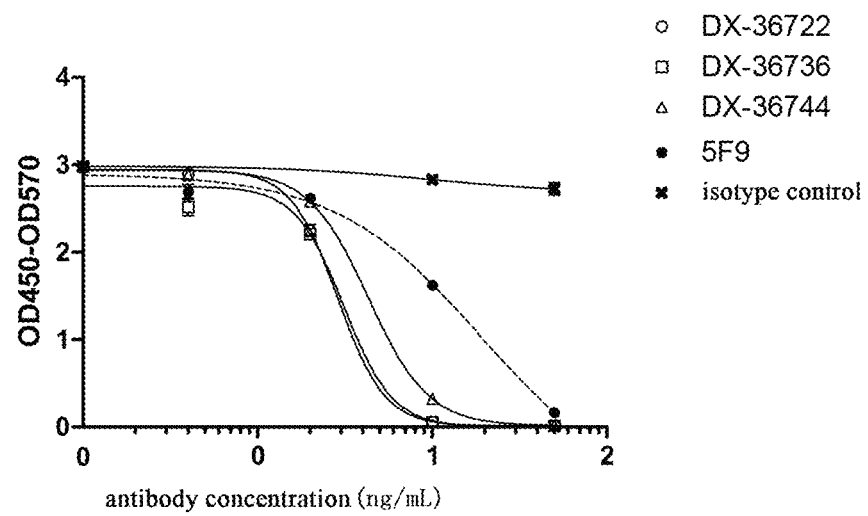
Figure 11A:
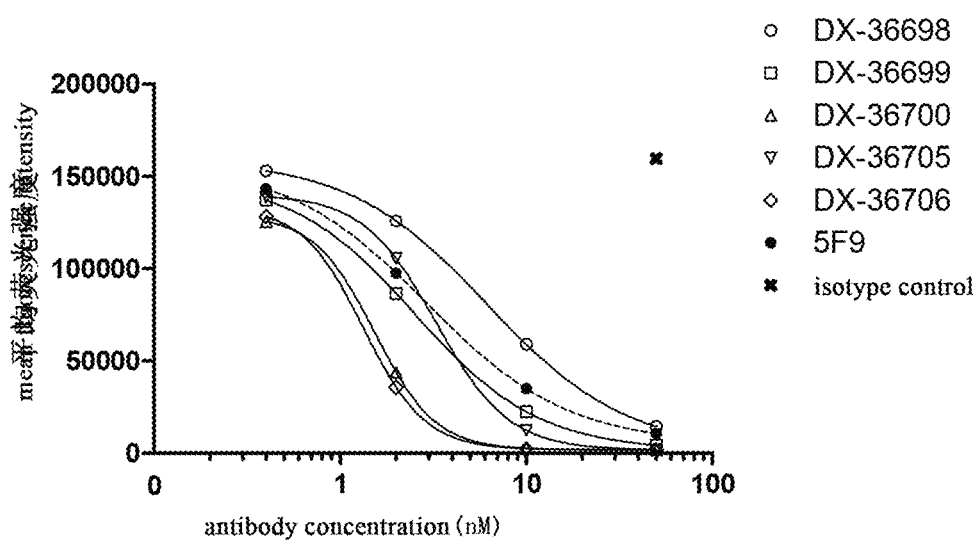
FIG. 11. The activity of the VHH-Fc fusion bivalent recombinant antibodies to block the interaction between CD47 recombinant protein and SIRPα positive cells HEK293-SIRPα is detected by flow cytometry. In the concentration range of 0.4-50 nM, 28 VHH-Fc fusion bivalent recombinant antibodies block the binding of CD47 recombinant protein to HEK293-SIRPα cells in a concentration-dependent manner. The isotype control antibodies have no effect on the interaction of CD47 recombinant protein with HEK293-SIRPα cells.
Figure 11B:
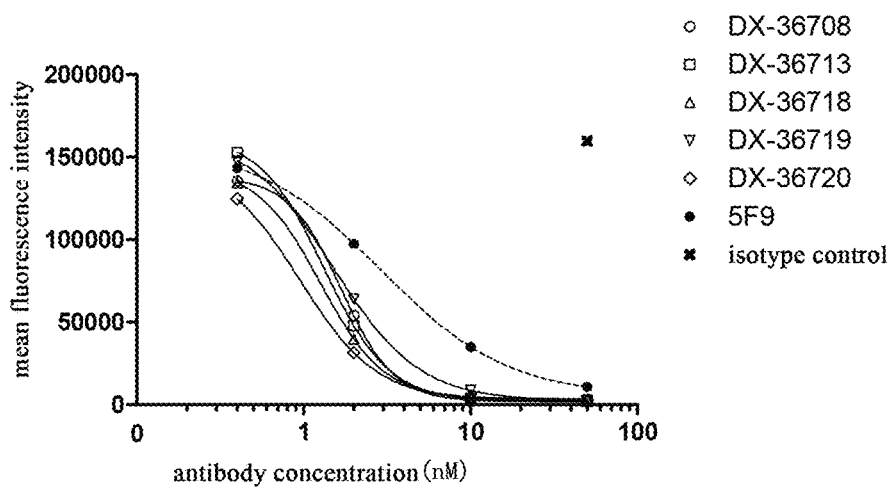
Figure 11C:
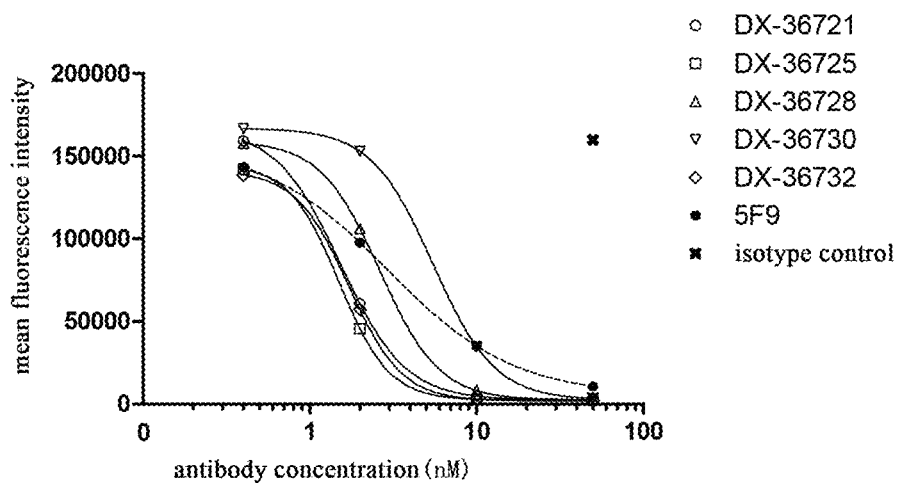
Figure 11D:
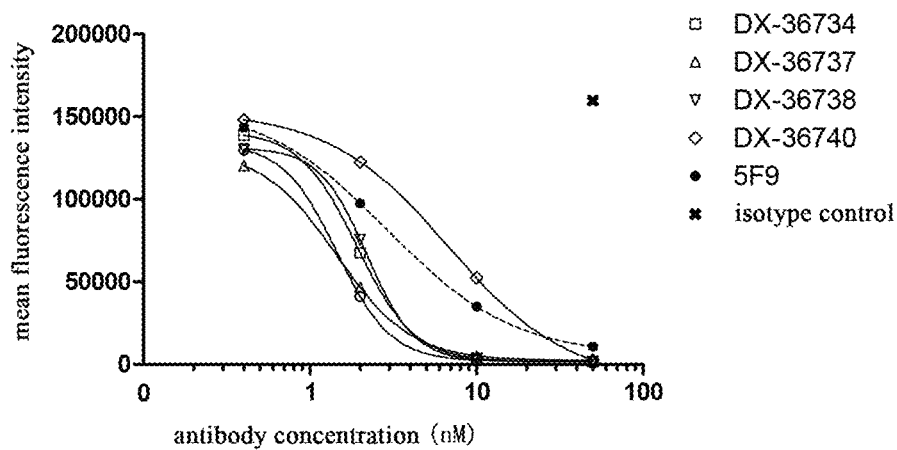
Figure 11E:
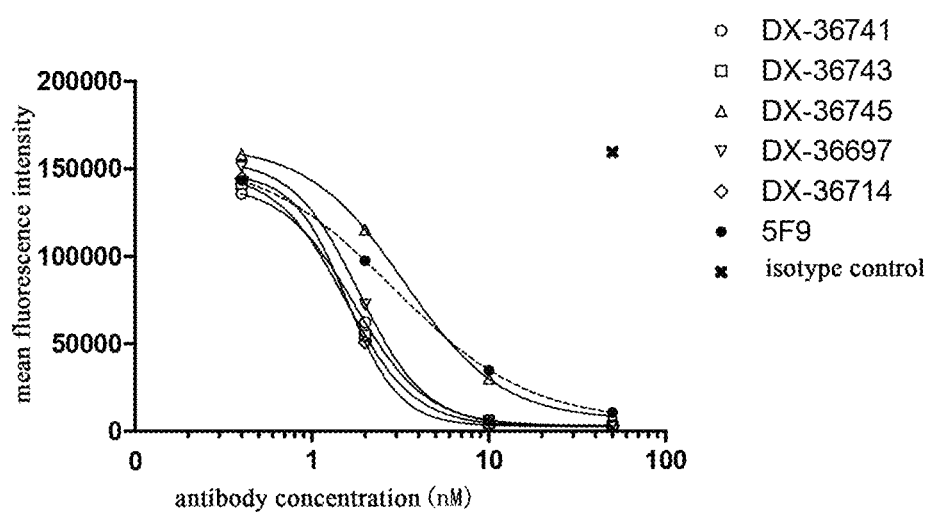
Figure 11F:
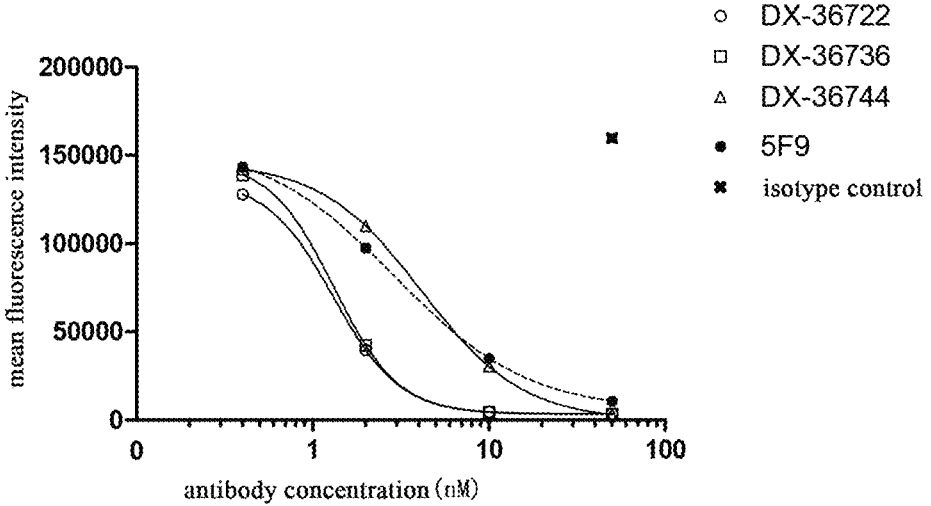
Figure 12A:
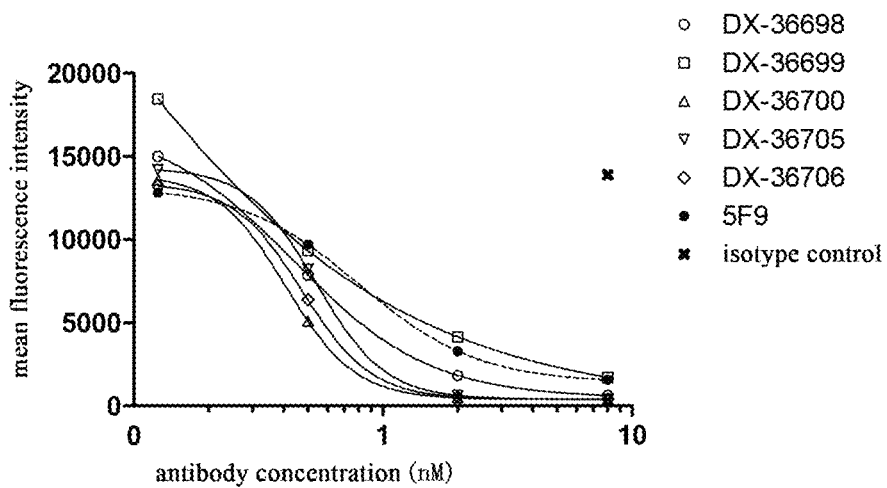
FIG. 12. The activity of the VHH-Fc fusion bivalent recombinant antibodies to block the interaction between SIRPα recombinant protein and CD47 positive cells (Jurkat) is detected by flow cytometry. In the concentration range of 0.125-8 nM, the 28 VHH-Fc fusion bivalent recombinant antibodies block the interaction between SIRPα and Jurkat cells in a concentration-dependent manner. The isotype control antibodies have no effect on the interaction between SIRPα and Jurkat cells.
Figure 12B:
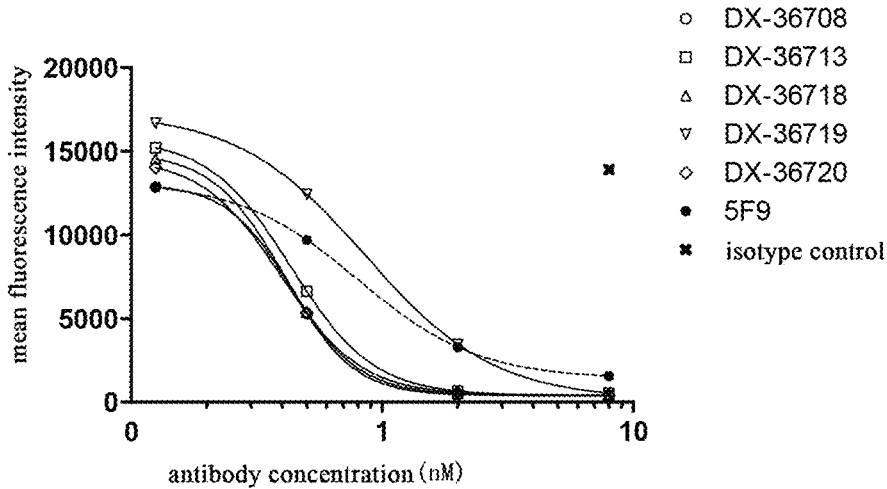
Figure 12C:
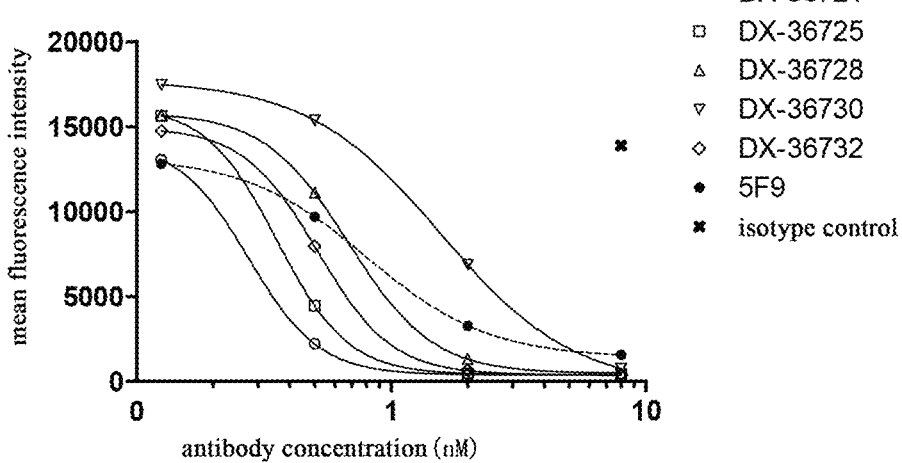
Figure 12D:
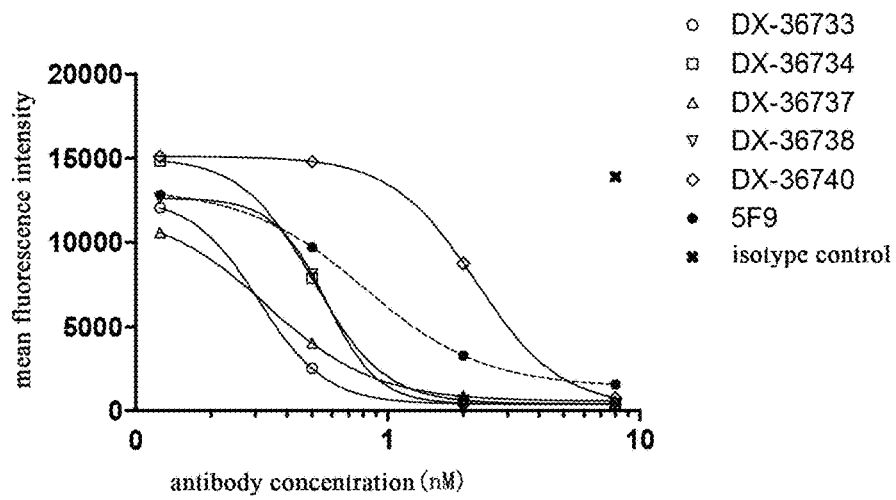
Figure 12E:
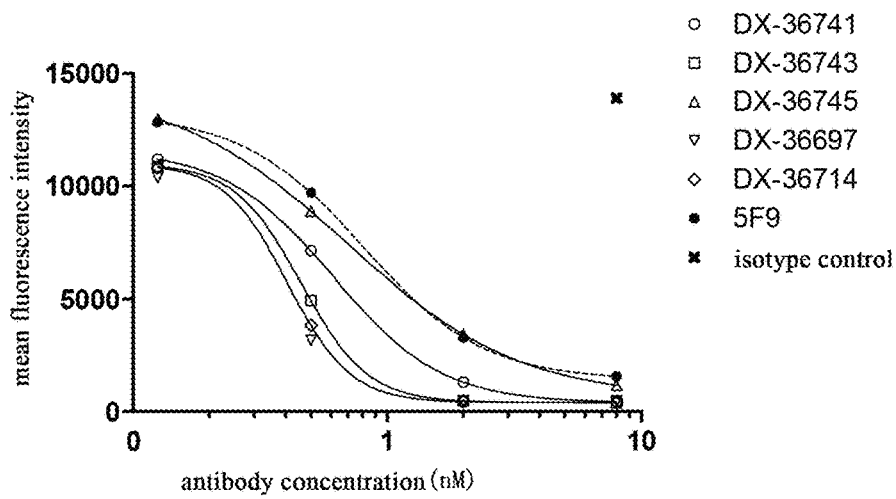
Figure 12F:
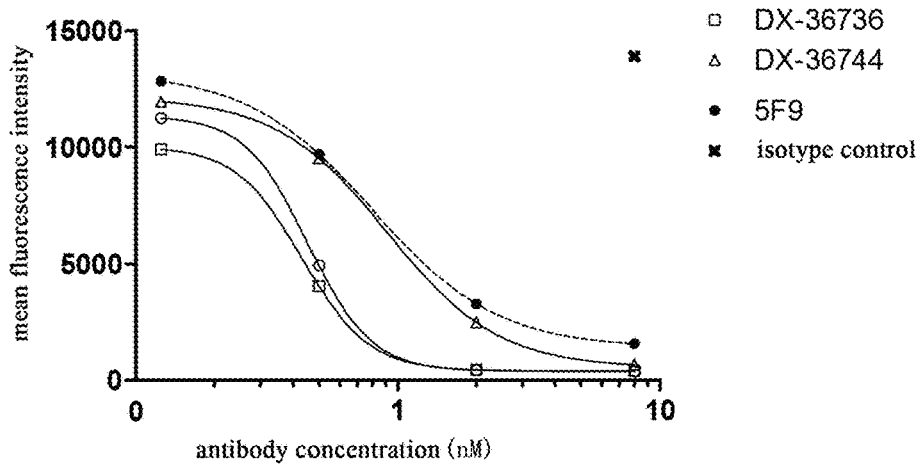

Gastric cancer cells NUGC-4 (purchased from Nanjing Kebai Biotechnology Co., Ltd., Cat. No. CBP60493) were cultured in RPMI-1640 medium comprising 10% FBS. After cells were rinsed with PBS, and digested with trypsin (purchased from Gibco, Cat. No. 12605-028), the cells were collected by centrifugation at 800 rpm for 3 mins and resuspended in RPMI-1640 medium. After the cells were counted, the density of the cells was adjusted to $1.5\times10^6$ cells/mL, and $1.5\times10^5$ NUGC-4 cells were added to each well of a 96-well U-shaped plate. The VHH-Fc fusion bivalent recombinant antibodies and the 5F9 antibodies were gradiently diluted with PBS+1% FBS, 100 µl of antibody was added to each well, and the final concentrations were 0.05, 0.5, and 5 nM, respectively. After mixing, the solution was incubated at 4° C. for 1 h. After collecting cells by 1000 rpm centrifugation, the cells were rinsed once with PBS+1% FBS. 100 µl of 1:1000 diluted goat anti-human IgG (H+L)-Alexa488 (purchased from eBioscience, Cat. No. A11013) was added to each well, and incubated at 4° C. for 1 h. After collecting cells by 1000 rpm centrifugation, the cells were rinsed twice with PBS+1% FBS. After resuspending the cells with 200 µl of PBS+1% FBS, they were transferred to a flow tube for on-board detection. The data were processed and graphed using the GraphPad Prism5 nonlinear regression equation, and the results were shown in FIG. 9. FIG. 9 showed that at the antibody concentration of 0.5 nM and 5 nM, the above-mentioned 28 VHH-Fc fusion bivalent recombinant antibodies can bind to NUGC-4 cells in a concentration-dependent manner.

Example 13. VHH-Fc Fusion Bivalent Recombinant Antibody Blocks CD47-SIRPα Binding Three experimental methods were used to evaluate the neutralizing activity of the VHH-Fc fusion bivalent recombinant antibody on the interaction between CD47 and SIRPα: (1) using the ELISA method to detect the activity of the antibody blocking the interaction between CD47 recombinant protein and SIRPα recombinant protein; (2) using flow cytometry to evaluate the activity of antibody blocking the interaction between CD47 recombinant protein and HEK293-SIRPα cells (expressing model SIRPα); (3) Using flow cytometry to evaluate the activity of antibody blocking the interaction between SIRPα recombinant protein and Jurkat cells (expressing model CD47).

(1) Detecting the Interaction Between CD47 Recombinant Protein and SIRPα Recombinant Protein by ELISA 100 µl of 1 µg/mL SIRPα-His (purchased from Acro Biosystems, Cat. No. SIA-H5225) was added to each well of the 96-well plate, and coated overnight at 4° C. After rinsing 4 times with PBST, 200 µl of PBS+1% BSA was added to each well, blocking for 1 h at room temperature, and rinsing 4 times with PBST. The antibody was gradiently diluted with 40 ng/mL biotinylated-CD47 (Acro Biosystems #CD7-H82E9) solution, 100 µl of the diluted antibody was added to each well of a 96-well plate, and incubated at room temperature for 1 h. The 96-well plate was rinsed 4 times with PBST, 100 µl of Steptavidin-HRP (Invitrogen #434323) diluted 1:2500 was added to each well, and incubated at room temperature for 1 h. After rinsing the 96-well plate four times with PBST, 100 µl of TMB substrate (Cell Signaling, Cat. No. 7004) was added to each well, and after color development at room temperature for 10 mins, 50 µl of stop solution was added to stop the reaction. The data was read on a microplate reader and analyzed with GraphPad Prism5, the results were shown in FIG. 10. FIG. 10 showed that in the concentration range of 0.1-2500 ng/mL, the 28 VHH-Fc fusion bivalent recombinant antibodies can block the interaction of CD47 and SIRPα in a concentration-dependent manner.

(2) Interaction Between CD47 Recombinant Protein and SIRPα Positive Cells HEK293-SIRPα are Detected by Flow Cytometry The engineered cells expressing SIRPα, HEK293-SIRPα, were cultured in DMEM medium (purchased from Gibco, Cat. No. 10569044) comprising 10% FBS, and 100 m/mL hygromycin B (purchased from Thermo Fisher Scientific, Cat. No. 10687044), and digested by trypsin, and then counted and resuspended in PBS+1% FBS. In a 96-well U-shaped plate, 100 µl of cells ($1.5\times10^5$ cells) were added to each well. After the antibody was gradiently diluted, 50 µl of the antibody was added to the 96-well U-shaped plate, and 50 µl of biotinylated-CD47 (purchased from ACROBiosystems, Cat. No. CD7-H82E9) was added to a final concentration of 60 ng/mL, mixed well and incubated at 4° C. for 1 h. The cells were collected by centrifugation at 1000 rpm for 3 mins, rinsed once with PBS+1% FBS, and then added with 100 µl of Anti-biotin PE (purchased from Thermo Fisher Scientific, Cat. No. 12-9895-82) diluted 1:100, and incubated at 4° C. for 45 mins. The cells were collected by centrifugation at 1000 rpm for 3 mins, rinsed twice with PBS+1% FBS, resuspended in 200 µl of PBS+1% FBS, and transferred to a flow tube to detect the fluorescent signal of PE on-board. The mean fluorescence intensity MFI data were analyzed with GraphPad Prism5 and the results were shown in FIG. 11.

(3) The Interaction Between SIRPα Recombinant Protein and CD47 Positive Cells Jurkat is Detected by Flow Cytometry.

Human T lymphocytic leukemia cells Jurkat (purchased from the Chinese Academy of Sciences Cell Bank, Cat. No. SCSP-513) were cultured in RPMI-1640 medium, washed once with PBS+1% FBS after cell counting, and resuspended in PBS+1% FBS. In a 96-well U-shaped plate, 100 µl of Jurkat cells ($2\times10^5$ cells) were added to each well, 50 µl of gradiently diluted antibodies (the final concentrations were 8, 2, 0.5, and 0.125 nM, respectively) and 50 µl of SIRPα recombinant protein (His-tag, the final concentration was 2 µg/mL) were added to each well, and incubated at 4° C. for 1 h. The cells were collected by centrifugation at 1000 rpm for 3 mins, washed once with 200 µl of PBS+1% FBS, added with 1:20 diluted detection antibody PE anti-His Tag Antibody (purchased from Biolegend, Cat. No. 362603), and incubated at 4° C. for 1 h in the dark. The cells were collected by centrifugation at 1000 rpm for 3 mins, rinsed twice with PBS+1% FBS, resuspended in 200 µl of PBS+1% FBS, and transferred to a flow tube for on-board detection. The mean fluorescence intensity 1MFI data were analyzed with GraphPad Prism5 and the results were shown in FIG. 12.

In the results corresponding to the three test methods, the above 28 VHH-Fc fusion bivalent recombinant antibodies can block the interaction between CD47 recombinant protein and SIRPα recombinant protein, and can block the interaction between CD47 recombinant protein and SIRPα positive cells HEK293-SIRPα, and can block the interaction between SIRPα recombinant protein and CD47 positive cells Jurkat.

Example 14. Antibody Affinity Determination

From the above 28 VHH-Fc fused bivalent recombinant antibodies, two molecules that binded to erythrocytes and two that did not bind were selected, and the affinity of the antibody to the huCD47 was detected by a BIAcore 8K (GE Healthcare) instrument. Anti-humanIgGFc monoclonal antibody (purchased from R&D systems, Cat. No. G-102-C) was linked to a CM5 sensor chip (purchased from GE Healthcare, Cat. No. BR-1005-30) by amino coupling method as a capture molecule, the VHH-Fc fusioin bivalent recombinant antibody or 5F9 antibody was captured on the CM5 chip, and the amount of antibody captured was 250-500 RU. The huCD47 recombinant protein was gradiently diluted with loading buffer HBS-EP+ (purchased from GE Healthcare, Cat. No. BR100669) (concentration range from 1.56 nM to 100 nM), and flowed through the antibody on the CM5 chip at a flow rate of 30 μl/min. The binding time of the huCD47 to the antibody was 180 s, the dissociation time was 900 s, and the reaction temperature was 25° C. The binding constant ka, the dissociation constant kd and the affinity KD were calculated by FitGlobal using BIAcore 8K Evaluation software (GE Healthcare) according to the 1:1 binding model. The results were shown in Table 3. The binding affinity of the four VHH-Fc fusion bivalent recombinant antibodies to the huCD47 was higher than that of the control antibody 5F9, wherein the affinity of DX-36699 was much higher than that of 5F9, and the affinity of the former was 17 times that of the latter.

TABLE 3

BIAcore tests the affinity constant of antibody to antigen huCD47

| antibody | mobile phase | Kinetics Chi$^2$ (RU$^2$) | ka (1/Ms) | kd (1/s) | KD (nM) |
| --- | --- | --- | --- | --- | --- |
| 5F9 | huCD47 (His tag) | 1.91E+00 | 7.16E6 | 5.50E−02 | 7.68 |
| DX-36698 | | 2.51E−01 | 1.26E5 | 6.32E−04 | 5.01 |
| DX-36699 | | 9.93E−01 | 1.25E5 | 5.67E−05 | 0.454 |
| DX-36700 | | 4.63E−01 | 1.07E6 | 6.23E−03 | 5.84 |
| DX-36722 | | 2.32E−01 | 1.41E6 | 1.56E−02 | 1.11 |

Example 15. VHH-Fc Fusion Bivalent Recombinant Antibody Enhances Phagocytosis of Jurkat Tumor Cells by Macrophages CD14+ monocytes were isolated from human PBMC, induced to differentiate into M1 macrophages with phagocytic function in vitro, and the antibody-dependent cellular-phagocytosis (ADCP) was evaluated by targeting CD47-expressing human T-lymphocytic leukemia cells Jurkat.

Human PBMCs are purchased from Miaotong Biotechnology Co., Ltd. (Shanghai). After PBMCs were recovered, they were cultured by RPMI-1640 medium comprising 10% FBS in an incubator at 37° C., 5% $CO_2$ for 4-6 hours. The CD14+ monocytes were isolated according to instructions of MagniSort human CD14 positive screening kit (purchased from Invitrogen, Cat. No. 8802-6834). The obtained CD14+ monocytes were cultured in RPMI-1640 medium comprising 10% FBS, and M-CSF (purchased from R&D system, Cat. No. 216-MC-100) at a final concentration of 25 ng/mL was added for induction for 6 days. IFN-γ (purchased from R&D system, Cat. No. 285-IF-100) with a concentration of 50 ng/mL was further induced for 24 h to obtain M1 macrophages. The M1 macrophages were seeded in 96-well plates, 2000 cells per well, and cultured overnight at 37° C., 5% $CO_2$.

Figure 13:
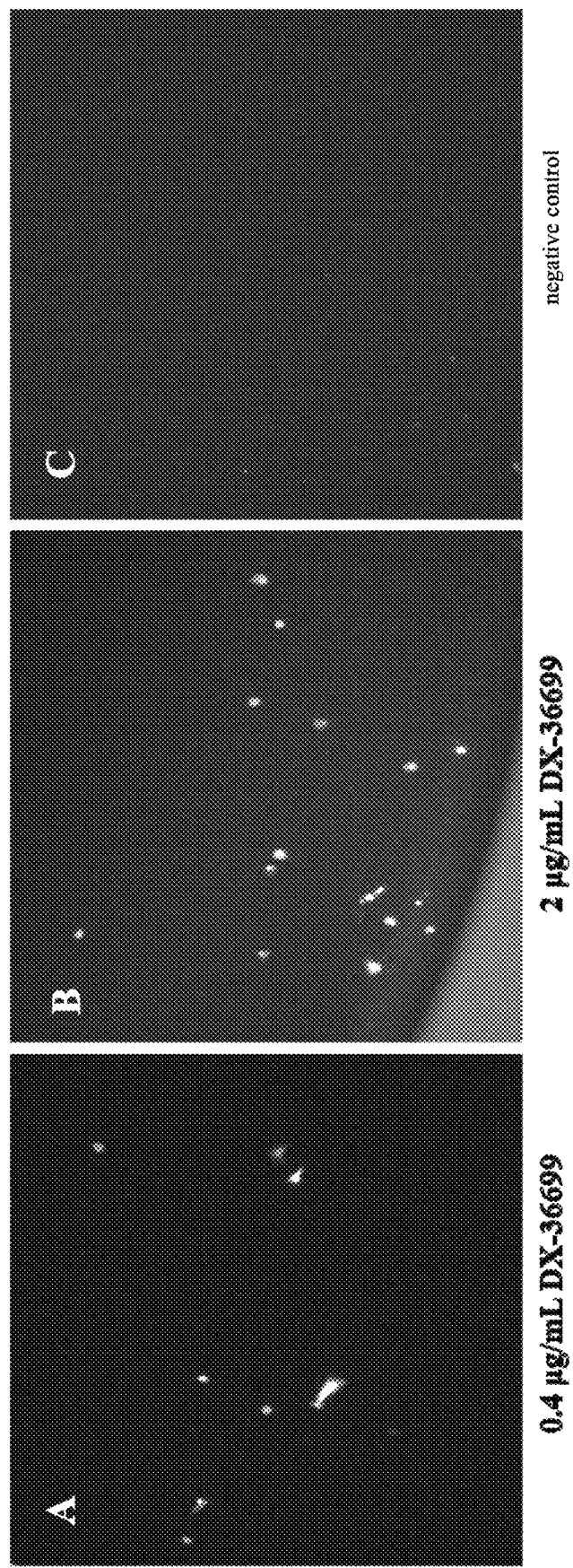
FIG. 13. DX-36699 antibodies mediate the phagocytosis of target cells Jurkat by M1 macrophages, and DX-36699 enhances the phagocytosis of Jurkat cells by M1 macrophages at the concentration of 0.4 g/mL and 2 µg/mL.

Human T lymphocytic leukemia cells Jurkat (purchased from the Cell Bank of the Chinese Academy of Sciences, Cat. No. SCSP-513) were cultured in RPMI-1640 medium comprising 10% FBS, and the cells were collected by centrifugation at 1000 rpm for 3 mins, and washed once with PBS. Jurkat cells were stained for 10 mins with CFSE (Carboxy Fluorescein diacetate Succinimidyl Ester, purchased from eBioscience, Cat. No. 65-0850-84) at a final concentration of 1 M, rinsed twice with PBS, and resuspended in PBS. CF SE-labeled Jurkat cells were mixed with VHH-Fc fusion bivalent recombinant antibody, and then added to a 96-well plate comprising M1 macrophages, and the final antibody concentrations were 0.4 and 2 μg/mL, respectively. After incubation at 37° C., 5% $CO_2$ for 2 h, the cells were washed twice with PBS to remove Jurkat cells suspended in the medium. Fluorescence microscopy was used to detect the green fluorescent signal in adherent M1 macrophages, i.e., phagocytosed Jurkat cells. The results were shown in FIG. 13.

Example 16. In Vivo Antitumor Activity of DX-36699 Antibody

M-NSG mice (female, 6 weeks old, Shanghai Nanfang Model Biotechnology Co., Ltd.) were subcutaneously transplanted with Raji tumor cells ($5 \times 10^6$ cells/mice were subcutaneously inoculated on the right side) to establish a Raji xenograft model. On the 8th day after inoculation, the average tumor volume was about 123 mm$^3$. The tumor-bearing mice were divided into 6 groups by random block method, comprising the first group PBS, i.p, QD×11 group, and the second group 5F9, 5 mg/kg, i.p, QD×11 group, the third group DX-36699-IgG1, 2.5 mg/kg, i.p, QD×11 group, the fourth group DX-36699-IgG1, 5 mg/kg, i.p, QD×11 group, the fifth group DX-36699-IgG4, 2.5 mg/kg, i.p, QD×11 group and the sixth group DX-36699-IgG4, 5 mg/kg, i.p, QD×11 group, 6 animals in each group. The administration volume of each group was 10 mL/Kg.

Results: On the 17th day after the initial administration, the average tumor volume in the control group was 1563.15±63.02 mm$^3$. There was a significant difference ($P<0.01$) between the tumor volume of the second group 5F9, 5 mg/kg, i.p, QD×11 group, the third group DX-36699-IgG1, 2.5 mg/kg, i.p, QD×11 group, the fourth group DX-36699-IgG1, 5 mg/kg, i.p, QD×11 group, the fifth group DX-36699-IgG4, 2.5 mg/kg, i.p, QD×11 group and the sixth group 6 DX-36699-IgG4, 5 mg/kg, i.p, QD×11 of the tested samples and that of the control group, the results were shown in FIG. 14. The tumor growth inhibition (TGI) rates were 59.77%, 51.50%, 65.34%, 61.39% and 67.72%, respectively.

At the end of the test, the animals were euthanized, and the tumor mass was removed and weighed. The average tumor weight in the control group was 1.0612±0.0252 g. There was a very significant difference ($P<0.01$) between the average tumor weight of the second group 5F9, 5 mg/kg, i.p, QD×11 group, the third group DX-36699-IgG1, 2.5 mg/kg, i.p, QD×11 group, the fourth group4 DX-36699-IgG1, 5 mg/kg, i.p, QD×11 group, the fifth group DX-36699-IgG4, 2.5 mg/kg, i.p, QD×11 group and the sixth group DX-36699-IgG4, 5 mg/kg, i.p, QD×11 of the tested samples and that of the control group, the tumor weight inhibition rates were 59.57%, 50.17%, 59.76%, 57.01% and 64.56%, respectively. The statistical results of the tumor weight were shown in FIG. 15.

Example 17. Humanized Sequence Design of DX-36699 Antibody

According to the sequence information of the DX-36699 antibody (VHH), the homology model of the antibody was firstly obtained by modeling, and combined with abysis software, framework amino acids and rare amino acids within 5A from CDRs were analyzed, and these amino acid sites usually affect the conformation or antigen-binding activity of CDRs. Then, the human germline was obtained by IMGT analysis. After splicing the selected human germline framework with the CDRs of the antibody, the designed humanized antibody was compared with the framework region sequence of the original antibody to find out the amino acid sites that were different in the framework region sequences of the two, and determine whether these amino acid sites with differences will affect the conformation or antigen-binding activity of CDRs by analyzing the homology modeling results of the parental antibody. On the basis of maintaining the activity of the antibody and taking into account the reduction of heterology, antibody humanized sequences were designed by substituting amino acids similar to human antibody surface residues. A total of 4 humanized antibody sequences were obtained, numbered DX-36699-H7, DX-36699-H19, DX-36699-H20 and DX-36699-H21, respectively. The specific sequence information was shown in Table 4.

TABLE 4

Humanized antibody sequence information

| SEQ ID NO. | Antibody name | FR1 | CDR1 (SEQ ID NO. 6) | FR2 | CDR2 (SEQ ID NO. 7) | FR3 | CDR3 (SEQ ID NO. 8) | FR4 |
|---|---|---|---|---|---|---|---|---|
| 15 | DX-36699-H7 | EVQLLESGGGLVQPGGSLRLSCAAS (SEQ ID NO. 19) | GFYN | MRWYRQAPGNGLELVAR (SEQ ID NO. 20) | IGIGST | DYADSVKGRFTISRDNSKNTVYLQMNSLRAEDTAVYYC (SEQ ID NO. 21) | WGGGY | WGQGTLVTVSS (SEQ ID NO. 22) |
| 16 | DX-36699-H19 | EVQLLESGGGVVQPGGSLRLSCAAS (SEQ ID NO.23) | GFYN | MRWYRQAPGKGLELVAR (SEQ ID NO.24) | IGIGST | DYADSVKGRFTISRDNSKNTVYLQMNSLKPEDTAVYYC (SEQ ID NO. 25) | WGGGY | WGQGTLVTVSS (SEQ ID NO. 26) |
| 17 | DX-36699-H20 | EVQLVESGGGLVQPGGSLRLSCAAS (SEQ ID NO.27) | GFYN | MRWYRQAPGKGLELVAR (SEQ ID NO.28) | IGIGST | DYADSVKGRFTISRDNSKNTVYLQMNSLKPEDTAVYYC (SEQ ID NO. 29) | WGGGY | WGQGTLVTVSS (SEQ ID NO. 30) |
| 18 | DX-36699-H21 | EVQLLESGGGLVQPGGSLRLSCAAS (SEQ ID NO.31) | GFYN | MRWYRQAPGNGLELVAR (SEQ ID NO.32) | IGIGST | DYADSVKGRFTISRDNSKNTVYLQMNSLKPEDTAVYYC (SEQ ID NO. 33) | WGGGY | WGQGTLVTVSS (SEQ ID NO. 34) |

Example 18 Preparation of DX-36699 and Humanized Antibody by Expi293F Eukaryotic Expression System The above four humanized VHH single-domain antibodies were used to prepare Fc fusion bivalent recombinant antibodies (VHH-Fc) using the 293F expression system. Specifically, according to the sequence of "signal peptide-variable region-constant region" from the N-terminal to the C-terminal, the amino acid sequence of the signal peptide (MGWSCIILFLVATATGVHS(SEQ ID NO.13)) and the amino acid sequences of DX-36699-H7, DX-36699-H19, DX-36699-H20 and DX-36699-H21 (Table 4) were codon-optimized to total gene synthesis of DNA (Nanjing GenScript Biotechnology Co., Ltd., Nanjing), and then the subclones were tandemly linked to the pcDNA3.4 vector containing the amino acid sequences from the hinge region to the CH3 domain of the heavy chain of the human IgG4 antibody (from UniProt database, sequence P1861, with S228P mutation), i.e., SEQ ID NO.39 (ESKYGPPCPPCPA-PEFLGGPSVFLFPPKPKDTLMISRTPE-VTCVVVDVSQEDPEVQFNW YVDGVEVHNAKTKPREEQFN-STYRVVSVLTVLHQDWLNGKEYKCKVSNKGLPSSI EK TISKAKGQPREPQVYTLPPSQEEMTKNQVSLT-CLVKGFYPSDIAVEWESNGQPENNYKT TPPVLDSDGSFFLY-SRLTVDKSRWQEGNVFSCSVMHEALHN-HYTQKSLSLSLGK). After the vector was verified by sequencing, competent *Escherichia coli* (*E. coli*) was transformed by conventional methods, and endotoxin-free plasmids were prepared using Qiagen Plasmid Extraction Kit (Cat. No. 12362).

According to the instruction of LVTransm transfection reagent (from iCarTab, Cat. No. LVTran100), the LVTransm transfection reagent and the antibody expression vector were taken out from the refrigerator, after thawing at room temperature, the LVTransm transfection reagent and the antibody expression vector were pipetted up and down with a pipette to mix well. The PBS buffer was taken out and warmed to room temperature. 2 mL of PBS was taken to a well of a 6-well plate, added 130 μg of plasmids respectively, and mixed well by pipetting up and down with a pipette, then added 400 μL of LVTransm, immediately pipetted up and down with a pipette to mix well, and let stand for 10 minutes at room temperature. The above-mentioned DNA/LVTransm complex was added to 120 mL of 293F cell culture medium, and it was shaken gently to mix well. The cells were placed in an incubator at 37° C., 5% $CO_2$, cultured at 130 rpm for 6-8 hours, and then 50 mL of fresh medium was added, and the culture was continued for 7 days.

The cell culture medium was centrifuged at 1200 rpm for 3 mins to remove the cell pellet, the supernatant was collected, and the VHH-Fc fusion bivalent recombinant antibody was purified using a Protein A affinity purification column (Suzhou Bojin Biotechnology Co., Ltd., Cat. No.: 13-0010-02). OD280 was determined with a microplate reader for protein quantification, and an appropriate amount of the recombinant antibody was taken for identification by reducing SDS-PAGE. The monomer molecular weight of the target antibody was 37 kD-39 kD. Its size and purity results in SDS-PAGE were shown in FIG. 16.

Example 19 Erythrocyte Agglutination Assay of the Humanized Antibody

The four purified humanized molecules were subjected to erythrocyte agglutination detection, and the original antibody DX-36699-IgG4 (splicing of SEQ ID NO. 9 and SEQ ID NO. 39) and 5F9 were used as controls. Human erythrocytes are obtained from Allcells Biotechnology (Shanghai) Co., Ltd. The specific implementation method was the same as that of Example 9. The results were shown in FIG. 17.

The four humanized molecules had properties consistent with the original antibody and did not cause erythrocyte agglutination at all concentrations tested. 5F9 antibody can cause severe erythrocyte agglutination at concentrations higher than 0.096 nM.

Example 20 FACS Detects the Binding of Humanized Antibodies to Human Erythrocytes The binding of humanized antibodies to human erythrocytes was detected by FACS, and the original antibodies DX-36699-IgG4 and 5F9 were used as controls. Human erythrocytes are obtained from Allcells Biotechnology (Shanghai) Co., Ltd. The specific implementation method was the same as that of Example 10. The results were shown in FIG. 18.

The four humanized molecules had properties consistent with the original antibody, binding very weakly to erythrocytes, and much weaker binding to erythrocytes than 5F9 at the same concentration.

Example 21 FACS Detects the Binding of Humanized Antibodies to Human Platelets The binding of humanized antibodies to human platelets was detected by FACS method, and the original antibody DX-36699-IgG4 and 5F9 were used as controls. The specific implementation method was the same as that of Example 11. The results were shown in FIG. 19.

The four humanized molecules had properties consistent with the original antibody, binding very weakly to human platelets, and much weaker binding to human platelets than 5F9 at the same concentration.

Example 22 FACS Detects the Binding of Humanized Antibodies to CD47

The binding of humanized antibodies to cell surface CD47 was detected by FACS method, and the original antibody DX-36699-IgG4 was used as a control. The cells used for detection were CD47 positive Jurkat cells (the Cell Bank of the Chinese Academy of Sciences, Cat. No. SCSP-513). The specific implementation method was the same as that of Example 12 (the NUGC-4 cells were replaced with Jurkat cells, and the other conditions remain unchanged). The results were shown in FIG. 20.

The four humanized molecules binded to cell surface CD47 in a concentration-dependent manner, and their binding activity was consistent with the original antibody DX-36699-IgG4.

Example 23 FACS Detection of Humanized Antibodies Blocking the Binding of CD47-SIRPα

The activity of the humanized antibodies to block the interaction between SIRPα recombinant protein and Jurkat cells (expressing model CD47) was detected by FACS method, and the original antibody DX-36699-IgG4 was used as a control. The specific implementation method was the same as that of Example 13. The results were shown in FIG. 21.

The four humanized molecules can block the interaction between SIRPα recombinant protein and CD47-positive Jurkat cells in a concentration-dependent manner, and their blocking activity was consistent with the original antibody DX-36699-IgG4.

Example 24 Biacore Detects the Affinity of Humanized Antibodies

The humanized antibody DX-36699-H20 was selected, its affinity with huCD47 was detected by Biacore T200 (GE Healthcare), and compared with the original antibody DX-36699-IgG4. The specific implementation method was the same as that of Example 14. The results were shown in Table 5. The affinity of the humanized antibody DX-36699-H20 was consistent with the original antibody DX-36699-IgG4.

TABLE 5

Affinity constants of antibody and antigen huCD47 is tested by Biacore

| antibody | Mobile phase | Kinetics Chi$^2$ (RU$^2$) | ka (1/Ms) | kd (1/s) | KD (nM) |
| --- | --- | --- | --- | --- | --- |
| DX-36699-IgG4 | hu CD47 | 1.86E+00 | 1.311E5 | 4.704E−04 | 3.586 |
| DX-36699-H20 | (His tag) | 1.67E+00 | 1.498E5 | 8.553E−04 | 5.709 |

Example 25 Binding of DX-36699-1120 to Cynomolgus Macaque Erythrocytes

The binding of the humanized antibody DX-36699-H20 to cynomolgus macaque erythrocytes was detected by FACS, with 5F9 as a control. The cynomolgus macaque erythrocytes are obtained from Shanghai Innostar Biotechnology Co., Ltd., and the numbers of the 4 groups of erythrocytes corresponding to cynomolgus macaques are: 186 #, 188 #, 194 # and 567 #, respectively. The specific implementation method was the same as that of Example 10. The results were shown in FIG. 22.

5F9 binded to the 4 groups of cynomolgus macaque erythrocytes in a concentration-dependent manner, and has strong binding activity. At 50% maximum binding, the 5F9 antibody concentration was in the range of 0.01-0.03 μg/mL. Under the same experimental conditions, DX-36699-H20 had only weak binding to cynomolgus macaque erythrocytes.

Example 26 Binding of DX-36699-1120 to Cynomolgus Macaque Platelets

The binding of the humanized antibody DX-36699-H20 to cynomolgus macaque platelets was detected by FACS, with 5F9 as a control. The cynomolgus macaque platelets are obtained from Shanghai Innostar Biotechnology Co., Ltd., and the numbers of the 4 groups of platelets corresponding to the cynomolgus macaques are: 186 #, 188 #, 194 # and 567 #, respectively. The specific implementation method was the same as that of Example 11. The results were shown in FIG. 23.

5F9 binded to the 4 groups of cynomolgus macaque platelets in a concentration-dependent manner. When the concentration of 5F9 was greater than 0.1 μg/mL, significant binding activity can be detected. Under the same experimental conditions, no measurable binding signal was found between DX-36699-H20 and cynomolgus macaque platelets in the range of the measured concentration (0.001-10 μg/mL).

Example 27 Toxicological Study of DX-36699-1120 in Cynomolgus Macaques

The CD47 antigen was expressed at a high level on erythrocytes. The first-generation antibodies developed against the CD47 antigen, comprising the 5F9 antibody, can bind to erythrocytes and induce erythrocyte agglutination, hemolysis and macrophage phagocytosis. Severe anemia is one of the main side effects.

4 Cynomolgus macaques (2 females+2 males, numbered 2 #, 3 #, 4 # and 5 #, respectively) were divided into 2 groups, and were given a single intravenous infusion of 5F9 and DX-36699-H20, respectively, at a dose of 15 mg/kg. On the 8th day before administration, the 2nd day before administration, and the 3rd, 5th, 9th, 13th and 21st days after administration, 0.5 mL of blood was collected from the non-administration limb vein of the cynomolgus macaques, after the blood sample was collected, it was put into the EDTA-K2 anticoagulation tube with the labeled sample number, and put in the ice box, and within 2 hours after collection, the erythrocyte count, hemoglobin concentration, hematocrit, reticulocyte count and ratio, erythrocyte volume distribution width, average hemoglobin amount and concentration and mean erythrocyte volume were tested by blood routine analyzer. The results were shown in FIG. 24: anemia began to appear on the 3rd day after intravenous infusion of 5F9, and manifested as a decrease in the erythrocyte count, hematocrit and hemoglobin concentration, and the downward trend continued to the 9th day, and it basically returned to the pre-drug level by 21st day; the anemia caused by peripheral erythrocytopenia was often accompanied by a compensatory increase in bone marrow reticulocytes (immature erythrocytes) to supplement peripheral erythrocyte levels, and reticulocytes can be used as a sensitive indicator of peripheral erythrocytopenia anemia. On the 3rd day after intravenous infusion of 5F9, the reticulocyte count and ratio will show a significant compensatory increase, continuing to the 13th day, and basically returning to the pre-drug level by the 21st day; intravenous infusion of DX-36699-H20 had no effect on the measured erythrocyte-related indicators, and the animals had no anemia.

This result was consistent with the in vitro binding of 5F9 and DX-36699-H20 to erythrocytes and the results of erythrocyte agglutination experiments, indicating that DX-36699-H20 did not produce erythrocyte agglutination and binded very weakly to erythrocytes. Therefore, there was no anemia side effect after administration of DX-36699-H20 at 15 mg/kg in cynomolgus macaques. Compared with 5F9, DX-36699-H20 in cynomolgus macaques had a safety advantage and had the potential to solve the problem of anemia side effects in the clinical use of the first-generation CD47 antibody.

Sequence listing

| SEQ ID NO | clone number | amino acid sequence |
|---|---|---|
| 1 | CDR1 of DX-36698 clone | VRTFSIYA |
| 2 | CDR2 of DX-36698 clone | ISGRGYTT |
| 3 | CDR3 of DX-36698 clone | AADLYGSRRYADRESYDY |
| 4 | Amino acid sequence of DX-36698 (sequence of heavy chain variable region) | QVQLVESGGGLVQAGGSLRLSCAASVRTFSIYAMGWFRQAPGKDREFVGAISGRGYTTYYVDSVKGRFTISRDNAKNTVYLQMNSLKPEDTAVYYCAADLYGSRRYADRESYDYWGQGTQVTVSS |
| 5 | Amino acid sequence of DX-36698-IgG1 (DX-36698 VHH-Fc fusion antibody) | QVQLVESGGGLVQAGGSLRLSCAASVRTFSIYAMGWFRQAPGKDREFVGAISGRGYTTYYVDSVKGRFTISRDNAKNTVYLQMNSLKPEDTAVYYCAADLYGSRRYADRESYDYWGQGTQVTVSSEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 6 | CDR1 of DX-36699 clone | GFYN |
| 7 | CDR2 of DX-36699 clone | IGIGGST |
| 8 | CDR3 of DX-36699 clone | WGGGY |
| 9 | Amino acid sequence of DX-36699 (sequence of heavy chain variable region) | DVQLQASGGGSVEAGGSLTLSCLASGFYNMRWYRQAPGNERELVARIGIGGSTDYADSVKGRFTISRGNAKNMVHLQMNSLKPEDTAVYYCWGGGYWGQGTQVTVSS |
| 10 | Amino acid sequence of DX-36699- IgG1 (DX-36699 VHH-Fc fusion antibody) | DVQLQASGGGSVEAGGSLTLSCLASGFYNMRWYRQAPGNERELVARIGIGGSTDYADSVKGRFTISRGNAKNMVHLQMNSLKPEDTAVYYCWGGGYWGQGTQVTVSSEPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISKAKGQPREPQVYTLPPSRDELTKNQVSLTCLVKGFYPSDIAVEWESNGQPENNYKTTPPVLDSDGSFFLYSKLTVDKSRWQQGNVFSCSVMHEALHNHYTQKSLSLSPGK |
| 11 | 5F9 HC | QVQLQQPGAELVKPGASVMMSCKASGYTFTNYNMHWVKQTPGQGLEWIGTIYPGNDDTSYNQKFKDKATLTADKSSSAAYMQLSSLTSEDSAVYYCARGGYRAMDYWGQTSVTVSSASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPPCPAPEFLGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENNYKTTPPVLDSDGSFFLYSRLTVDKSRWQEGNVFSCSVMHEALHNHYTQKSLSLSLGK |
| 12 | 5F9 LC | DVLMTQTPLSLPVSLGDQASISCRSSQSIVYSNGNTYLGWYLQKPGQSPKLLIYKVSNRFSGVPDRFSGSGSGTDFTLKISRVEAEDLGVYHCFQGSHVPYTFGGGTKVEIKRTVAAPSVFIFPPSDEQLKSGTASVVCLLNNFYPREAKVQWKVDNALQSGNSQESVTEQDSKDSTYSLSSTLTLSKADYEKHKVYACEVTHQGLSSPVTKSFNRGEC |
| 13 | signal peptide | MGWSCIILFLVATATGVHS |
| 14 | Amino acid sequence of hinge region to CH3 | EPKSCDKTHTCPPCPAPELLGGPSVFLFPPKPKDTLMISRTPEVTCVVVDVSHEDPEVKFNWYVDGVEVHNAKTKPREEQYNSTYRVVSVLTVLHQDWLNGKEYKCKVSNKALPAPIEKTISK |

-continued

Sequence listing

| SEQ ID NO | clone number | amino acid sequence |
|---|---|---|
|  | domain of heavy chain of human IgG1 antibody | AKGQPREPQVYTLPPSRDELTKNQVSLTCLVKGFYPSDIAVE WESNGQPENNYKTTPPVLDSDGSFFLYSKLTVDKSRWQQG NVFSCSVMHEALHNHYTQKSLSLSPGK |
| 15 | Amino acid sequence of DX-36699-H7 (sequence of heavy chain variable region) | EVQLLESGGGLVQPGGSLRLSCAASGFYN MRWYRQAPGNGLELVARIGIGGST DYADSVKGRFTISRDNSKNTVYLQMNSLRAEDTAVYYCW GGGYWGQGTLVTVSS |
| 16 | Amino acid sequence of DX-36699-H19 (sequence of heavy chain variable region) | EVQLLESGGGVVQPGGSLRLSCAASGFYNMRWYRQAPG KGLELVARIGIGGST DYADSVKGRFTISRDNSKNTVYLQMNSLKPEDTAVYYC WGGGYWGQGTLVTVSS |
| 17 | Amino acid sequence of DX-36699-H20 (sequence of heavy chain variable region) | EVQLVESGGGLVQPGGSLRLSCAAS GFYNMRWYRQAPGKGLELVARIGIGGST DYADSVKGRFTISRDNSKNTVYLQMNSLKPEDTAVYYC WGGGYWGQGTLVTVSS |
| 18 | Amino acid sequence of DX-36699-H21 (sequence of heavy chain variable region) | EVQLLESGGGLVQPGGSLRLSCAASGFYN MRWYRQAPGNGLELVARIGIGGST DYADSVKGRFTISRDNSKNTVYLQMNSLKPEDTAVYYC WGGGYWGQGTLVTVSS |

Note:
In sequences 15 to 18, the underlined regions are the CDR regions.

Although the embodiments of the present application have been described above with reference to the accompanying drawings, the present application is not limited to the above-mentioned specific embodiments and application fields, and the above-mentioned specific embodiments are only illustrative and instructive, rather than restrictive. Under the inspiration of this specification and without departing from the scope protected by the claims of the present application, those of ordinary skill in the art can also make many forms, which all belong to the protection of the present application.

The invention claimed is:

1. An anti-CD47 heavy chain single-domain antibody (VHH), comprising CDRs of the following:
   (1) CDR1, CDR2 and CDR3 as shown by SEQ ID NO:1, SEQ ID NO:2, and SEQ ID NO:3 respectively; or
   (2) CDR1, CDR2 and CDR3 as shown by SEQ ID NO:6, SEQ ID NO:7, and SEQ ID NO:8 respectively.

2. The anti-CD47 heavy chain single-domain antibody of claim 1, comprising FR1, FR2, FR3, and FR4.

3. The anti-CD47 heavy chain single-domain antibody of claim 1, which is humanized.

4. The anti-CD47 heavy chain single-domain antibody of claim 2, wherein
   the FR1 comprises an amino acid sequence selected from any one of the following: SEQ ID NO. 19, SEQ ID NO. 23, SEQ ID NO. 27 and SEQ ID NO. 31;
   the FR2 comprises an amino acid sequence selected from any one of the following: SEQ ID NO. 20, SEQ ID NO. 24, SEQ ID NO. 28 and SEQ ID NO. 32;
   the FR3 comprises an amino acid sequence selected from any one of the following: SEQ ID NO. 21, SEQ ID NO. 25, SEQ ID NO.29 and SEQ ID NO.33; and
   the FR4 comprises an amino acid sequence selected from any one of the following: SEQ ID NO.22, SEQ ID NO.26, SEQ ID NO.30 and SEQ ID NO.34.

5. The anti-CD47 heavy chain single-domain antibody of claim 1, comprising an amino acid sequence selected from any one of the following:
   SEQ ID NO:4, SEQ ID NO:9, SEQ ID NO: 15, SEQ ID NO:16, SEQ ID NO: 17, and SEQ ID NO: 18.

6. The anti-CD47 heavy chain single-domain antibody of claim 5, further comprising a region in the heavy chain Fc region selected from the group consisting of: hinge region, CH2 and CH3.

7. The anti-CD47 heavy chain single-domain antibody of claim 6, wherein the heavy chain is IgG1 or IgG4.

8. A conjugate, comprising the anti-CD47 heavy chain single-domain antibody of claim 1 or antigen-binding fragment thereof.

9. The conjugate of claim 8, wherein the anti-CD47 heavy chain single-domain antibody or antigen-binding fragment thereof is conjugated to a drug, a toxin, a cytotoxic agent, a stimulator of interferon gene (STING) receptor agonist, a cytokine, a radionuclide or an enzyme.

10. A fusion protein, comprising the anti-CD47 heavy chain single-domain antibody of claim 1 or antigen-binding fragment thereof.

11. The fusion protein of claim 10, wherein the anti-CD47 heavy chain single-domain antibody or antigen-binding fragment thereof is fused to a diagnostic molecule or therapeutic molecule.

12. A polynucleotide encoding the anti-CD47 heavy chain single-domain antibody of claim 1 or antigen-binding fragment thereof.

13. A vector comprising the polynucleotide of claim 12.

14. A host cell comprising the polynucleotide of claim 12.

15. The host cell of claim 14, which is a prokaryotic or eukaryotic host cell.

16. A method for producing an anti-CD47 heavy chain single-domain antibody, comprising at least the steps of: (a) culturing the host cell of claim 15; and (b) isolating the anti-CD47 heavy chain single-domain antibody produced from the host cell from the culture.

17. The anti-CD47 heavy chain single-domain antibody of claim 1 with a diagnostic label.

18. The anti-CD47 heavy chain single-domain antibody of claim 17, wherein the diagnostic label is selected from the group consisting of: an isotope, a colloidal gold label, a colored label, and a fluorescent label.

19. A pharmaceutical composition, comprising the anti-CD47 heavy chain single-domain antibody of claim 1.

20. An article of manufacture or a kit for detecting CD47 protein, comprising the anti-CD47 heavy chain single-domain antibody of claim 1.

21. A method for treating a cancer selected from acute myeloid leukemia (AML), chronic myeloid leukemia (CML), acute lymphoblastic leukemia (ALL), non-Hodgkin's lymphoma (NHL), gastric cancer, multiple myeloma, and prostate cancer comprising administering to a subject an effective amount of the anti-CD47 heavy chain single-domain antibody of claim 1.

22. The method of claim 21, wherein the anti-CD47 heavy chain single-domain antibody is used in combination with one or more other antibodies or drugs.

23. The method of claim 22, wherein the one or more other antibodies are checkpoint antibodies.

* * * * *